US012271136B2

(12) United States Patent
Oba et al.

(10) Patent No.: US 12,271,136 B2
(45) Date of Patent: Apr. 8, 2025

(54) IMAGE FORMING APPARATUS INCLUDING A DISPLAY UNIT FOR DISPLAYING INFORMATION ABOUT A PROCEDURE FOR REPLENISHING DEVELOPER

(71) Applicant: CANON KABUSHIKI KAISHA, Tokyo (JP)

(72) Inventors: Katsuhiko Oba, Kanagawa (JP); Kohei Koguchi, Kanagawa (JP); Isao Koishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/462,968

(22) Filed: Sep. 7, 2023

(65) Prior Publication Data

US 2024/0019804 A1 Jan. 18, 2024

Related U.S. Application Data

(63) Continuation of application No. 17/887,312, filed on Aug. 12, 2022, now Pat. No. 11,796,947, which is a continuation of application No. 17/223,234, filed on Apr. 6, 2021, now Pat. No. 11,454,912.

(30) Foreign Application Priority Data

Apr. 10, 2020 (JP) ................................ 2020-071154

(51) Int. Cl.

*G03G 15/08* (2006.01)
*G03G 15/00* (2006.01)
*G03G 21/00* (2006.01)
*G03G 21/16* (2006.01)

(52) U.S. Cl.

CPC ..... *G03G 15/5016* (2013.01); *G03G 15/0865* (2013.01); *G03G 21/1633* (2013.01); *G03G 15/0894* (2013.01)

(58) Field of Classification Search

CPC ........... G03G 15/5016; G03G 15/5079; G03G 15/553; G03G 15/556; G03G 15/6552; G03G 21/1633; G03G 15/0865; G03G 15/0867; G03G 15/0874; G03G 2215/0682; G03G 2221/1687; G03G 2221/169

USPC ............................................. 399/11, 81, 405

See application file for complete search history.

(56) References Cited

U.S. PATENT DOCUMENTS

2008/0166139 A1* 7/2008 Watanabe ............. G03G 21/16 399/12
2018/0157202 A1* 6/2018 Watanabe ................ G03F 1/84

FOREIGN PATENT DOCUMENTS

JP H08340182 A 12/1996
JP H09006111 A 1/1997
JP 2008139636 A 6/2008

* cited by examiner

*Primary Examiner* — Robert B Beatty

(74) *Attorney, Agent, or Firm* — Canon U.S.A., Inc. I.P. Division

(57) ABSTRACT

An image forming apparatus includes an image bearing member, a developer bearing member, a discharge unit, a stacking tray including a stacking surface on which the recording material is stacked, a replenishment port, a cover capable of moving between a closed position where the cover covers the replenishment port and constitutes at least part of the stacking surface and an open position where the cover exposes the replenishment port, and an information display unit for displaying information about a procedure for replenishing the developing container with the developer from the replenishment container.

9 Claims, 40 Drawing Sheets

A – A

A – A

IMAGE FORMING APPARATUS INCLUDING A DISPLAY UNIT FOR DISPLAYING INFORMATION ABOUT A PROCEDURE FOR REPLENISHING DEVELOPER

CROSS-REFERENCE TO RELATED APPLICATIONS

The present application is a continuation of U.S. patent application Ser. No. 17/887,312, filed Aug. 12, 2022, which is a continuation of U.S. patent application Ser. No. 17/223,234, filed on Apr. 6, 2021, and issued as U.S. patent Ser. No. 11/454,912 on Sep. 27, 2022 which claims priority from Japanese Patent Application No. 2020-071154 filed Apr. 10, 2020, which are hereby incorporated by reference herein in their entireties.

BACKGROUND

Field of the Disclosure

The present disclosure relates to an image forming apparatus for forming an image on a recording material.

Description of the Related Art

Electrophotographic image forming apparatuses typically form an image by transferring a toner image formed on the surface of a photosensitive drum to a transfer material serving as a transfer medium. Examples of known developer replenishment methods include a process cartridge method and a toner replenishment method. The process cartridge method refers to a method where the photosensitive drum and a developing container are integrated as a process cartridge, and the process cartridge is replaced with a new one when the developer runs out.

By contrast, the toner replenishment method refers to a method where the developing container is replenished with new toner when the toner runs out. A one-component developing device using a toner replenishment method where a toner supply box capable of toner replenishment is connected to a toner conveyance path for conveying toner has conventionally been discussed (see Japanese Patent Application Laid-Open No. 08-30084). The toner stored in the toner supply box is conveyed to the toner conveyance path by a conveyance screw.

Various usages of image forming apparatuses have been demanded by users in recent years, including the foregoing process cartridge method and toner replenishment method.

SUMMARY

The present disclosure provides a mode of an image forming apparatus.

According to an aspect of the present disclosure, an image forming apparatus includes an image bearing member on which an electrostatic latent image is formed, a developer bearing member configured to develop the electrostatic latent image into a toner image by bearing a developer accommodated in a developing container and supplying the developer to the image bearing member, a discharge unit configured to discharge a recording material to which the toner image is transferred out of an apparatus main body, a stacking tray including a stacking surface on which the recording material discharged by the discharge unit is stacked, a replenishment port to which a replenishment container accommodating a developer is attached, the replenishment port being configured to replenish the developing container with the developer from the replenishment container, a cover configured to move between a closed position where the cover covers the replenishment port and constitutes at least part of the stacking surface and an open position where the cover exposes the replenishment port, and an information display unit configured to display information about a procedure for replenishing the developing container with the developer from the replenishment container. The information display unit is located on a back of the cover corresponding to the stacking surface or a predetermined surface opposed to the back of the cover along with the replenishment port with the cover at the closed position. The replenishment port and the information display unit are each located within a width of the stacking surface in a width direction of the recording material, the width direction being parallel to the stacking surface and orthogonal to a discharge direction of the recording material.

Further features of the present disclosure will become apparent from the following description of exemplary embodiments with reference to the attached drawings.

DESCRIPTION OF THE EMBODIMENTS

Exemplary embodiments of the present disclosure will be described below with reference to the drawings.

Figure 1:
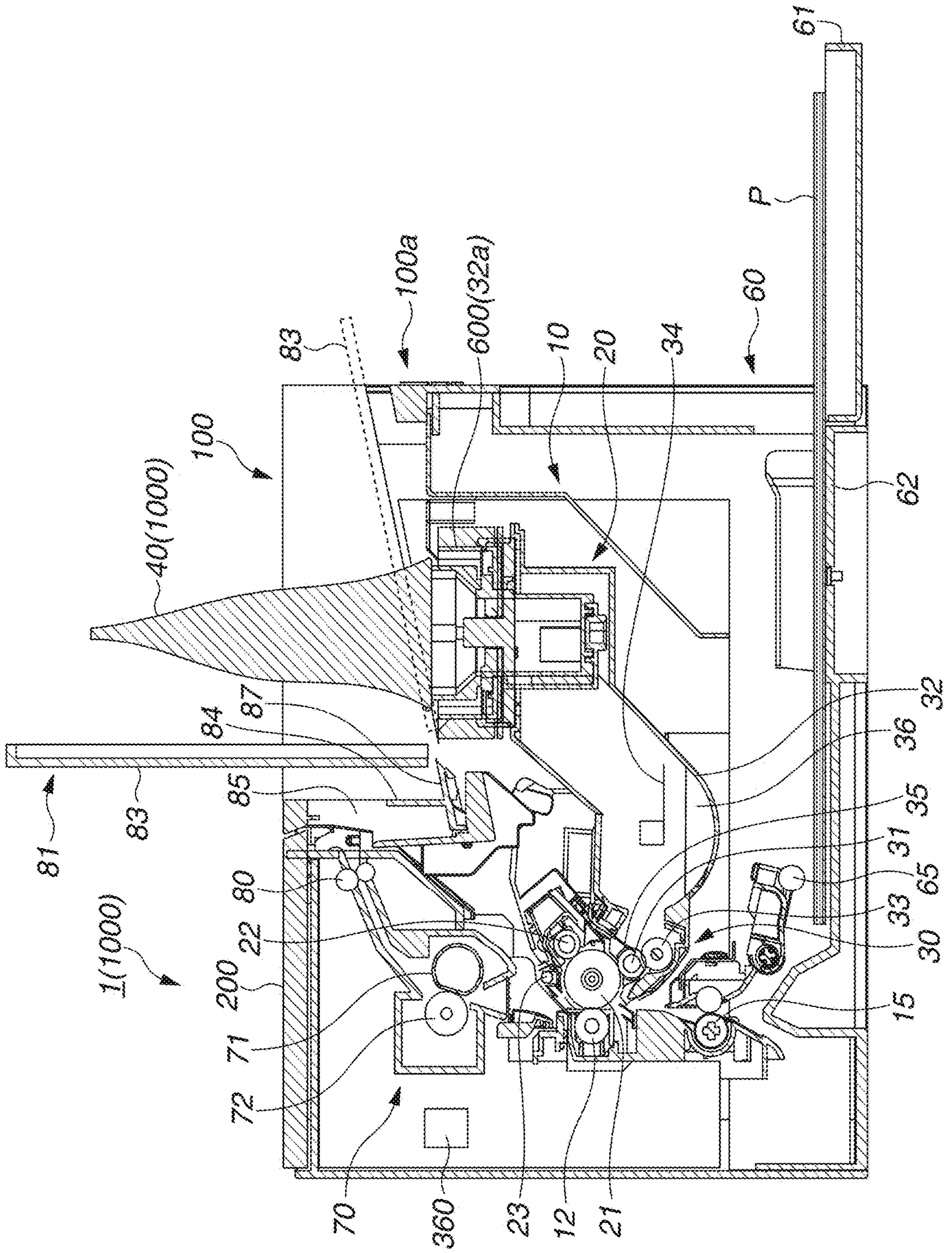
FIG. 1 is a schematic diagram illustrating a configuration of an image forming apparatus according to a first exemplary embodiment.

FIG. 1 is a schematic diagram illustrating a configuration of an image forming apparatus 1 according to a first exemplary embodiment. The image forming apparatus 1 is a monochrome printer that forms an image on a recording material based on image information input from an external apparatus. Examples of the recording material include various sheets of different materials, such as sheets of paper including plain paper and thick paper, plastic films including an overhead projector sheet, special shape sheets including an envelope and a tabbed folder, and cloth. FIG. 1 illustrates the configuration of the image forming apparatus 1 viewed in the direction of a rotation axis of a photosensitive drum 21 to be described below. The top-to-bottom direction is parallel to the vertical direction, and the left-to-right direction is parallel to the horizontal direction. The rotational axes of a developing roller 31, a discharge roller pair 80, a registration roller pair 15, and a cover 83 to be described below are parallel to the rotation axis of the photosensitive drum 21.

[Overall Configuration]

Figure 2A:
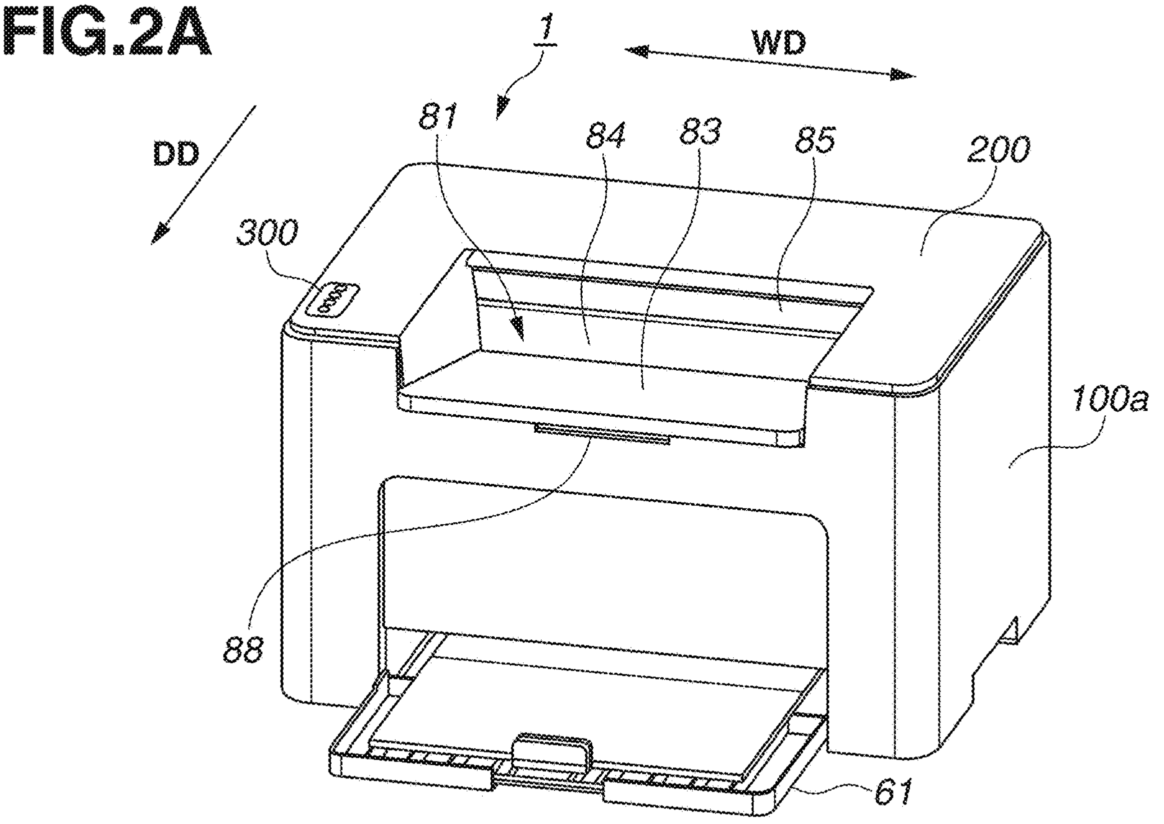
FIGS. 2A and 2B are perspective views illustrating the image forming apparatus according to the first exemplary embodiment.
Figure 2B:
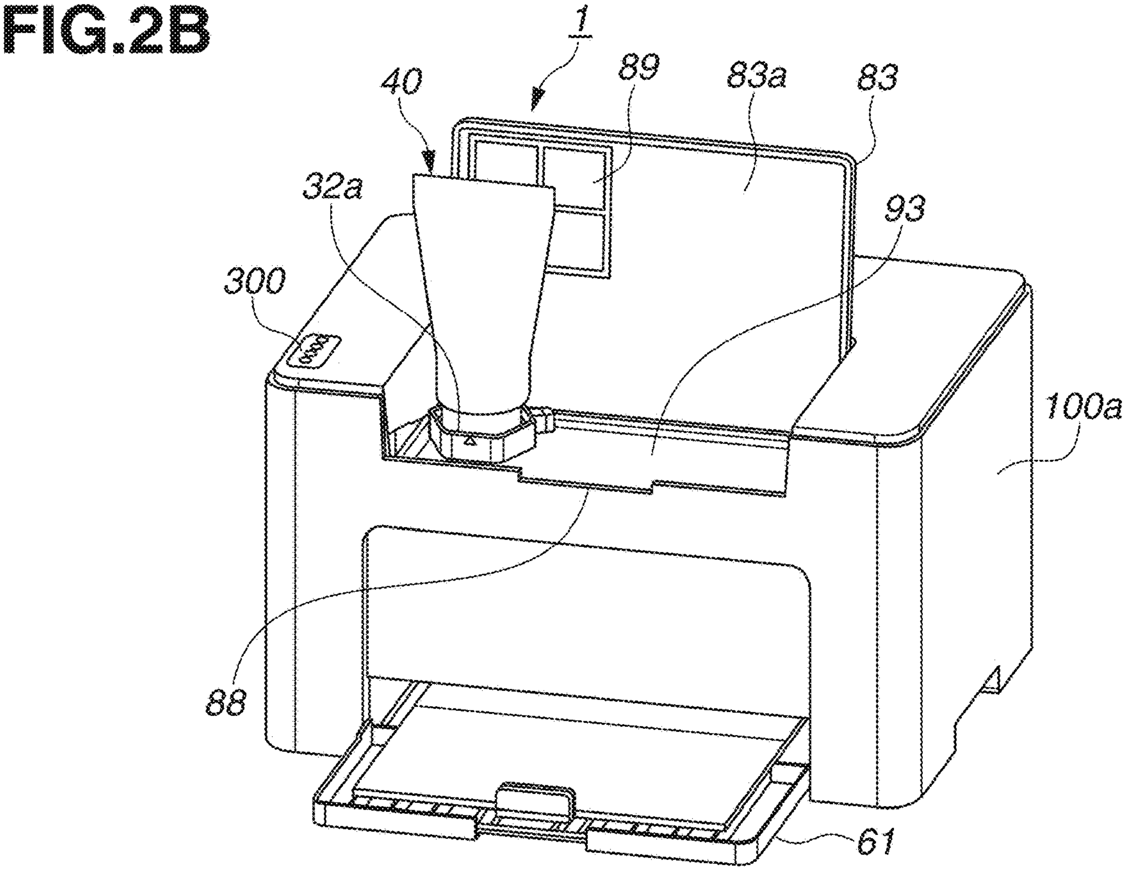

As illustrated in FIGS. 1, 2A, and 2B, the image forming apparatus 1 includes a printer main body 100, which is an apparatus main body, and an operation unit 300 attached to an exterior surface of the printer main body 100. The printer main body 100 includes an image forming unit 10, a feed unit 60, a fixing unit 70, and the discharge roller pair 80. The image forming unit 10 forms a toner image on a recording material (sheet) P. The feed unit 60 feeds the recording material P to the image forming unit 10. The fixing unit 70 fixes the toner image formed by the image forming unit 10 to the recording material P. The printer main body 100 also includes a control unit 360 for controlling an image forming operation of the image forming unit 10 on the recording material P.

The image forming unit 10 includes a not-illustrated scanner unit, an electrophotographic process cartridge 20, and a transfer roller 12 for transferring a toner image formed on the photosensitive drum 21 of the process cartridge 20 to the recording material P. The process cartridge 20 includes the photosensitive drum 21, and a charging roller 22 located around the photosensitive drum 21, a pre-exposure device 23, and a developing device 30 including the developing roller 31.

The photosensitive drum 21 is a photosensitive member formed in a cylindrical shape. The photosensitive drum 21 according to the present exemplary embodiment includes a photosensitive layer made of an organic photosensitive material having negative chargeability on a molded aluminum base of drum shape. The photosensitive drum 21 serving as an image bearing member is driven by a motor to rotate in a predetermined direction (clockwise illustrated in FIG. 1) at a predetermined process speed.

The charging roller 22 is in contact with the photosensitive drum 21 at a predetermined pressure to form a charging portion. A charging high voltage power supply applies a desired charging voltage to the charging roller 22, whereby the surface of the photosensitive drum 21 is uniformly charged to a predetermined potential. In the present exemplary embodiment, the photosensitive drum 21 is charged to a negative polarity by the charging roller 22. The pre-exposure device 23 removes the surface potential of the photosensitive drum 21 before entry into the charging portion, so that the charging portion produces a stable discharge.

The scanner unit (not illustrated) serving as an exposure unit scans and exposes the surface of the photosensitive drum 21 by irradiating the photosensitive drum 21 with laser light corresponding to the image information input from the external apparatus by using a polygon mirror. The exposure forms an electrostatic latent image based on the image information on the surface of the photosensitive drum 21. The scanner unit is not limited to a laser scanner device. For example, a light-emitting diode (LED) exposure device including an LED array in which a plurality of LEDs is arranged along the longitudinal direction of the photosensitive drum 21 may be employed.

The developing device 30 includes a developing roller 31 serving as a developer bearing member for bearing a developer, a developing container 32 constituting the frame of the developing device 30, and a supply roller 33 that can supply the developer to the developing roller 31. The developing roller 31 and the supply roller 33 are rotatably supported by the developing container 32. The developing roller 31 is located in an opening of the developing container 32 and opposed to the photosensitive drum 21. The supply roller 33 is rotatably in contact with the developing roller 31. Toner serving as the developer, which is accommodated in the developing container 32, is applied to the surface of the developing roller 31 by the supply roller 33. The supply roller 33 is not necessarily needed as long as the developing device 30 is configured such that sufficient toner can be supplied to the developing roller 31.

The developing device 30 according to the present exemplary embodiment uses a contact developing method as its developing method. Specifically, a toner layer borne on the developing roller 31 is brought into contact with the photosensitive drum 21 in a developing portion (developing region) where the photosensitive drum 21 is opposed to the developing roller 31. A developing high voltage power supply applies a developing voltage to the developing roller 31. Under the developing voltage, the toner borne on the developing roller 31 is transferred from the developing roller 31 to the drum surface based on a potential distribution on the surface of the photosensitive drum 21, whereby the electrostatic latent image is developed into a toner image. The present exemplary embodiment uses a reversal developing method. More specifically, the toner image is formed by adhesion of toner to surface areas of the photosensitive drum 21 that are charged in the charging process and then exposed in the exposure process to reduce the amount of charge.

In the present exemplary embodiment, toner having a particle size of 6 μm and a negative normal charging polarity is used. For example, polymerized toner generated by a polymerization method is used as the toner according to the present exemplary embodiment. The toner according to the present exemplary embodiment is a nonmagnetic one-component developer, which does not include a magnetic component and is borne on the developing roller 31 mainly by intermolecular forces or electrostatic forces (image forces). However, a one-component developer containing a magnetic component may be used. Some one-component developers contain additives (e.g., wax and silica fine particles) for adjusting the fluidity and charging performance of the toner aside from the toner particles. Alternatively, a two-component developer including nonmagnetic toner and a magnetic carrier may be used as the developer. If a magnetic developer is used, a cylindrical developing sleeve with a magnet inside is used as the developer bearing member, for example.

The developing container 32 includes an accommodation unit 36 that accommodates toner replenished from a toner pack 40 described below, and an agitation member 34 serving as an agitation unit located inside the accommodation unit 36. The agitation member 34 is driven to rotate by a not-illustrated motor, whereby the toner in the developing container 32 is agitated and fed toward the developing roller 31 and the supply roller 33. The agitation member 34 also has a function of circulating toner not used for development and scraped off the developing roller 31 through the developing container 32 so that the toner in the developing container 32 is uniformized. The agitation member 34 is not limited to the rotating configuration. For example, an agitation member of swingable configuration may be employed.

A developing blade 35 for regulating the amount of toner borne on the developing roller 31 is located in the opening of the developing container 32 where the developing roller 31 is located. As the developing roller 31 rotates, the toner supplied to the surface of the developing roller 31 passes through a portion where the developing roller 31 is opposed to the developing blade 35, whereby the toner is regulated into a uniform thin layer and triboelectrically charged to a negative polarity.

As illustrated in FIG. 1, the feed unit 60 includes a front door 61 openably and closably supported by the printer main body 100, a tray unit 62, and a liftable pickup roller 65. The tray unit 62 constitutes the bottom of a recording material storage space that appears when the front door 61 is opened. The front door 61 blocks the recording material storage space when closed to the printer main body 100. The front door 61 supports recording materials P with the tray unit 62 when open from the printer main body 100.

The fixing unit 70 uses a thermal fixing method where an image is fixed by thermally melting the toner on the recording material P. The fixing unit 70 includes a fixing film 71, a fixing heater, such as a ceramic heater, for heating the fixing film 71, a thermistor for measuring the temperature of the fixing heater, and a pressure roller 72 pressed against the fixing film 71.

An image forming operation of the image forming apparatus 1 will now be described. When an image formation command is input to the image forming apparatus 1, the image forming unit 10 stars an image formation process based on image information input from an external computer connected to the image forming apparatus 1. The not-illustrated scanner unit irradiates the photosensitive drum 21 with laser light based on the input image information. The photosensitive drum 21 here is charged by the charging roller 22 in advance, and the irradiation with the laser light forms an electrostatic latent image on the photosensitive drum 21. The electrostatic latent image is then developed by the developing roller 31, whereby a toner image is formed on the photosensitive drum 21.

In parallel with the foregoing image formation process, the pickup roller 65 of the feed unit 60 feeds a recording material P supported by the front door 61 and the tray unit 62. The recording material P is fed to the registration roller pair 15 by the pickup roller 65, and abutted against a nip between the registration roller pair 15 for skew correction. The registration roller pair 15 is then driven in synchronization with the transfer timing of the toner image, whereby the recording material P is conveyed toward a transfer nip formed between the transfer roller 12 and the photosensitive drum 21.

A transfer high voltage power supply applies a transfer voltage to the transfer roller 12 serving as a transfer unit, and the toner image borne on the photosensitive drum 21 is transferred to the recording material P conveyed by the registration roller pair 15. The recording material P to which the toner image is transferred is conveyed to the fixing unit 70, and the toner image is heated and pressurized as the recording material P passes through a nip portion between the fixing film 71 and the pressure roller 72 of the fixing unit 70. This melts the toner particles, which are then cured to fix the toner image to the recording material P. The recording material P passed through the fixing unit 70 is discharged in a discharge direction DD by the discharge roller pair 80 serving as a discharge unit. The recording material P is discharged out of (outside) the image forming apparatus 1 through a discharge port 85 for discharging a recording material outside, and stacked on a discharge tray 81 (stacking tray) located in the top part of the printer main body 100.

The discharge tray 81 is inclined upward downstream in the discharge direction DD of the recording material P. The recording material P discharged to the discharge tray 81 slides down the discharge tray 81, whereby the trailing edges of recording materials P are aligned by a regulation surface 84. The discharge port 85 is an opening formed in the regulation surface 84, and has a width in a width direction WD orthogonal to the discharge direction DD such that a recording material having the maximum width size conveyable by the image forming apparatus 1 can pass through. In the following description, the front-to-back direction, the left-to-right direction, and the top-to-bottom direction are defined with reference to a state where the operation unit 300 is viewed from the front.

As described above, the recording material P discharged out of a housing 100*a* through the discharge port 85 is stacked on the discharge tray 81. The housing 100*a* of the printer main body 100 accommodates the developing container 32 having the accommodation unit 36, and includes the discharge port 85. In the present exemplary embodiment, the housing 100*a* accommodates, for example, the photosensitive drum 21, the developing device 30, the fixing unit 70, and the registration roller pair 15. On top of the housing 100*a* in the vertical direction, a top panel unit 200 is fixed and the discharge tray 81 is located. The top panel unit 200 is immovably fixed to the housing 100*a*.

The image forming apparatus 1 includes a toner reception unit (mounting unit) 600 having a replenishment port (mounting opening) 32*a*. As described below, in the present exemplary embodiment, the toner reception unit 600 is located on the developing container 32. A part of the toner pack 40 is inserted into the replenishment port 32*a* of the toner reception unit 600, and a predetermined operation is made before the accommodation unit 36 can be replenished with toner from the toner pack 40. The toner reception unit 600 does not necessarily need to be located on the developing container 32, and may be located on the housing 100*a* of the printer main body 100.

As illustrated in FIGS. 1 and 2A, the discharge tray 81 includes an operable cover 83. The cover 83 is configured to be movable with respect to the housing 100*a* and the top panel unit 200. Specifically, the cover 83 is configured to be movable between a closed position where the cover 83 covers the replenishment port 32*a* and an open position where the cover 83 exposes the replenishment port 32*a* to outside the housing 100*a*. In FIG. 1, the cover 83 illustrated in solid lines represents the cover 83 at the open position, and the cover 83 illustrated in broken lines represents the cover 83 at the closed position. The cover 83 at the closed position constitutes at least a part of a stacking surface where recording materials P discharged from the discharge port 85 are stacked.

In the present exemplary embodiment, the discharge tray 81 includes a stacking portion 87 for stacking the recording materials P discharged from the discharge port 85 with the cover 83. The stacking portion 87 is configured to not move relative to the housing 100*a* or the top panel unit 200, and the stacking portion 87 constitutes a part of the stacking surface. However, the stacking portion 87 may be omitted and the entire stacking surface of the discharge tray 81 for stacking the recording materials P may be constituted by the cover 83. As employed herein, the stacking surface refers to a surface that makes contact with and supports the recording materials P.

As illustrated in FIG. 2B, when the cover 83 is open, a cover back 83*a*, a top wall 93, and the replenishment port 32*a* are exposed to outside. The top wall 93 is intended to protect the developing container 32 from above. The replenishment port 32*a* is attached by the toner pack 40 to replenish the developing container 32 with the developer.

As illustrated in FIGS. 1 and 2B, when the toner pack 40 is attached to the replenishment port 32*a* of the toner reception unit 600, a part of the toner pack 40 protrudes from the housing 100*a* and the cover 83 is thereby restricted from moving to the closed position. With the toner pack 40 attached, the image forming apparatus 1 is restricted from making an image forming operation. To make an image forming operation using the image forming apparatus 1, the toner pack 40 is removed and the cover 83 is moved to the closed position.

In the present exemplary embodiment, the cover 83 and the top wall 93 are formed over the entire width of the discharge tray 81 in the width direction WD of the recording material P parallel to the stacking surface and orthogonal to the discharge direction DD of the recording material P. In other words, the width of the discharge tray 81 (the width of the portion for supporting the recording material P) in the width direction WD is the same as the width of the cover 83.

The top wall 93 has an opening, which exposes the toner reception unit 600 to outside the housing 100*a*. With the cover 83 at the closed position, the replenishment port 32*a* of the toner reception unit 600 and the top wall 93 are covered by the cover 83. At this time, the replenishment port 32*a* and the top wall 93 are opposed to the cover back 83*a*. With the cover 83 open, the user can access the replenishment port 32*a*. The present exemplary embodiment uses a method (direct replenishment method) where the user replenishes the developing device 30 with toner from the toner pack 40 that is filled with toner for replenishment, with the developing device 30 mounted on the image forming apparatus 1.

The use of the direct replenishment method can improve usability since the process cartridge 20 does not need to be detached from the printer main body 100 and replaced with a new one when the remaining toner level of the process cartridge 20 becomes low. In addition, the developing container 32 can be replenished with toner at lower cost than when the entire process cartridge 20 is replaced. The direct replenishment method can also reduce cost, even compared to when only the developing device 30 of the process cartridge 20 is replaced, since various rollers and gears do not need to be replaced. The image forming apparatus 1 and the toner pack 40 constitute an image forming system 1000. The process cartridge 20 may be configured to be detachable from the printer main body 100.

[Collection of Transfer Residual Toner]

The present exemplary embodiment employs a cleaner-less configuration where transfer residual toner remaining on the photosensitive drum 21 without being transferred to a recording material P is collected into the developing device 30 for reuse. The transfer residual toner is collected in the following steps. The transfer residual toner includes a mixture of toner charged to a positive polarity and toner charged to a negative polarity but with an insufficient amount of charge. The photosensitive drum 21 after transfer is destaticized by the pre-exposure device 23 and the charging roller 22 produces a uniform discharge, whereby the transfer residual toner is charged to a negative polarity again. As the photosensitive drum 21 rotates, the transfer residual toner charged to a negative polarity again in the charging portion reaches the developing portion. The scanner unit then exposes the surface areas of the photosensitive drum 21 passed through the charging portion to write an electrostatic latent image, with the transfer residual toner still adhering to the surface.

The behavior of the transfer residual toner reaching the developing portion will now be described for an exposed area and a not-exposed area of the photosensitive drum 21 separately. In the developing portion, the transfer residual toner adhering to a not-exposed area of the photosensitive drum 21 is transferred to the developing roller 31 by a potential difference between the potential of the not-exposed area of the photosensitive drum 21 (dark area potential) and the developing voltage, and collected into the developing container 32. The reason is that while the normal charging polarity of the toner is negative, the developing voltage applied to the developing roller 31 has a positive polarity relative to the potential of the non-exposed area. The toner collected into the developing container 32 is agitated and dispersed with the toner in the developing container 32 by the agitation member 34, borne on the developing roller 31, and used in the developing process again.

In contrast, the transfer residual toner adhering to an exposed area of the photosensitive drum 21 remains on the drum surface without being transferred from the photosensitive drum 21 to the developing roller 31 in the developing portion. The reason is that while the normal charging polarity of the toner is negative, the developing voltage applied to the developing roller 31 has a potential of even negative polarity relative to the potential (light area potential) of the exposed area. The transfer residual toner remaining on the drum surface is borne on the photosensitive drum 21 along with other toner transferred from the developing roller 31 to the exposed area, moves to a transfer area, and is transferred to a recording material P at the transfer area.

As describe above, the present exemplary embodiment employs the cleaner-less configuration where the transfer residual toner is collected into the developing device 30 for reuse. However, a conventional configuration for collecting transfer residual toner by using a cleaning blade in contact with the photosensitive drum 21 can also be employed. In such a case, the transfer residual toner collected by the cleaning blade is collected into a collection container installed separately from the developing device 30. The cleaner-less configuration can eliminate the need for the installation space of the collection container for collecting the transfer residual toner and enable miniaturization of the image forming apparatus 1. In addition, the reuse of the transfer residual toner can reduce printing cost.

[Configuration of Toner Pack]

A configuration of the toner pack 40 that is detachable from and attachable to the image forming apparatus 1 and serves as a replenishment container accommodating toner will now be described. As illustrated in FIGS. 3A to 5, the toner pack 40 includes a shutter member 41, a seal member 504, a replenishment base 501, an outer ring member 510, an inner ring member 511, and a pouch 503, which are assembled into the toner pack 40. The pouch 503 is a flexible container for accommodating toner. A rotation axis z illustrated in a dot-dashed line in FIGS. 3A to 5 is the rotation center line of the toner pack 40.

The replenishment base 501 serving as a container base unit includes an outer peripheral portion 501*b* as a side surface extending along an axial direction D1 parallel to the rotation axis Z, and a toner discharge port 501*r* formed in the outer peripheral portion 501*b*. The replenishment base 501 also includes a radially inward recess 501*f* in the outer peripheral portion 501*b*, and protrusions 501*y* protruding radially outward from the outer peripheral portion 501*b*. The toner discharge port 501*r* is a through hole communicating with the pouch 503. The protrusions 501*y* are located in 180° different phases.

As illustrated in FIGS. 4 to 7, the outer ring member 510 is a resin member having a substantially hexagonal outer periphery. Engagement portions 510*y* with which the protrusions 501*y* of the replenishment base 501 can be engaged are formed on the outer ring member 510. The outer ring member 510 is located to cover the inner ring member 511, and forms the outermost shape of the toner pack 40 to function as a grip in gripping the toner pack 40. In other words, the outer ring member 510 is operated at a position radially farther from the rotation axis z. This can reduce the force with which the user operates the outer ring member 510 and improve usability.

Like the outer ring member 510, the inner ring member 511 serving as a support member is a resin member having a substantially hexagonal outer periphery. The inner ring member 511 is connected to an opening 503*a* (see FIG. 10A) of the pouch 503. The pouch 503 is thus supported at the opening 503*a* such that the opening 503*a* is maintained open by the inner ring member 511. As will be described below, the inner ring member 511 is fixed to the replenishment base 501 such that the opening 503*a* communicates with the toner discharge port 501*r*. The inner ring member 511 and the pouch 503 can be connected by any method. Examples include methods using various adhesives, such as a hotmelt adhesive, and a method for thermally welding the pouch 503 to the inner ring member 511. The outer periphery of the outer ring member 510 desirably has a polygonal or other shape that prevents slippage when the user grips and rotates the outer ring member 510.

The inner ring member 511 has recesses 511*y* with which the protrusions 501*y* can be engaged. The recesses 511*y* have a groove shape through which the protrusions 501*y* can penetrate, and the engagement portions 510*y* have a rib shape to surround the protrusions 501*y*.

Figure 6:
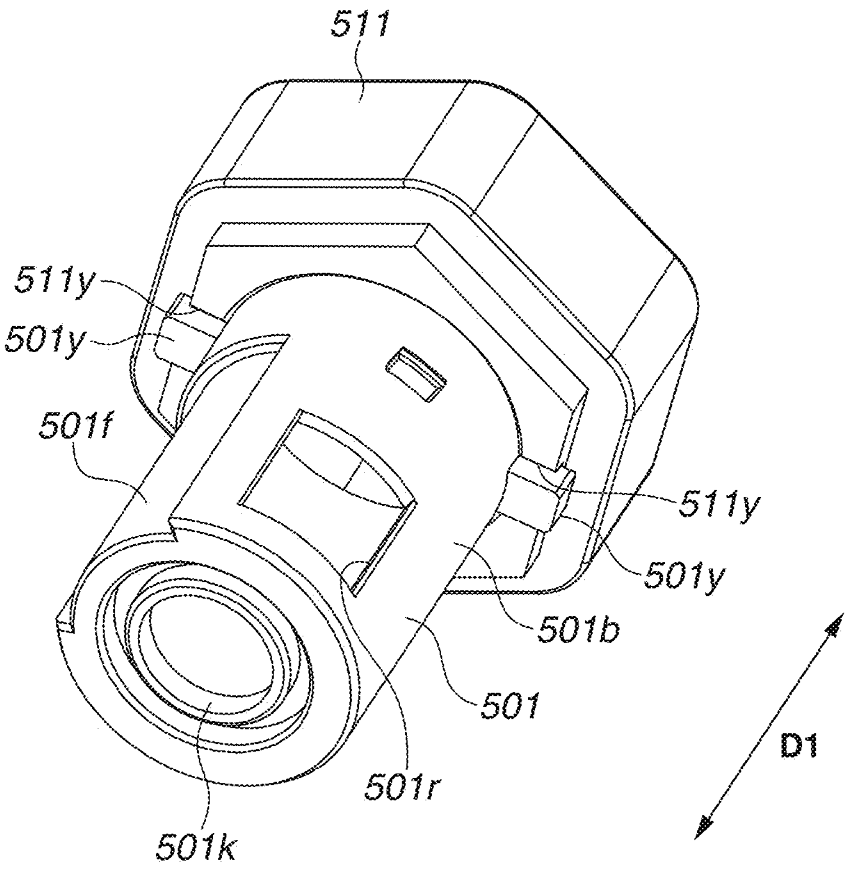
FIG. 6 is a perspective view illustrating an inner ring member and a replenishment base.
Figure 7:
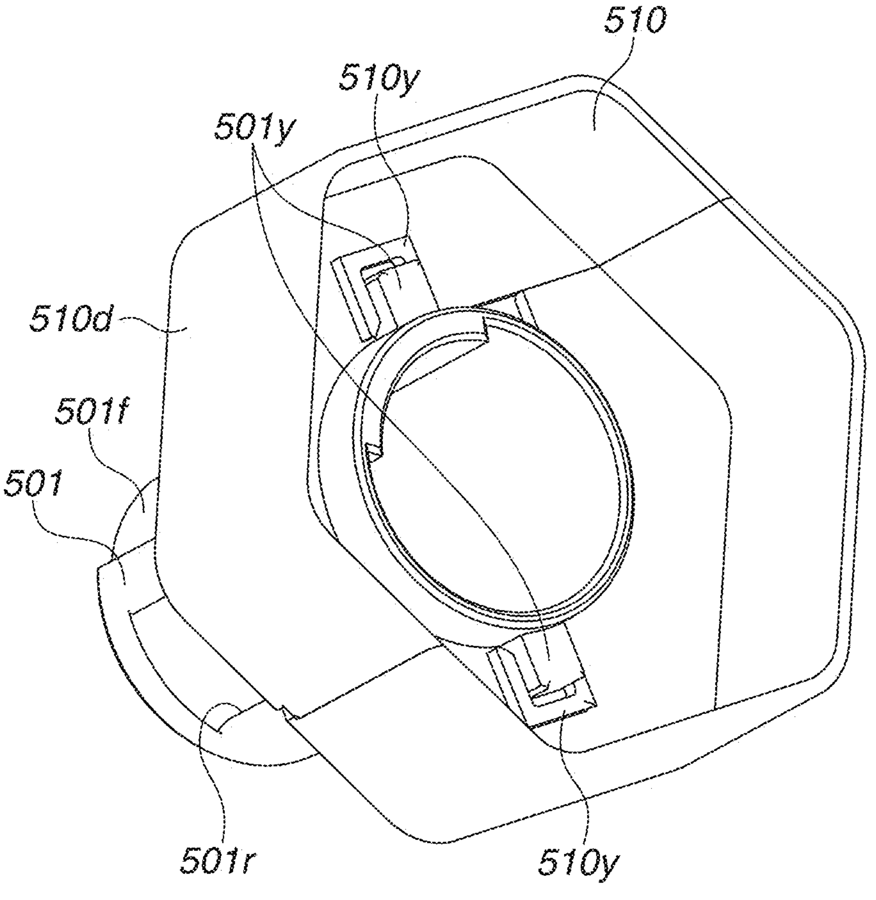
FIG. 7 is a perspective view illustrating an outer ring member and the replenishment base.

As illustrated in FIG. 6, the inner ring member 511 is assembled with the replenishment base 501 such that the protrusions 501*y* are engaged with the recesses 511*y*. As illustrated in FIG. 7, the outer ring member 510 is assembled with the replenishment base 501 such that the protrusions

501*y* are engaged with the engagement portions 510*y*. In such a manner, the outer ring member 510 and the inner ring member 511 are supported by the replenishment base 501 such that rotations relative to the replenishment base 501 are restricted.

Figure 8A:
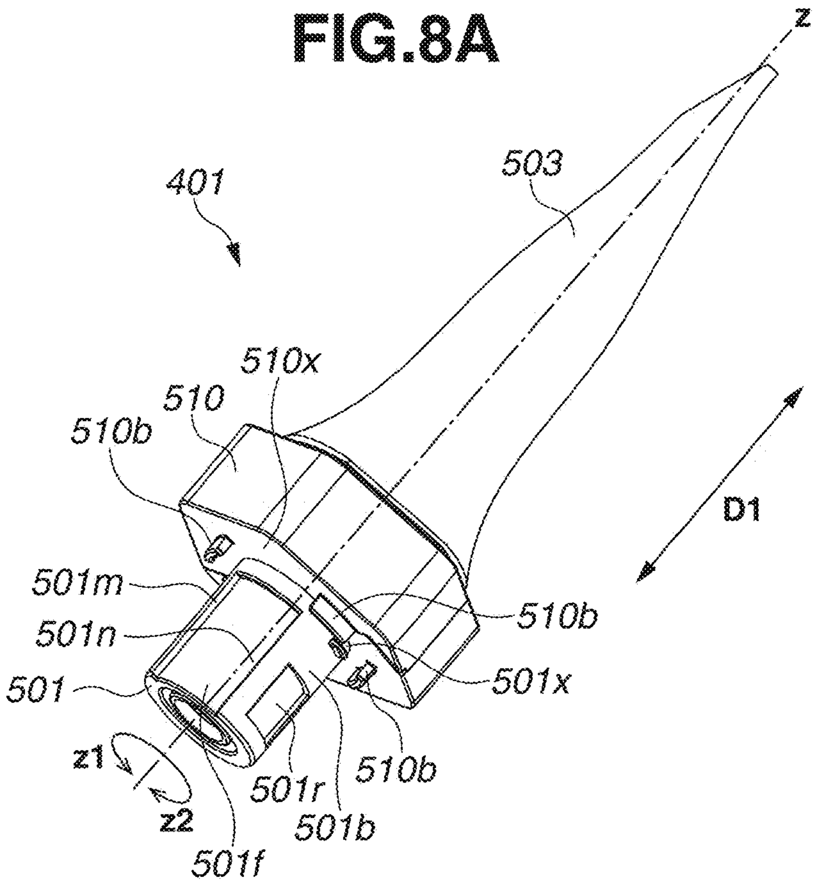
FIGS. 8A and 8B are perspective views illustrating a rotary container unit of the toner pack.
Figure 8B:
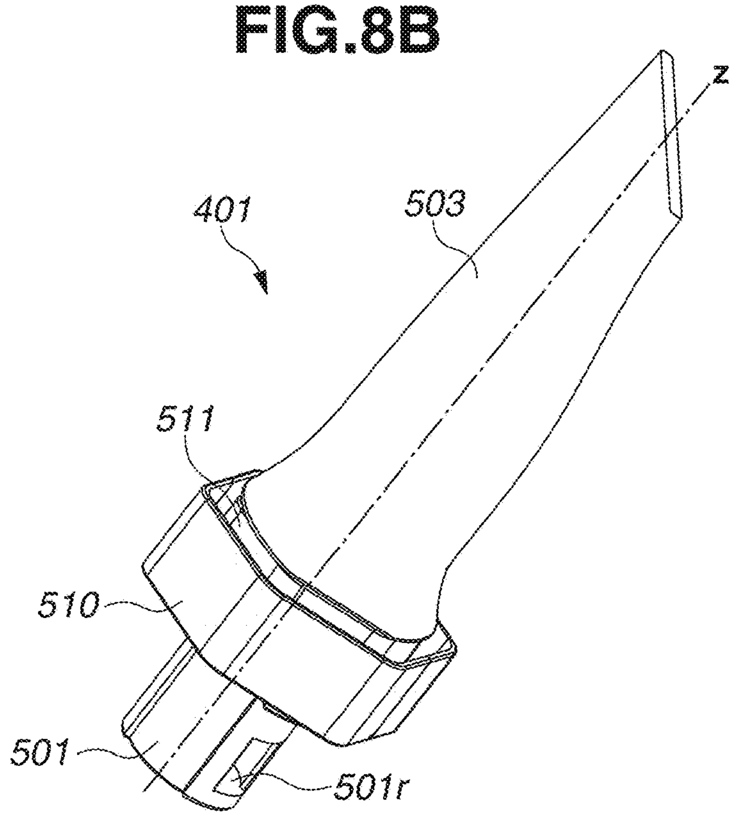

The protrusions 501*y* are further connected to the recesses 511*y* and the engagement portions 510*y* in the axial direction D1 of the rotation axis z and in a radial direction orthogonal to the axial direction D1. For example, the protrusions 501*y* may be pressed into the recesses 511*y* and the engagement portions 510*y*, or connected thereto by welding or by using an adhesive. The replenishment base 501, the outer ring member 510, the inner ring member 511, and the pouch 503 are thereby integrally connected as illustrated in FIGS. 8A and 8B. The outer ring member 510 is a cylindrical member having an outer periphery 510*d* located at a position farther from the rotation axis z than the replenishment base 501 is in terms of radial directions orthogonal to the axial direction D1. The inner ring member 511 is fixed to the replenishment base 501 inside the outer ring member 510.

Figure 5:
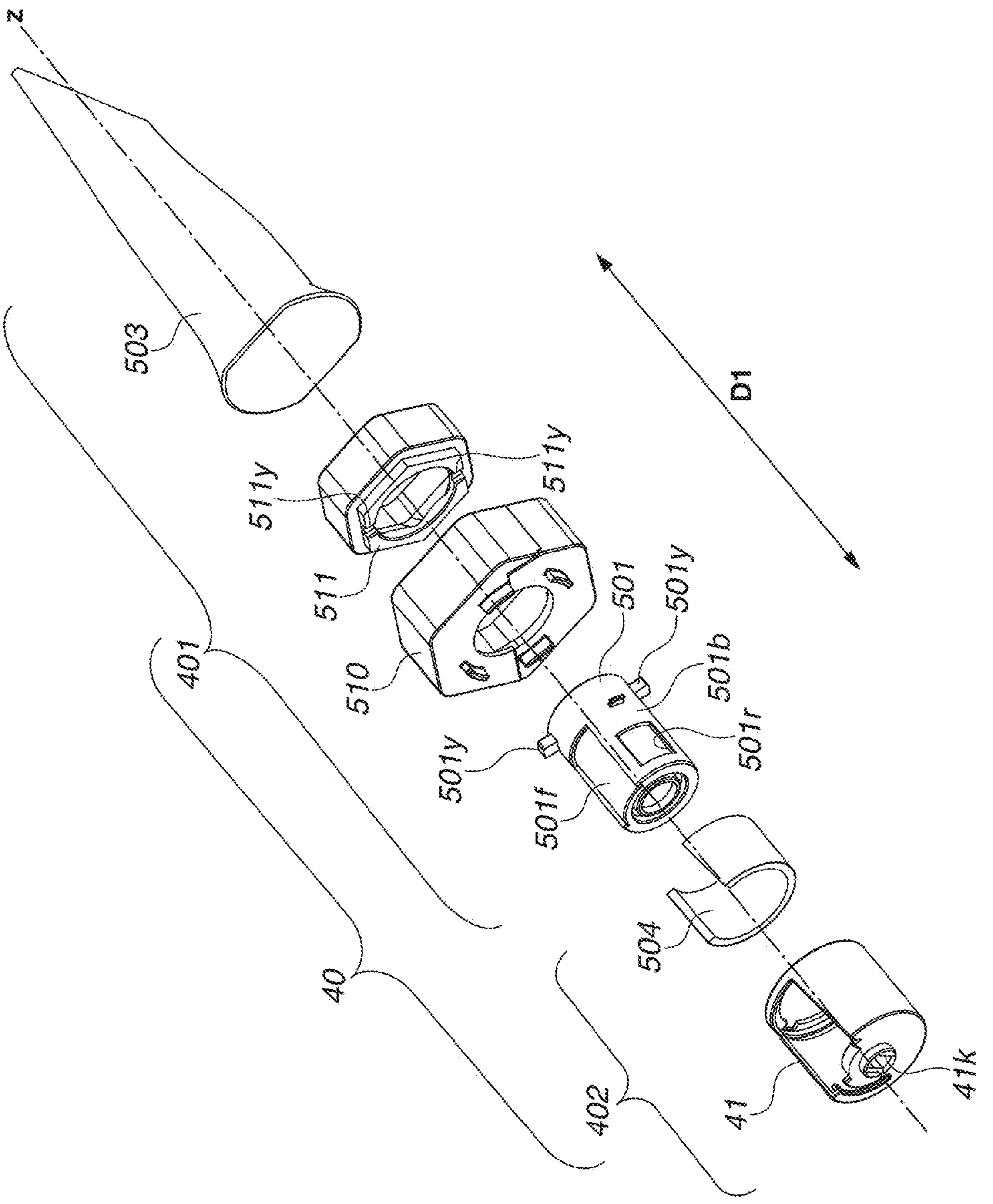
FIG. 5 is an exploded perspective view illustrating the toner pack.

The replenishment base 501, the outer ring member 510, the inner ring member 511, and the pouch 503 integrally connected will hereinafter be referred to as a rotary container unit 401. The shutter member 41 and the seal member 504 integrally connected as will be described below will be referred to as a container shutter unit 402. In other words, as illustrated in FIG. 5, the toner pack 40 includes the container shutter unit 402, and the rotary container unit 401 that is rotatable relative to the container shutter unit 402. As illustrated in FIG. 8A, the rotary container unit 401 is located to be rotatable with respect to the container shutter unit 402 about the rotation axis z in a direction z1 and a direction z2 opposite to the direction z1.

Figure 9A:
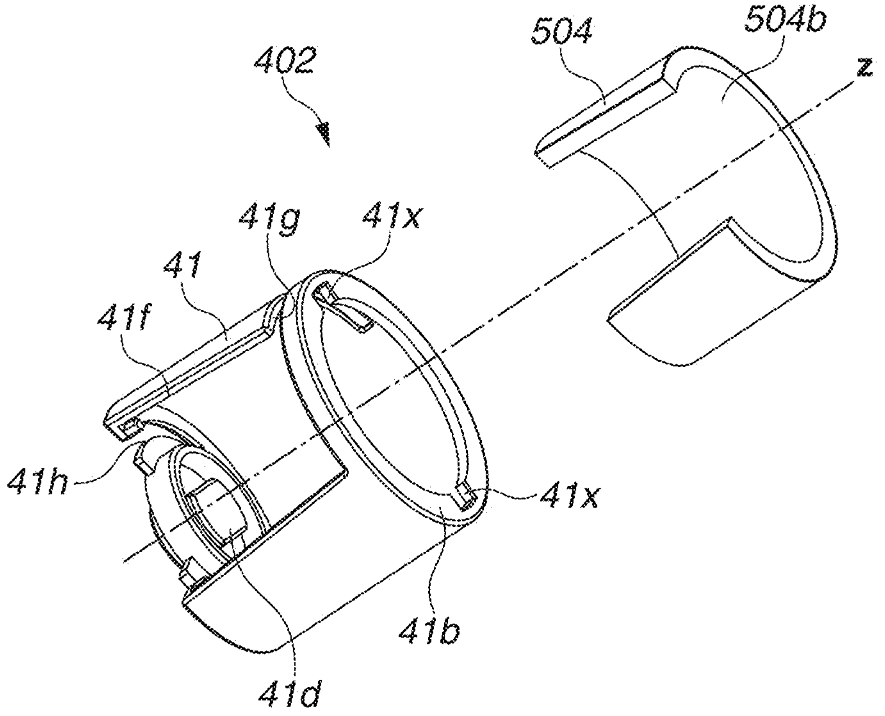
FIG. 9A is an exploded perspective view illustrating a shutter member and a seal member.
Figure 9B:
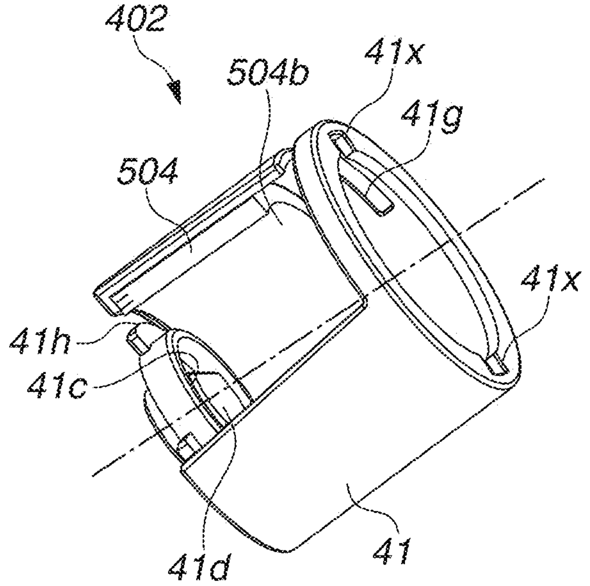
FIG. 9B is a perspective view illustrating the shutter member and the seal member.

As illustrated in FIGS. 9A and 9B, the shutter member 41 serving as a container shutter is a resin member of substantially cylindrical shape. The shutter member 41 has a cutout 41*f* and grooves 41*g* and 41*h*. The cutout 41*f* and the groove 41*g* are formed in the outer peripheral portion of the shutter member 41. The groove 41*h* is formed in the bottom portion of the shutter member 41. The cutout 41*f* has a substantially rectangular shape. The groove 41*g* is formed to extend circumferentially within a partial range (approximately 90°) in the circumferential direction of the shutter member 41. The groove 41*h* is formed to extend circumferentially in the bottom portion within a partial range (approximately 90°) in the circumferential direction of the shutter member 41.

The seal member 504 is made of a material, such as elastically deformable foamed urethane and unwoven fabric, and fixed to the inner surface of the shutter member 41 by, for example, a double-sided adhesive tape. More specifically, the seal member 504 is located at a position different from the cutout 41*f* of the shutter member 41. In other words, the seal member 504 and the shutter member 41 are integrally connected to constitute the container shutter unit 402. The container shutter unit 402 can thus prevent toner leakage at the interface between the seal member 504 and the shutter member 41.

As illustrated in FIGS. 8A to 10B, in assembling the rotary container unit 401 with the container shutter unit 402, ribs 501*x* protruding from the outer peripheral portion 501*b* of the replenishment base 501 are aligned with recesses 41*x* formed in the shutter member 41. FIG. 10A illustrates a state where the rotary container unit 401 and the container shutter unit 402 are assembled with the ribs 501*x* through the recesses 41*x*. Here, a cylindrical portion 41*c* of the shutter member 41 is inserted into an inner diameter portion 501*e* of groove shape, formed in the end portion of the replenishment base 501. The inner diameter portion 501*e* and the cylindrical portion 41*c* are a cylindrical groove and a cylindrical protrusion, respectively, that are concentric about the rotation axis z. The insertion of the cylindrical portion 41*c* (annular rib) into the inner diameter portion 501*e* (annular groove) thus guides the replenishment base 501 rotatably about the rotation axis z with respect to the shutter member 41.

The replenishment base 501 further has a hole 501*k* located radially inside the inner diameter portion 501*e* (see FIG. 6). The shutter member 41 includes an attachment portion 41*d* (see FIG. 9A) to be inserted into the hole 501*k*. A to-be-engaged portion 41*k* open to the end side of the toner pack 40 is formed in the attachment portion 41*d*. The to-be-engaged portion 41*k* defines a double D hole. The attachment portion 41*d* has a protruding double D shape corresponding to the shape of the to-be-engaged portion 41*k*. The outermost diameter of the attachment portion 41*d* is designed to be smaller than the inner diameter of the hole 501*k*, so that the attachment portion 41*d* can rotate freely inside the hole 501*k*.

A plurality of (in the present exemplary embodiment, four) ribs 510*b* extending in the axial direction D1 is formed on an end face 510*x* on the shutter member 41 side of the outer ring member 510. As illustrated in FIG. 10B, a base end portion 41*b* of the shutter member 41 is surrounded by the end face 510*x* and the ribs 501*x*, whereby the movement of the base end portion 41*b* of the shutter member 41 is restricted in the axial direction D1 and radial directions orthogonal to the axial direction D1. The rotary container unit 401 including the replenishment base 501 is thereby attached to the container shutter unit 402 including the shutter member 41 such that the rotary container unit 401 is rotatable relative to the container shutter unit 402 about the rotation axis z and restricted in movement in the axial direction D1 and the radial directions.

The seal member 504 fixed to the shutter member 41 has a sliding surface 504*b* that slides over the outer peripheral portion 501*b* of the replenishment base 501. The seal member 504 is pressed and deformed by the outer peripheral portion 501*b* toward the shutter member 41, i.e., outward in the radial directions orthogonal to the axial direction D1, whereby a surface pressure occurs between the outer peripheral portion 501*b* and the sliding surface 504*b*. This can prevent toner leakage at the interface between the seal member 504 and the replenishment base 501.

More specifically, when viewed in the axial direction D1 of the rotation axis z, the replenishment base 501 and the shutter member 41 are cylindrical members. The replenishment base 501 is configured to rotate inside the shutter member 41 about the rotation axis z along an inner periphery of the shutter member 41.

Figure 10A:
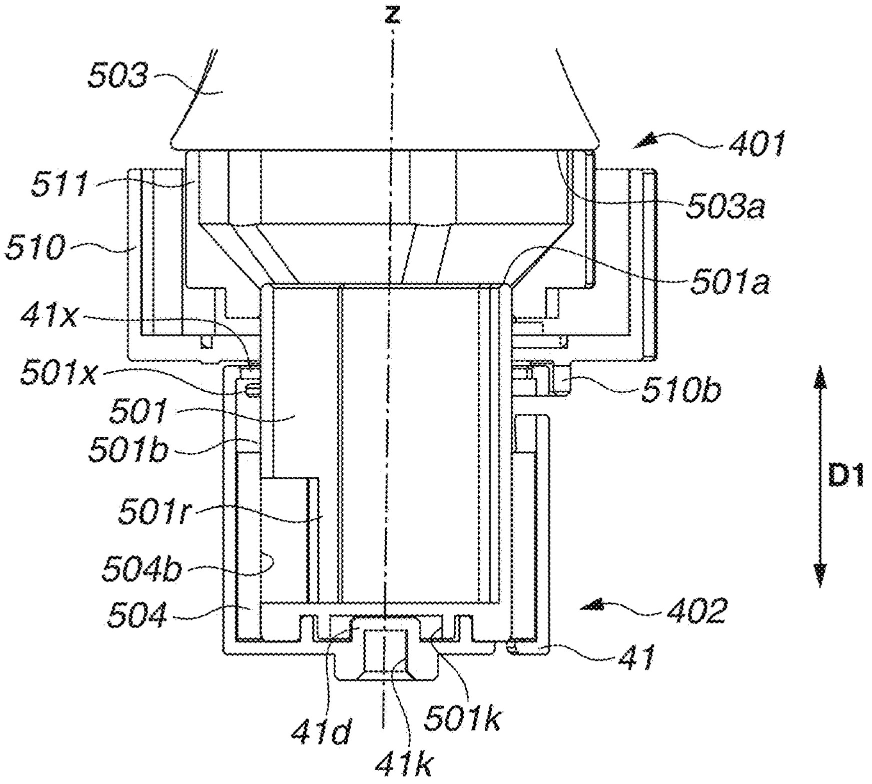
FIG. 10A is a sectional view illustrating the toner pack in a blocked state.
Figure 10B:
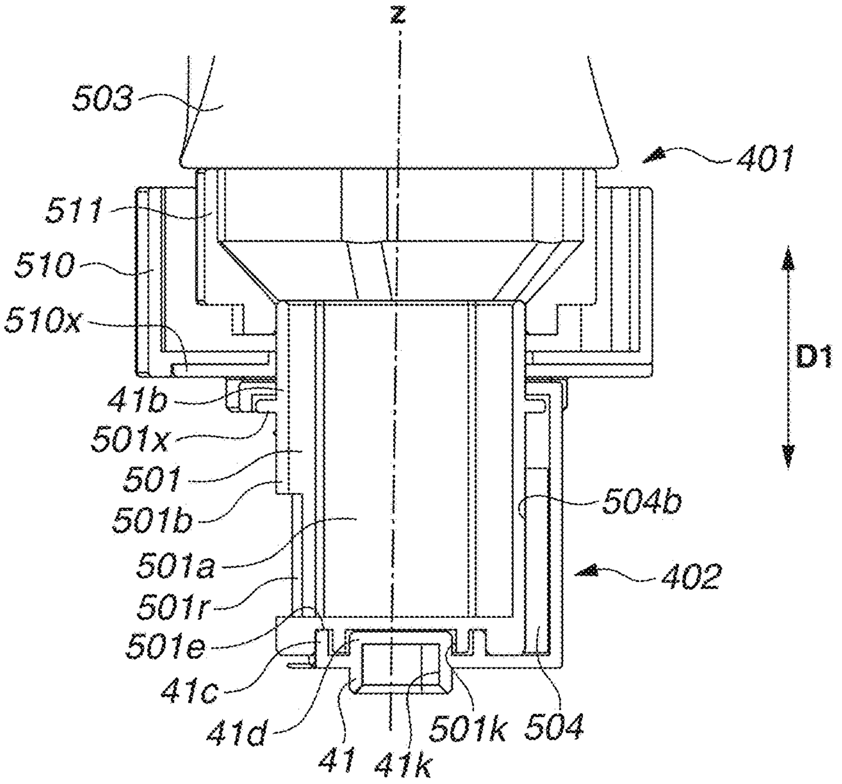
FIG. 10B is a sectional view illustrating the toner pack in an open state.
Figure 11A:
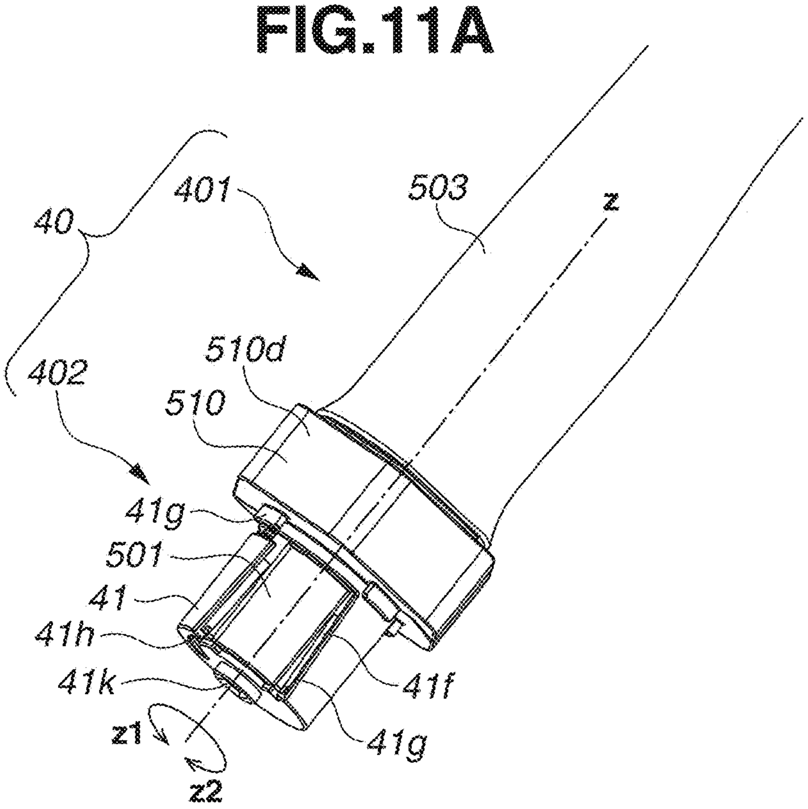
FIG. 11A is a perspective view illustrating the toner pack in the blocked state.

FIGS. 10A and 11A illustrate a state where the toner discharge port 501*r* formed in the replenishment base 501 is blocked by the shutter member 41 and the seal member 504. Here, the toner accommodated in the pouch 503 can move to the toner discharge port 501*r* through the opening 503*a* of the pouch 503, the inner space of the inner ring member 511, the opening 501*a* of the replenishment base 501, and the inner space of the replenishment base 501. However, with the toner pack 40 alone, the toner accommodated in the pouch 503 is sealed from leaking out since the toner discharge port 501*r* is blocked by the shutter member 41 and the seal member 504. The opening 503*a* of the pouch 503 is located at one end of the pouch 503 in the axial direction D1.

Figure 11B:
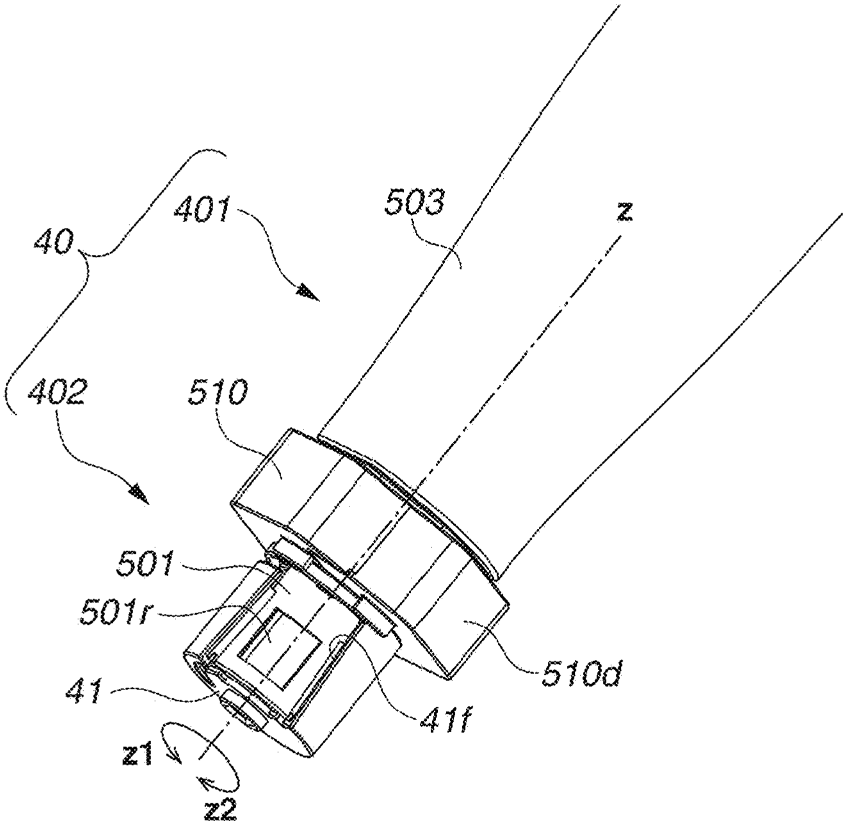
FIG. 11B is a perspective view illustrating the toner pack in the open state.

FIGS. 10B and 11B illustrate a state where the toner discharge port 501*r* formed in the replenishment base 501 is not blocked by the shutter member 41 or the seal member 504 but opened up. Here, the toner discharge port 501*r* is positioned to face the cutout 41*f* in the shutter member 41, and the toner accommodated in the pouch 503 can be discharged out of the toner pack 40 via the toner discharge port 501*r* and the cutout 41*f*.

For example, the state of the toner pack 40 illustrated in FIG. 11A will be referred to as a blocked state, and the state of the toner pack 40 illustrated in FIG. 11B will be referred to as an open state. In such a case, the toner pack 40 in the blocked state enters the open state when the rotary container unit 401 is rotated about the rotation axis z by approximately 90° in the direction of the arrow z1. The toner pack 40 in the open state enters the blocked state when the rotary container unit 401 is rotated about the rotation axis z by approximately 90° in the direction of the arrow z2. How much to rotate the rotary container unit 401 to bring the toner pack 40 into the open state or the blocked state can be freely set.

As illustrated in FIG. 11A, the position of the replenishment base 501 when the toner pack 40 is in the blocked state will be referred to as a blocked position or a first blocked position. As illustrated in FIG. 11B, the position of the replenishment base 501 when the toner pack 40 is in the open state as will be referred to as an open position or a first open position.

With the replenishment base 501 at the blocked position, the toner discharge port 501*r* is blocked by the shutter member 41. With the replenishment base 501 at the open position, the toner discharge port 501*r* is opened by the shutter member 41 so that the toner in the pouch 503 is discharged out of the toner pack 40 via the toner discharge port 501*r*.

After the toner pack 40 is attached to the developing container 32, the user grips the outer periphery 510*d* of the outer ring member 510 and rotates the outer ring member 510 about the rotation axis z in the direction of the arrow z1. This also rotates the replenishment base 501 about the rotation axis z in the direction of the arrow z1, and the toner discharge port 501*r* of the replenishment base 501 is exposed through the cutout 41*f*. As a result, the toner pack 40 shifts from the blocked state to the open state, and the toner in the pouch 503 can be discharged out of the toner pack 40. The axial direction D1 parallel to the rotation axis z is a direction along the vertical direction. The direction of attachment of the toner pack 40 to the image forming apparatus 1 is a direction along the axial direction D1. In other words, the toner pack 40 is configured to be attached to the image forming apparatus 1 such that the axial direction D1, which is the direction of the rotation axis z, agrees with the direction along the vertical direction.

Examples of the material of the pouch 503 include resins, such as polyethylene (PE), polypropylene (PP), polyethylene terephthalate (PET), and composite materials of the same, and composite materials of unwoven fabric or paper with the foregoing resins. If the pouch 503 is made of a material that can be deformed by the user, the user can press or squeeze the pouch 503 with fingers to easily discharge the toner in the pouch 503.

After finishing discharging the toner in the pouch 503 into the developing container 32, the user grips the outer periphery 510*d* of the outer ring member 510 and rotates the outer ring member 510 about the rotation axis z in the direction of the arrow z2. This also rotates the replenishment base 501 about the rotation axis z in the direction of the arrow z2, and the toner discharge port 501*r* of the replenishment base 501 is blocked by the shutter member 41 and the seal member 504. As a result, the toner pack 40 shifts from the open state to the blocked state, and the toner pack 40 can be detached from the developing container 32.

[Toner Reception Unit of Developing Container]

The toner reception unit 600 located on the developing container 32 will now be described. As illustrated in FIGS. 12A to 15, the toner reception unit 600 includes a reception base unit 602 and a reception shutter unit 601. The reception shutter unit 601 is supported to be rotatable about the rotation axis z with respect to the reception base unit 602.

Figure 12A:
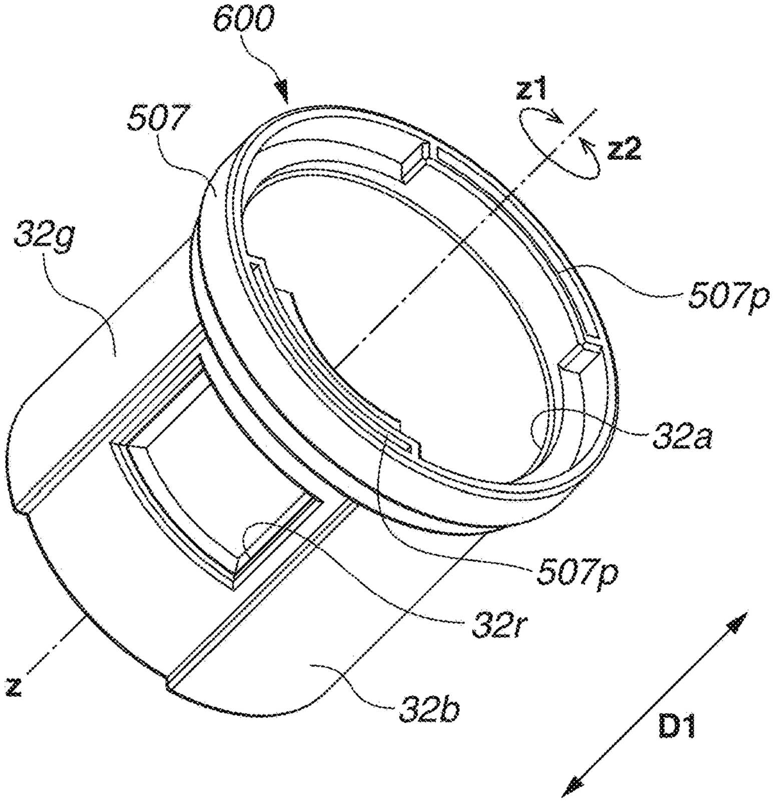
FIG. 12A is a perspective view illustrating a toner reception unit in a blocked state.
Figure 12B:
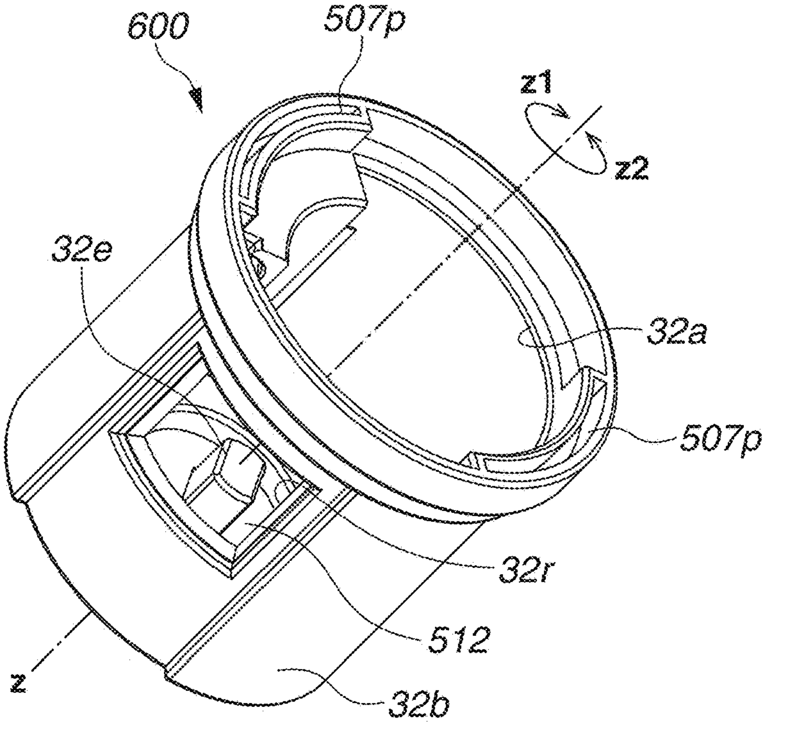
FIG. 12B is a perspective view illustrating the toner reception unit in an open state.
Figure 13A:
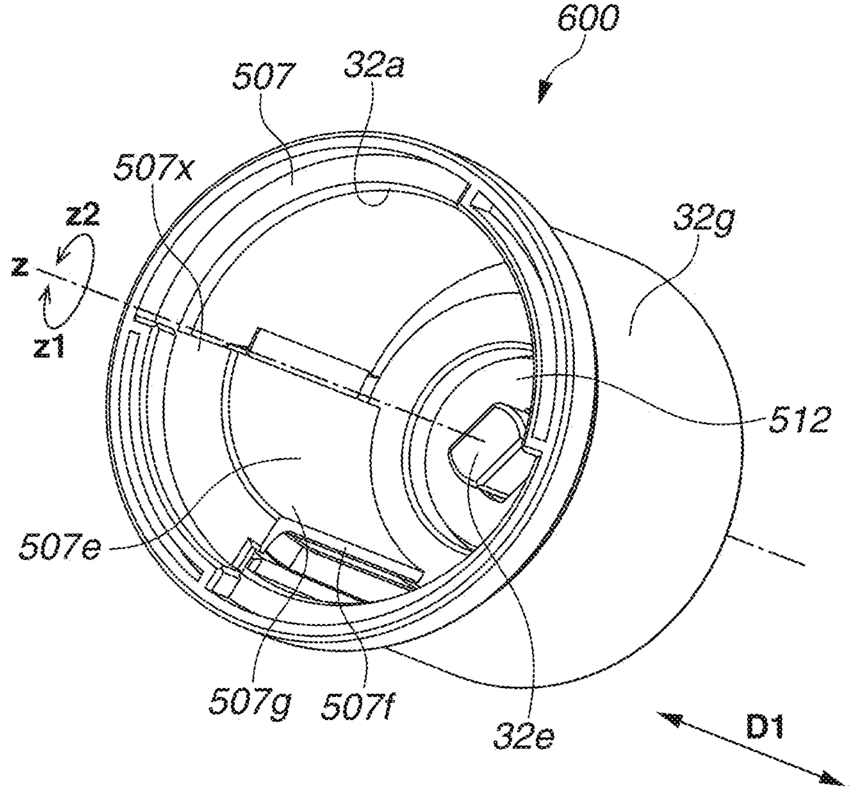
FIG. 13A is a perspective view illustrating the toner reception unit in the blocked state.
Figure 13B:
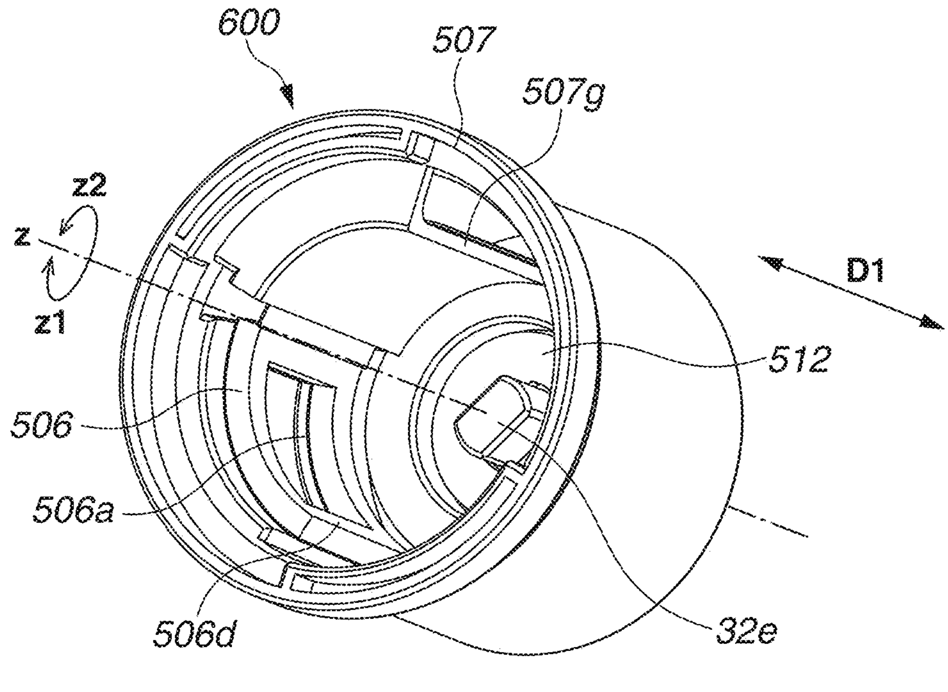
FIG. 13B is a perspective view illustrating the toner reception unit in the open state.
Figure 14:
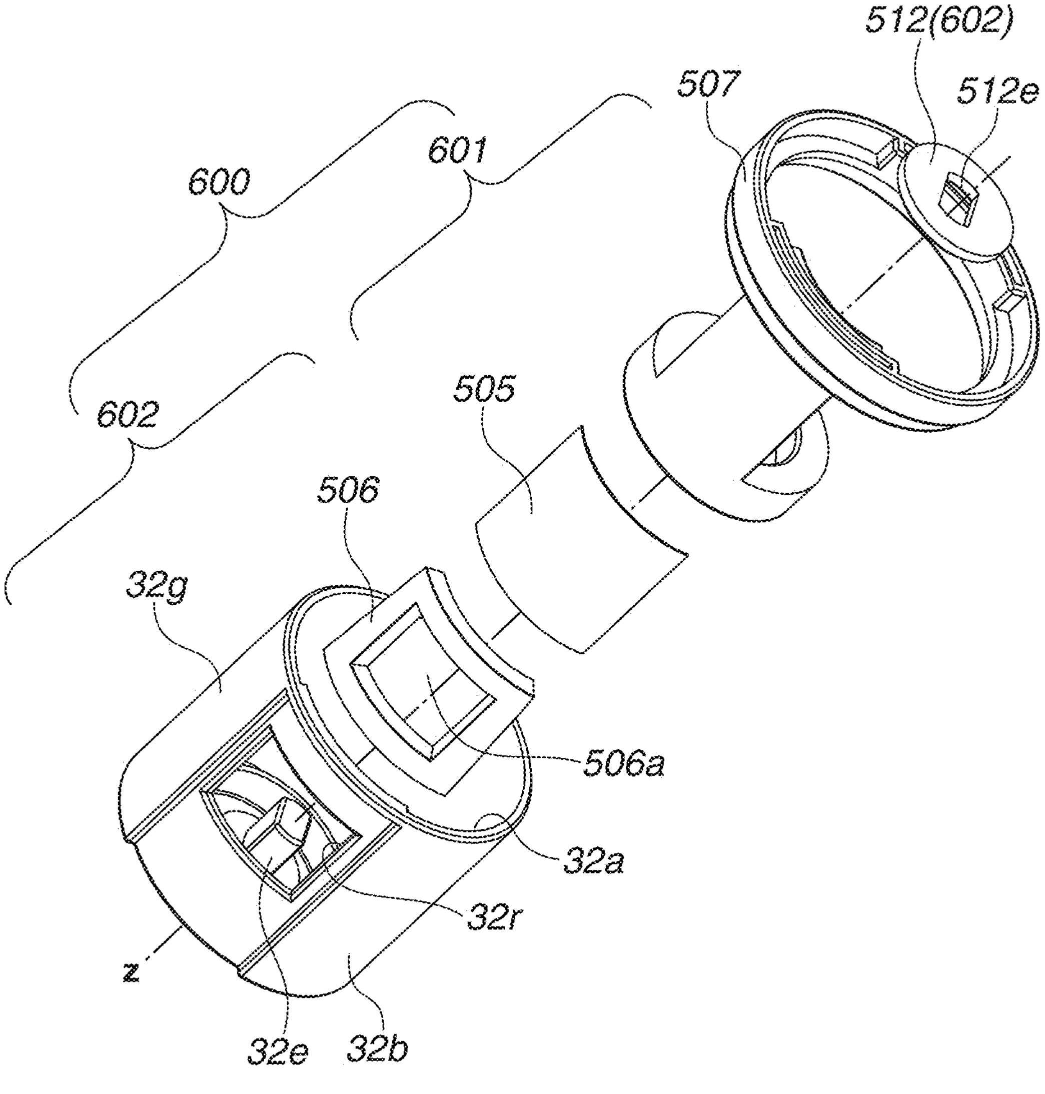
FIG. 14 is an exploded perspective view illustrating the toner reception unit.

FIGS. 12A and 13A illustrate a state where a toner supply port 32*r* communicating with the accommodation unit 36 is blocked. FIGS. 12B and 13B illustrate a state where the toner supply port 32*r* is open. The state of the toner reception unit 600 with the toner supply port 32*r* blocked as illustrated in FIGS. 12A and 13A will hereinafter be referred to as a blocked state. The state of the toner reception unit 600 with the toner supply port 32*r* open as illustrated in FIGS. 12B and 13B will be referred to as an open state.

The reception base unit 602 includes a cylindrical portion 32*g* serving as a main body base portion of substantially cylindrical shape, a base seal 506, and a shutter retaining member 512. In the present exemplary embodiment, the cylindrical portion 32*g* is integrally formed on the developing container 32 (see FIG. 1). However, this is not restrictive. For example, the cylindrical portion 32*g* may be made of a member separate from the developing container 32 and fixed to the developing container 32. The cylindrical portion 32*g* may be located on a part of the printer body 100 other than the developing container 32 and configured such that the developing container 32 is replenished with toner via the cylindrical portion 32*g*.

Figure 19A:
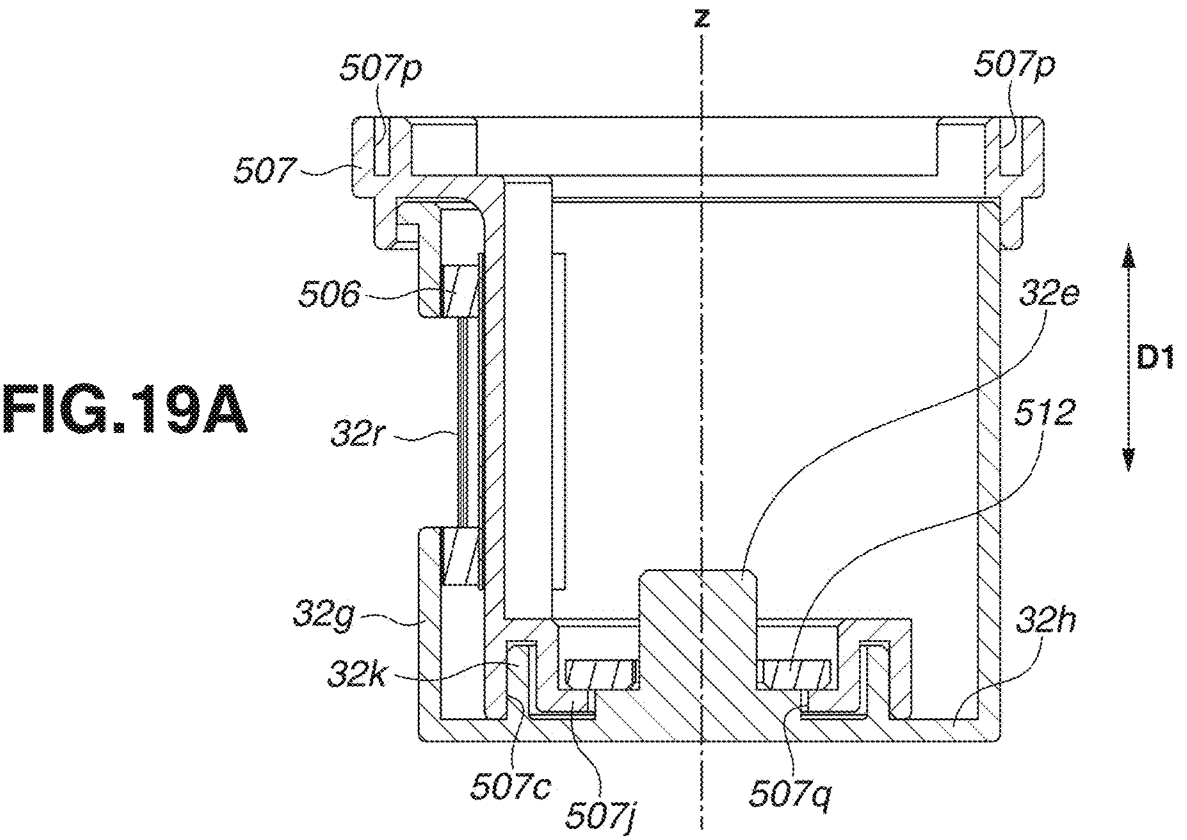
FIG. 19A is a sectional view illustrating the toner reception unit in the blocked state.

The cylindrical portion 32*g* includes a replenishment port 32*a*, an outer peripheral portion 32*b*, and the toner supply port 32*r*. The replenishment port 32*a* is intended to replenish the accommodation unit 36 (see FIG. 1) of the developing container 32 with the toner from the toner pack 40. The outer peripheral portion 32*b* is a side surface extending in the axial direction D1. The toner supply port 32*r* is formed in the outer peripheral portion 32*b*. The cylindrical portion 32*g* also includes an engagement portion 32*e* protruding from a bottom surface 32*h* (see FIG. 19A) upward in the axial direction D1. As will be described below, the engagement portion 32*e* is engaged with the to-be-engaged portion 41*k* of the shutter member 41. Specifically, the engagement portion 32*e* has a double D boss shape corresponding to the to-be-engaged portion 41*k* of double D hole shape.

The engagement portion 32*e* is pressed into a hole 512*e* of the shutter retaining member 512. The hole 512*e* is therefore given a double D hole shape similarly to the engagement portion 32*e*. The shutter retaining member 512 is attached to the engagement portion 32*e* of the cylindrical portion 32*g* after a shutter member 507 of the reception shutter unit 601 is assembled with the cylindrical portion 32*g*. While in the present exemplary embodiment the shutter retaining member 512 is pressed into and thereby fixed to the engagement portion 32*e* of the cylindrical portion 32*g*, this is not restrictive. For example, the shutter retaining member 512 may be fixed to the cylindrical portion 32*g* by a method using welding or an adhesive.

Figure 16A:
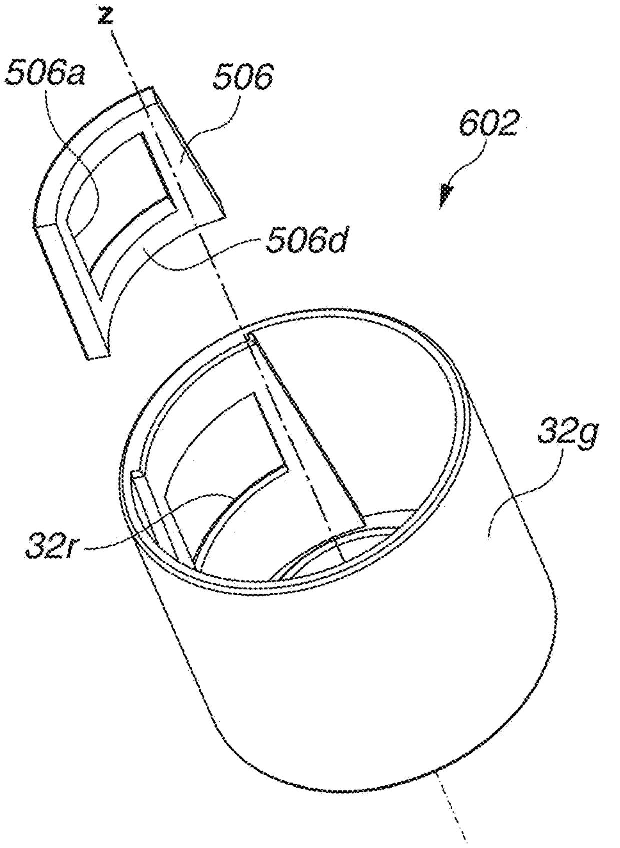
FIG. 16A is an exploded perspective view illustrating a cylindrical portion and a base seal.
Figure 16B:
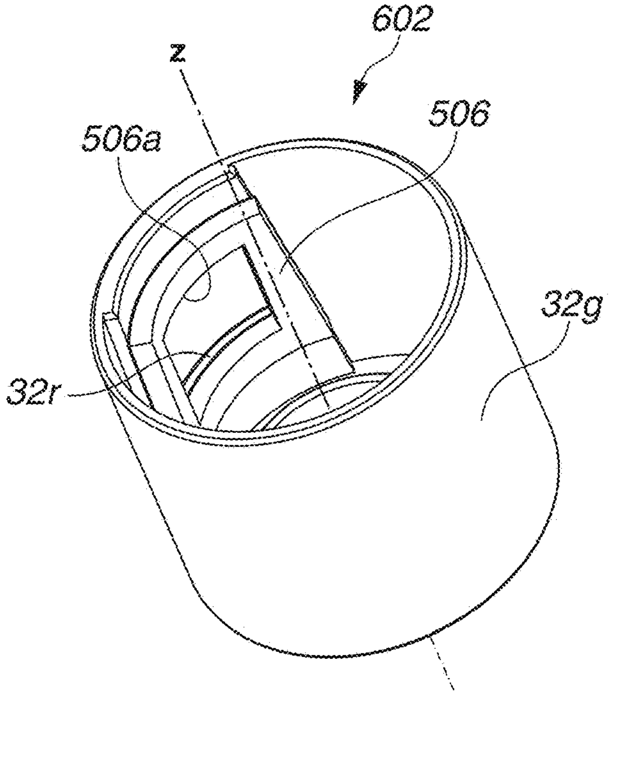
FIG. 16B is a perspective view illustrating the cylindrical portion and the base seal.

As illustrated in FIGS. 16A and 16B, the base seal 506 is made of a material, such as elastically deformable foamed urethane and unwoven fabric, and fixed to the cylindrical portion 32*g* by, for example, a double-sided adhesive tape. The base seal 506 can thereby prevent toner leakage at the interface between the base seal 506 and the cylindrical portion 32*g*. The base seal 506 has an opening 506*a* at a position corresponding to the toner supply port 32*r*. The toner passed through the opening 506*a* is supplied to the accommodation unit 36 (see FIG. 1) of the developing container 32 through the toner supply port 32*r*.

As illustrated in FIGS. 12A to 15, 17A, and 17B, the reception shutter unit 601 includes the shutter member 507 and a shutter sheet 505. The developing container 32 (see FIG. 1) includes the accommodation unit 36, the cylindrical portion 32*g*, and shutter member 507, and rotatably supports the developing roller 31. The toner pack 40 is configured to be attachable to the developing container 32.

Figure 17A:
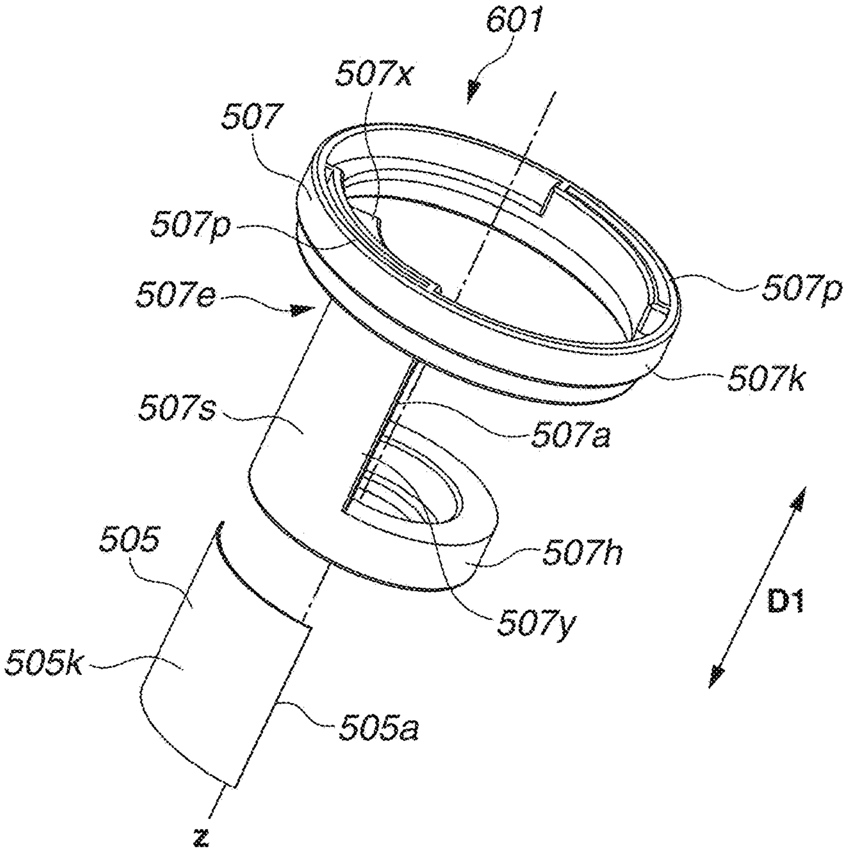
FIG. 17A is an exploded perspective view illustrating a shutter member and a shutter sheet.

The shutter member 507 includes an inner diameter portion 507*h*, an outer diameter portion 507*k*, and a protrusion 507*e* connecting the inner portion 507*h* and the outer diameter portions 507*k*. The protrusion 507*e* protrudes radially inward from the outer diameter portion 507*k*. As illustrated in FIGS. 17A, the protrusion 507*e* includes a horizontal portion 507*x* of substantially sector shape and an extension portion 507*s* extending in the axial direction D1. The horizontal portion 507*x* is configured to be able to pass through the groove 41*g* (see FIG. 9A) in the shutter member 41 of the toner pack 40. The extension portion 507*s* is configured to be able to pass through the groove 41*h* (see FIG. 9A) in the shutter member 41.

Figure 17B:
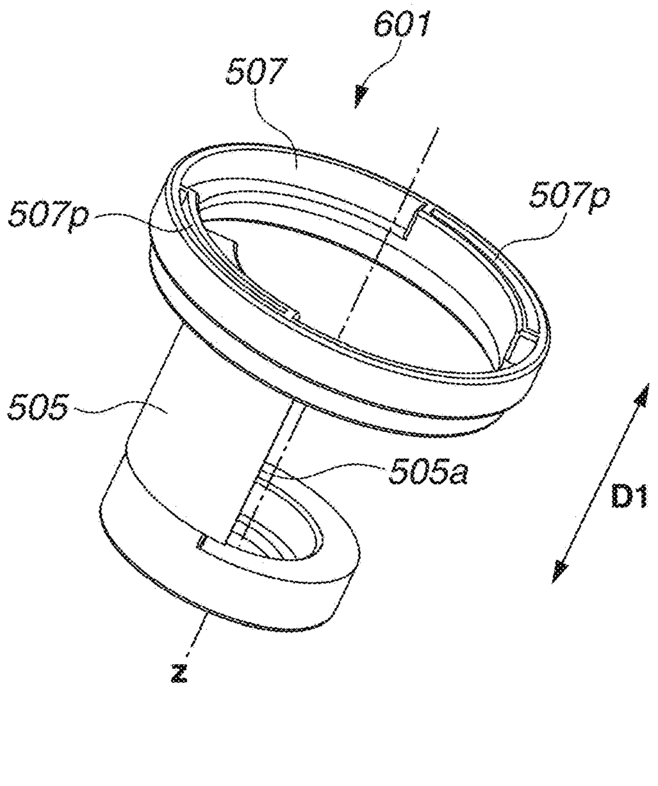
FIG. 17B is a perspective view illustrating the shutter member and the shutter sheet.

As illustrated in FIGS. 17A and 17B, the shutter sheet 505 is fixed to the outer periphery of the extension portion 507*s* by, for example, a two-sided adhesive tape. The shutter sheet 505 is a film having a thickness of approximately 100 μm. The shutter sheet 505 is located such that an end portion 505*a* of the shutter sheet 505 protrudes from an edge portion 507*a* of the extension portion 507*s*. A sliding surface 505*k* of the shutter sheet 505 is configured to be slidable over a sliding surface 506*d* (see FIG. 16A) of the base seal 506.

The outer diameter portion 507*k* of the shutter member 507 has grooves 507*p* with which the ribs 510*b* (see FIG. 8A) formed on the outer ring member 510 of the toner pack 40 can be engaged. The grooves 507*p* are radially opposed to each other and formed to extend circumferentially within a partial area (approximately 90°) in the circumferential direction of the outer diameter portion 507*k*. The top portion of the outer diameter portion 507*k* is thus divided into four sections by the grooves 507*p*, and the four ribs 510*b* on the outer ring member 510 are engaged with the four sections. The toner pack 40 is thereby configured to be rotatable only within a range of approximately 90° when attached to the toner reception unit 600. This clearly defines the range of a rotating operation on the rotary container unit 401 of the toner pack 40 in replenishing the developing container 32 with the toner from the toner pack 40, and can improve usability.

Figure 18:
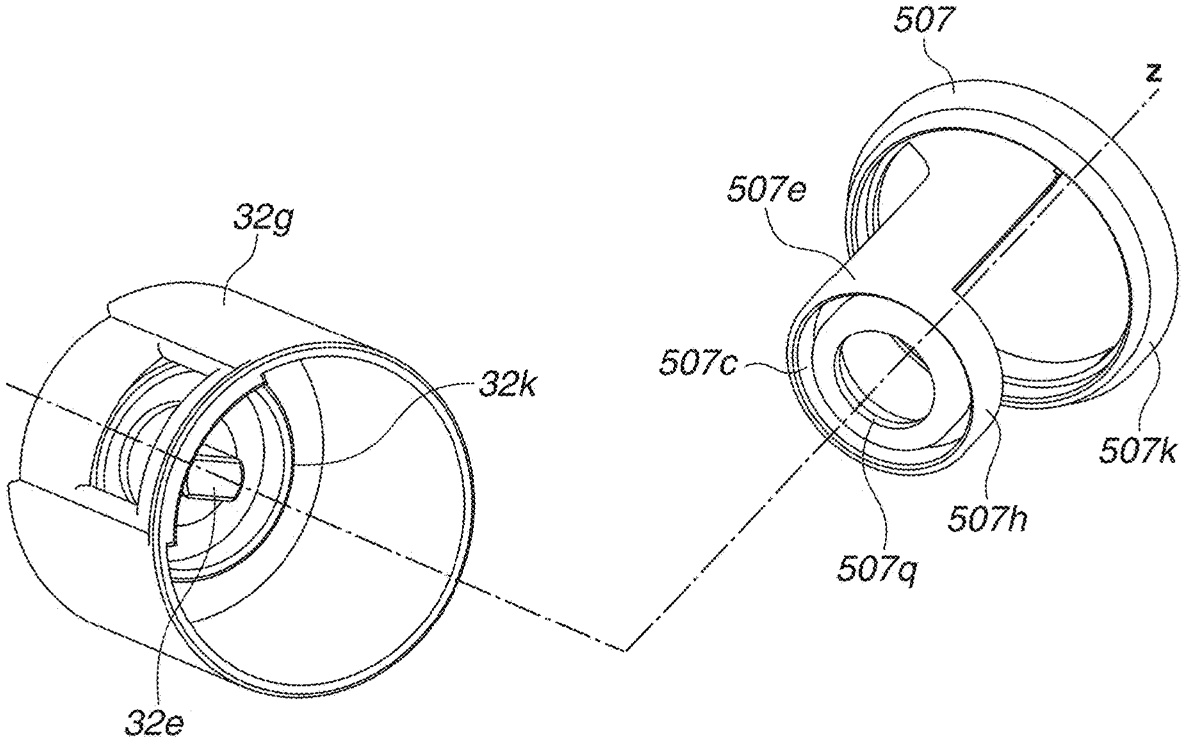
FIG. 18 is an exploded perspective view illustrating the cylindrical portion and the shutter member.
Figure 19B:
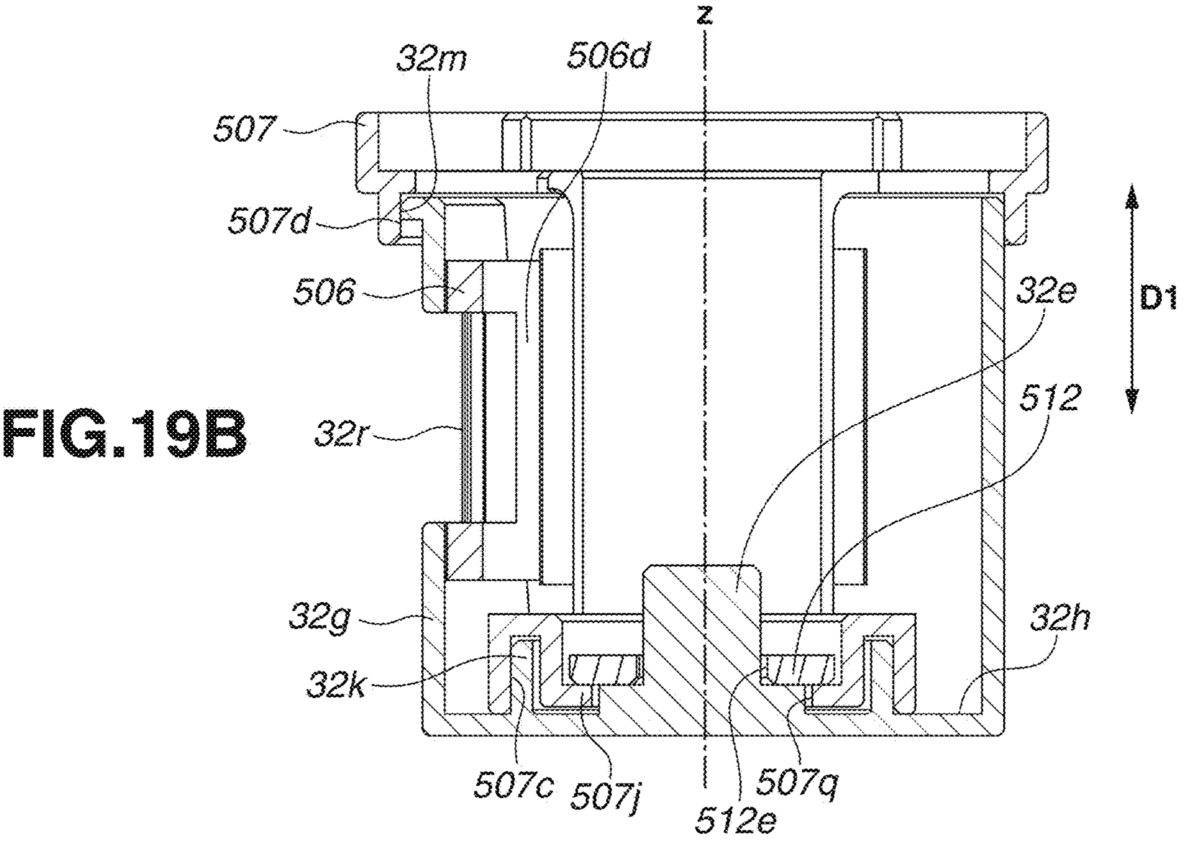
FIG. 19B is a sectional view illustrating the toner reception unit in the open state.

As illustrated in FIG. 18, the inner diameter portion 507*h* of the shutter member 507 has a guide groove 507*c*. A guide rib 32*k* of the cylindrical portion 32*g* is inserted into the guide groove 507*c*. As illustrated in FIGS. 18 to 19B, the guide groove 507*c* and the guide rib 32*k* are a cylindrical groove and a cylindrical protrusion, respectively, that are concentric about the rotation axis z. The insertion of the guide rib 32*k* into the guide groove 507*c* guides the shutter member 507 rotatably about the rotation axis z with respect to the cylindrical portion 32*g*.

An inner periphery 507*d* of the shutter member 507 is located to be slidable over a rib 32*m* of the cylindrical portion 32*g*. The shutter member 507 is thus supported rotatably about the rotation axis z with respect to the cylindrical portion 32*g*.

The inner diameter portion 507*h* of the shutter member 507 has a hole 507*q* that is located radially inside the guide groove 507*c*. The engagement portion 32*e* is inserted through the hole 507*q*. The hole 507*q* has an inner diameter greater than the outermost diameter of the engagement portion 32*e*, and the shutter member 507 can rotate freely without interfering with the engagement portion 32*e*.

After the shutter member 507 is assembled with the cylindrical portion 32*g*, the shutter retaining member 512 is pressed onto the engagement portion 32*e*. A rib 507*j* of the shutter member 507 is thereby sandwiched between the bottom surface 32*h* of the cylindrical portion 32*g* and the shutter retaining member 512 in the axial direction D1. As a result, the movement of the shutter member 507 in the axial direction D1 is restricted. In other words, the reception shutter unit 601 including the shutter member 507 is attached to the reception base unit 602 including the cylindrical portion 32*g* and the shutter retaining member 512 to be relatively rotatable about the rotation axis z and not movable in the axial direction D1 or radially.

The base seal 506 fixed to the cylindrical portion 32*g* is pressed and deformed by the shutter sheet 505 fixed to the shutter member 507 toward the cylindrical portion 32*g*, i.e., outward in radial directions orthogonal to the axial direction D1. This produces a surface pressure between the sliding surface 506*d* of the base seal 506 and the sliding surface 505*k* (see FIG. 17A) of the shutter sheet 505. With the developing container 32 alone, the toner accommodated in the developing container 32 can thus be prevented from leaking through the interface between the base seal 506 and the shutter sheet 505.

[Coupling of Toner Pack with Cylindrical Portion of Developing Container]

Figure 3A:
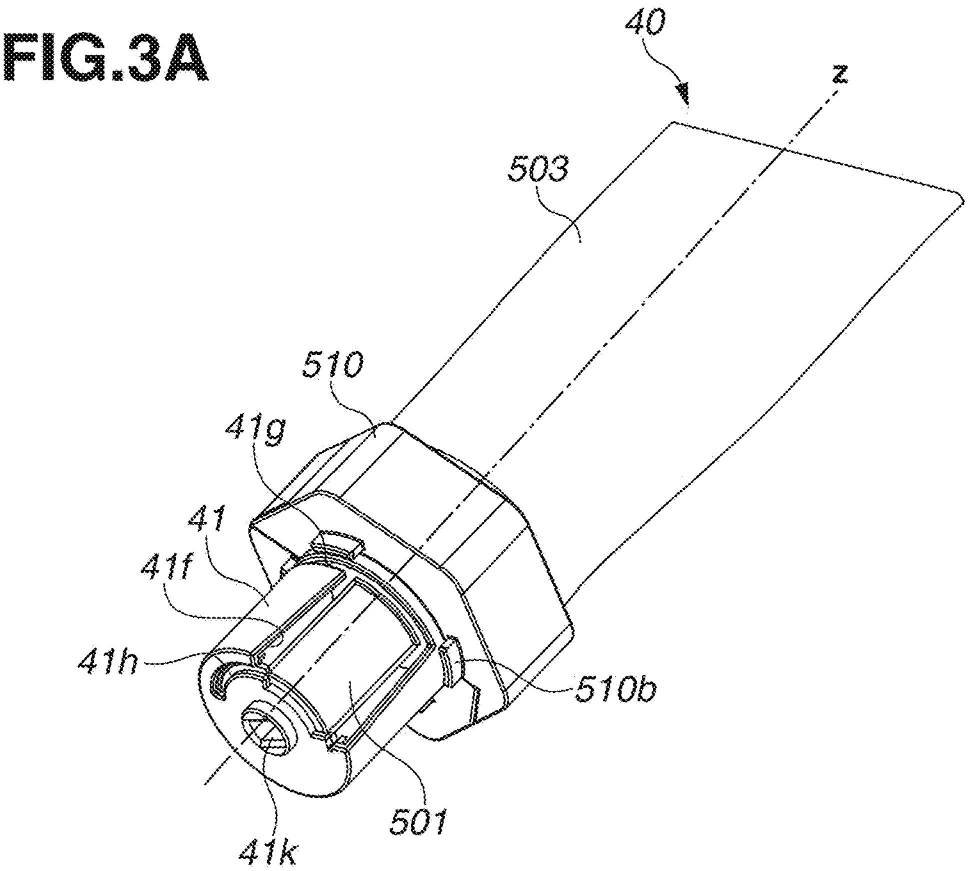
FIGS. 3A and 3B are perspective views illustrating a toner pack.
Figure 3B:
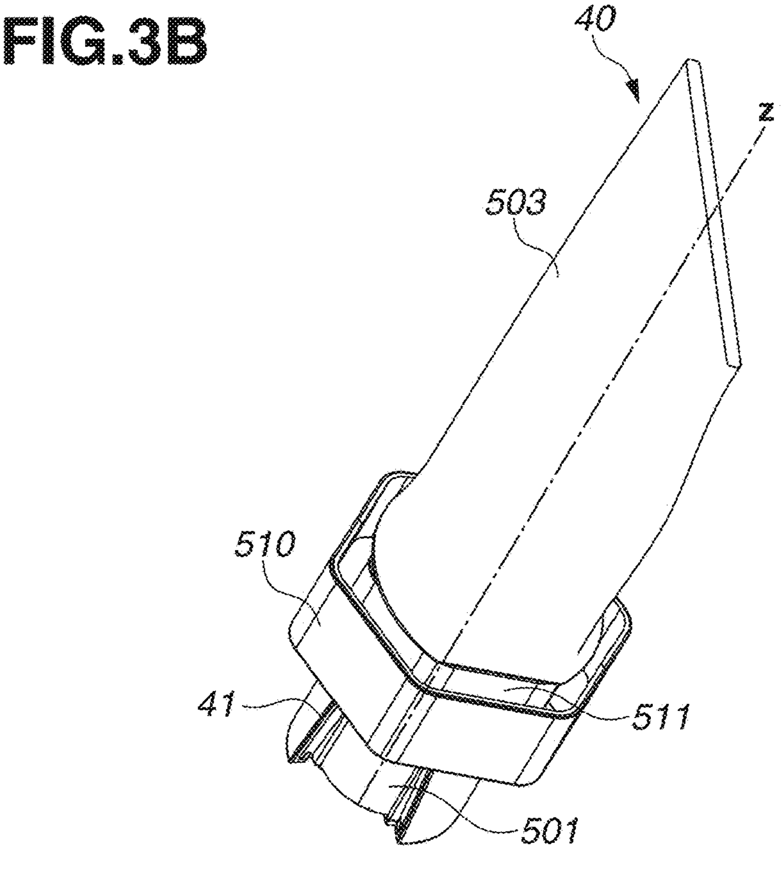
Figure 4:
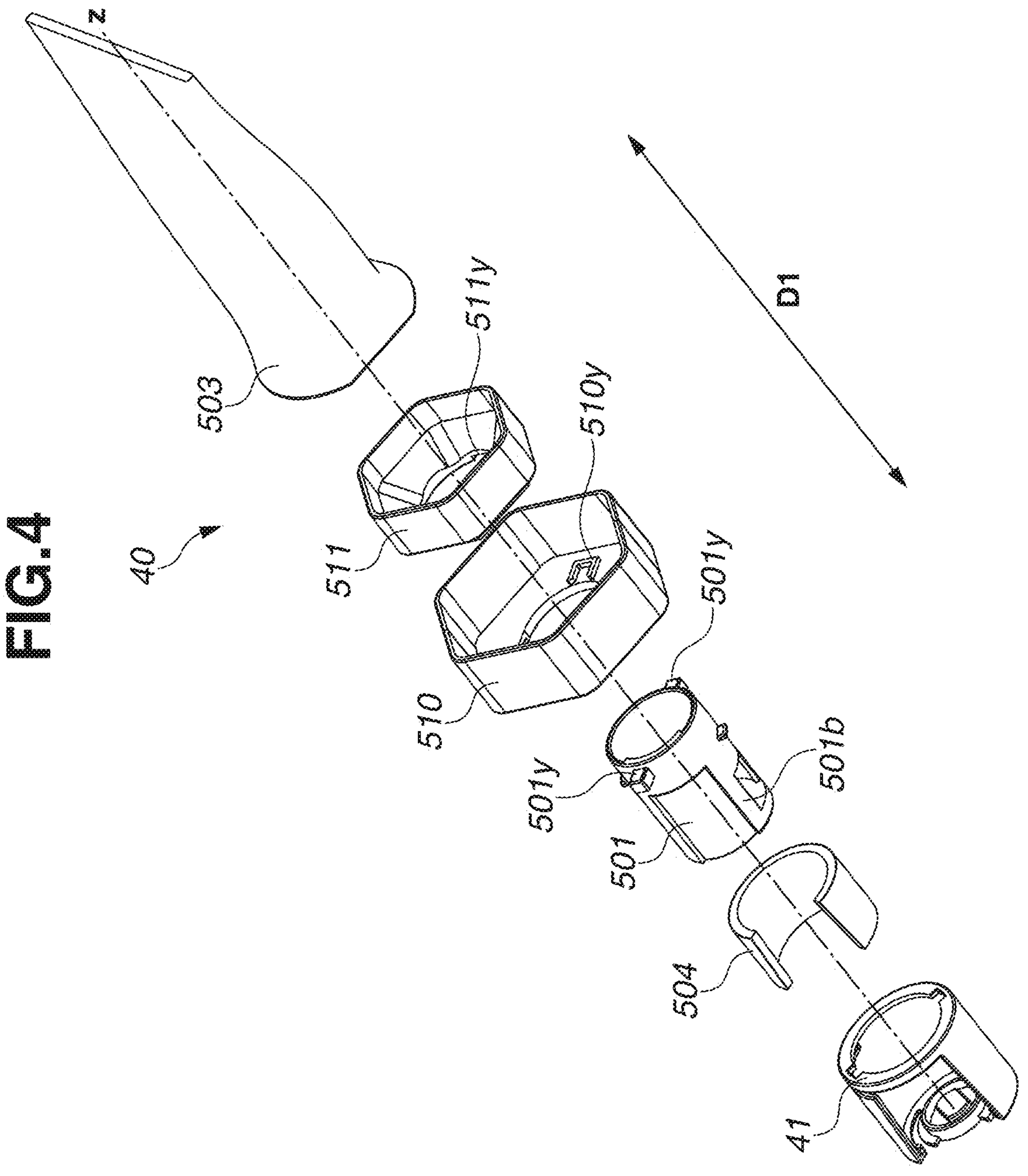
FIG. 4 is an exploded perspective view illustrating the toner pack.

Coupling and separation operations of the toner pack 40 and the developing container 32 and opening and closing operations of the toner discharge port 501*r* and the toner supply port 32*r* will now be described. FIGS. 3A and 11A illustrate the blocked state of the toner pack 40, where the toner discharge port 501*r* is blocked by the seal member 504 attached to the shutter member 41. FIGS. 12A and 13A illustrate the blocked state of the toner reception unit 600, where the toner supply port 32*r* is blocked by the shutter sheet 505 attached to the shutter member 507.

When the developing container 32 starts to be replenished with toner, both the toner pack 40 and the toner reception unit 600 are in the blocked state. In other words, when the replenishment base 501 is at the first blocked position, the toner discharge port 501*r* is located at a position not overlapping the toner supply port 32*r* of the cylindrical portion 32*g* when viewed in the radial direction orthogonal to the axial direction D1, and the shutter member 507 is located at a second blocked position.

Figure 20A:
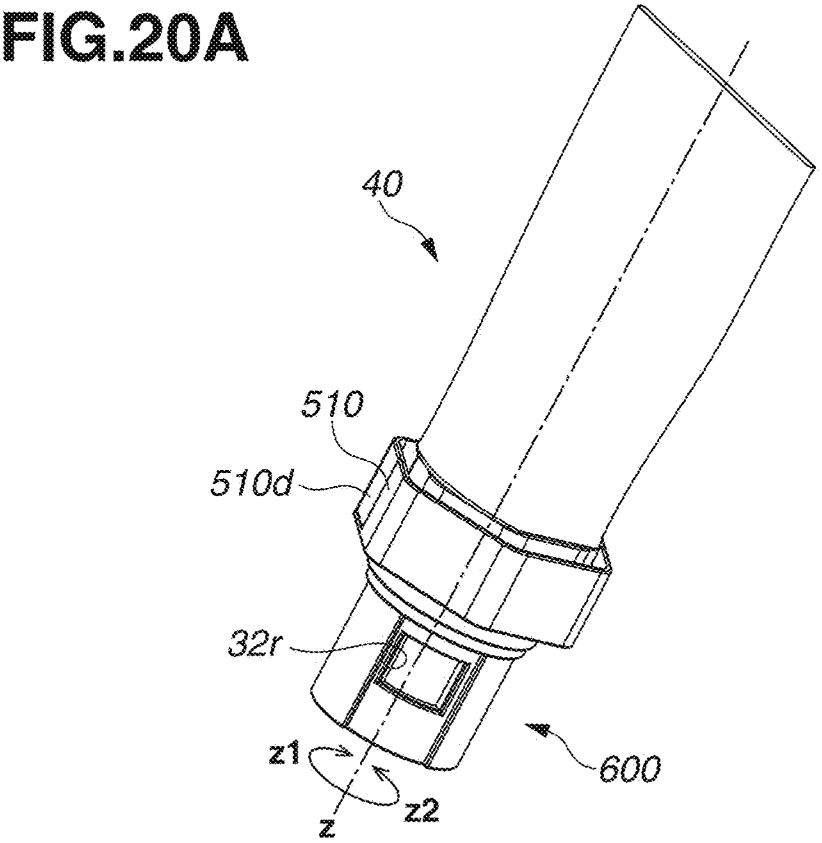
FIG. 20A is a perspective view illustrating the toner reception unit and the toner pack in the blocked state.

The user then fits the toner pack 40 to the toner reception unit 600 as illustrated in FIG. 20A. Here, the to-be-engaged portion 41*k* (see FIG. 3A) formed in the shutter member 41 of the toner pack 40 is engaged with the engagement portion 32*e* formed on the cylindrical portion 32*g* of the toner reception unit 600.

The to-be-engaged portion 41*k* and the engagement portion 32*e* have respective double D shapes, and by the engagement of the double D shapes the shutter member 41 is attached to the cylindrical portion 32*g* to not be rotatable about the rotation axis z. More specifically, the to-be-engaged portion 41*k* is configured such that when the toner pack 40 is attached to the image forming apparatus 1, the to-be-engaged portion 41*k* is engaged with the engagement portion 32*e* of the image forming apparatus 1 and the rotation of the shutter member 41 about the rotation axis z is thereby restricted.

In other words, the toner pack 40 is attached to the image forming apparatus 1 such that the rotation of the shutter member 507 about the rotation axis z with respect to the cylindrical portion 32*g* is restricted and the replenishment base 501 rotates with the shutter member 507.

The protrusion 507*e* (see FIG. 13A) formed on the shutter member 507 of the toner reception unit 600 is passed through the cutout 41*f* in the shutter member 41 of the toner pack 40 and engaged with the recess 501*f* (see FIG. 8A) formed in the replenishment base 501. If both the toner pack 40 and the toner reception unit 600 are in the blocked state, the to-be-engaged portion 41*k* can be engaged with the engagement portion 32*e* and the protrusion 507*e* can be engaged with the recess 501*f* simultaneously when the toner pack 40 is fitted to the toner reception unit 600.

Suppose that the user rotates the outer periphery 510*d* of the outer ring member 510 in the state illustrated in FIG. 20A about the rotation axis z in the direction of the arrow z1 to replenish the developing container 32 with the toner in the toner pack 40. The rotation of the outer ring member 510 in the direction of the arrow z1 also rotates the replenishment base 501 in the direction of the arrow z1 in an interlocking manner. Here, a step 501*n* (see FIG. 8A) of the recess 501*f* in the replenishment base 501 presses an end face 507*f* (see FIG. 13A) serving as a to-be-contacted portion of the protrusion 507*e* on the shutter member 507.

In other words, when the toner pack 40 is attached to the image forming apparatus 1, the step 501*n* serving as a contact portion comes into contact with the end face 507*f* so that the shutter member 507 rotates with the shutter member 41 about the rotation axis z. The shutter member 507 serving as a main body shutter thus rotates with the replenishment base 501 about the rotation axis Z in the direction of the arrow z1.

Meanwhile, because of the foregoing rotational restriction, the cylindrical portion 32*g* of the toner reception unit 600 and the shutter member 41 of the toner pack 40 are not rotated. As illustrated in FIG. 11B, the replenishment base 501 of the toner pack 40 is thereby rotated relative to the shutter member 41 in the direction of the arrow z1, and the toner discharge port 501*r* faces the cutout 41*f* of the shutter member 41. In other words, the toner pack 40 enters the open state and becomes able to discharge the toner accommodated in the toner pack 40.

At the same time, as illustrated in FIG. 13B, the shutter member 507 of the toner reception unit 600 is rotated relative to the cylindrical portion 32*g* in the direction of the arrow z1, and the shutter sheet 505 fixed to the shutter member 507 is separated from the toner supply port 32*r*. That is, the toner reception unit 600 enters the open state and becomes able to receive the toner discharged from the toner pack 40. In other words, the shutter member 507 is located at a second open position where the toner supply port 32*r* is opened so that the accommodation unit 36 of the developing container 32 can receive the toner supplied from the toner pack 40 via the toner supply port 32*r*. When the replenishment base 501 is at the first open position, the toner discharge port 501*r* is located at a position overlapping the toner supply port 32*r* of the cylindrical portion 32*g* when viewed in the radial direction orthogonal to the axial direction D1 and the shutter member 507 is located at the second open position.

Figure 20B:
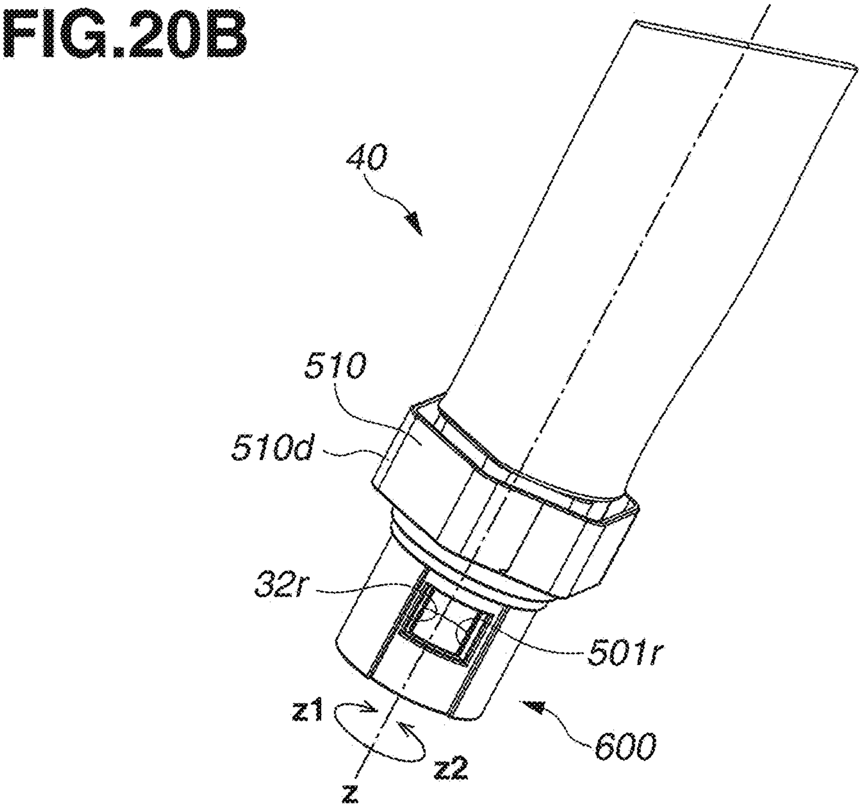
FIG. 20B is a perspective view illustrating the toner reception unit and the toner pack in the open state.

As illustrated in FIG. 20B, the developing container 32 is replenished with the toner accommodated in the toner pack 40 through the toner supply port 32*r* and the toner discharge port 501*r*. The rotation angle of the outer ring member 510 is restricted to approximately 90° by the engagement of the protrusion 507*e* of the shutter member 507 with the grooves 41*g* and 41*h* of the shutter member 41 and the engagement of the ribs 510*b* of the outer ring member 510 with the grooves 507*p* of the shutter member 507. The rotation angle of the outer ring member 510 is not limited to approximately 90°, and may be less than 90° or greater than or equal to 90°.

The engagement of the protrusion 507*e* of the shutter member 507 with the groove 41*g* of the shutter member 41 makes the toner pack 40 not movable with respect to the toner reception unit 600 in the axial direction D1, whereby the toner pack 40 can be locked to the toner reception unit 600. This can reduce the chances of the toner pack 40 being unintentionally detached from the toner reception unit 600 during the toner replenishment and the toner scattering inside the image forming apparatus 1, and thereby improve workability during the toner replenishment operation.

Next, suppose that the user rotates the outer periphery 510*d* of the outer ring member 510 in the state illustrated in FIG. 20B about the rotation axis z in the direction of the arrow z2 and detaches the toner pack 40 from the cylindrical portion 32*g* of the developing container 32. The rotation of the outer ring member 510 in the direction of the arrow z2 also rotates the replenishment base 501 in the direction of the arrow z2 in an interlocking manner. Here, a step 501*m* (see FIG. 8A) of the recess 501*f* in the replenishment base 501 presses an end face 507*g* (see FIG. 13B) of the protrusion 507*e* of the shutter member 507. The shutter member 507 thus rotates with the replenishment base 501 about the rotation axis z in the direction of the arrow z2.

Meanwhile, because of the foregoing rotational restriction, the cylindrical portion 32*g* of the toner reception unit 600 and the shutter member 41 of the toner pack 40 are not rotated. As illustrated in FIG. 11A, the replenishment base 501 of the toner pack 40 is rotated relative to the shutter member 41 in the direction of the arrow z2, and the toner discharge port 501*r* faces the seal member 504 (see FIG. 10A) fixed to the shutter member 41. In other words, the toner pack 40 enters the blocked state and becomes unable to discharge the toner accommodated in the toner pack 40.

At the same time, as illustrated in FIG. 13A, the shutter member 507 of the toner reception unit 600 rotates relative to the cylindrical portion 32*g* in the direction of the arrow z2, and the shutter sheet 505 fixed to the shutter member 507 covers the toner supply port 32*r*. That is, the toner reception unit 600 enters the blocked state and becomes unable to receive toner discharged from the toner pack 40. Here, the shutter member 507 is located at the second blocked position where the toner supply port 32*r* is blocked.

In such a state, the protrusion 507*e* of the shutter member 507 is separated from the grooves 41*g* and 41*h* of the shutter member 41, and the toner pack 40 can be detached from the toner reception unit 600. Since both the toner pack 40 and the toner reception unit 600 are in the blocked state, the toner pack 40 can be detached from the toner reception unit 600 without scattering toner.

[Configuration for Preventing Toner Leakage]

A configuration for preventing toner leakage between the toner pack 40 and the toner reception unit 600 will now be described with reference to FIGS. 21A to 23B. FIGS. 21A to 23B are schematic sectional views illustrating a layout relationship between the toner pack 40 and the toner reception unit 600 of the developing container 32. The seal member 504 and the base seal 506, which are each located on a cylindrical surface, are here schematically illustrated as flat members.

FIGS. 21A to 23B are views of the toner pack 40 and the toner reception unit 600 in the axial direction D1. If the outer ring member 510 (see FIG. 20A) of the toner pack 40 is rotated in the direction of the arrow z1, the replenishment base 501 moves to the left in FIGS. 21A to 23B.

Figure 21A:
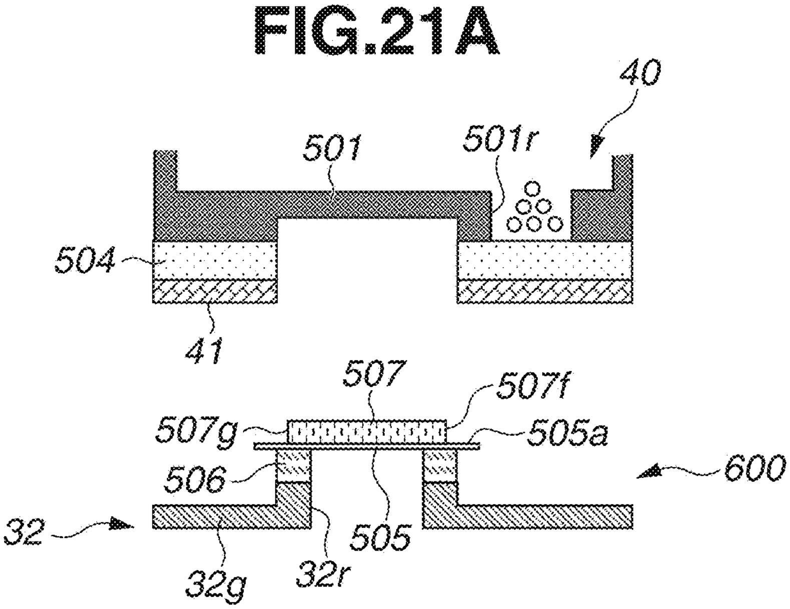
FIG. 21A is a sectional view illustrating a state before the toner pack is attached to a developing container.
Figure 21B:
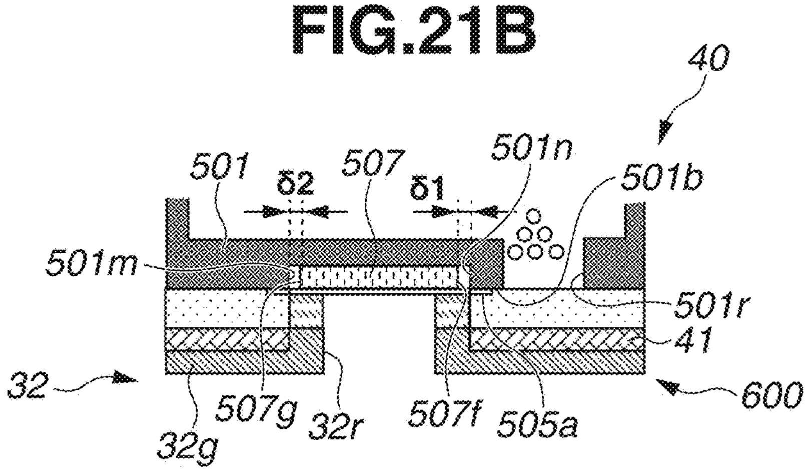
FIG. 21B is a sectional view illustrating a state where the toner pack is attached to the developing container.

FIG. 21A illustrates a state before the developing container 32 is coupled with the toner pack 40. FIG. 21B illustrates a state where the toner pack 40 in the state illustrated in FIG. 21A is attached to the developing container 32, and the replenishment base 501 of the toner pack 40 and the shutter member 507 of the toner reception unit 600 are yet to be rotated. In the state illustrated in FIG. 21B, the toner supply port 32*r* and the toner discharge port 501*r* are blocked, and the toner accommodated in the pouch 503 (see FIG. 3A) will not be discharged out of the toner pack 40.

Figure 21C:
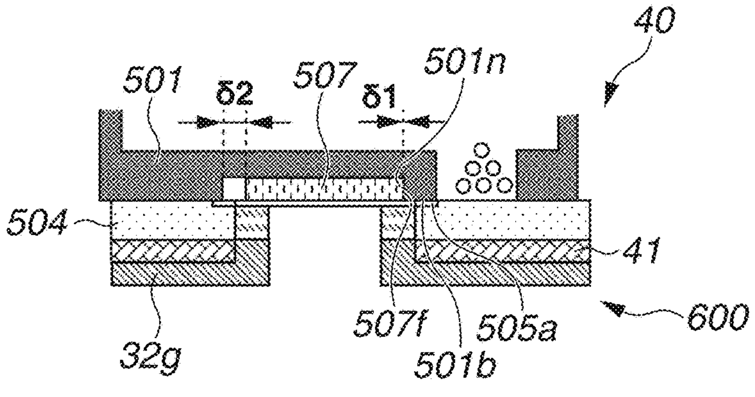
FIG. 21C is a sectional view illustrating a state where the replenishment base is rotated by a predetermined angle from in the state illustrated in FIG. 21B.
Figure 22A:
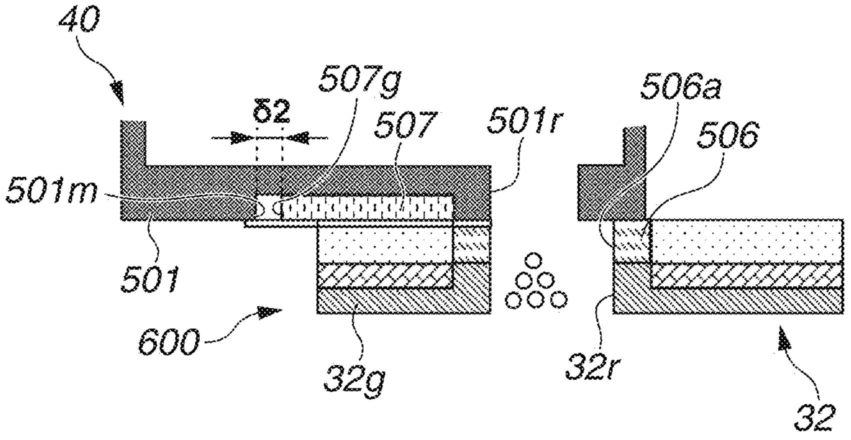
FIG. 22A is a sectional view illustrating a state where a toner supply port and a toner discharge port are open.

FIG. 21C illustrates a state where the replenishment base 501 and the shutter member 507 are rotated about the rotation axis z in the direction of the arrow z1 (see FIG. 20A) by an angle Θ1 (0°<Θ1<90°) from in the state illustrated in FIG. 21B. FIG. 22A illustrates a state where the replenishment base 501 and the shutter member 507 are rotated in the direction of the arrow z1 (see FIG. 20A) by 90° from the state illustrated in FIG. 21B, and where the toner supply port 32*r* and the toner discharge port 501*r* are open.

As illustrated in FIG. 21B, when the toner pack 40 in the blocked state is attached to the toner reception unit 600 in the blocked state, the end portion 505*a* of the shutter sheet 505 is located in contact with the outer peripheral portion 501*b* of the replenishment base 501. The step 501*n* of the replenishment base 501 is located with a gap δ1 from the end face 507*f* of the shutter member 507 in the circumferential direction about the rotation axis z. The step 501*m* of the replenishment base 501 is located with a gap δ2 from the end face 507*g* of the shutter member 507 in the circumferential direction about the rotation axis z.

The gaps δ1 and δ2 correspond to clearances (looseness) when the user attaches the toner pack 40 to the developing container 32. The presence of the gaps δ1 and δ2 can facilitate the attachment of the toner pack 40 to the developing container 32 and improve the attachability of the toner pack 40.

After the toner pack 40 is attached to the toner reception unit 600 of the developing container 32, the user rotates the replenishment base 501 in the direction of the arrow z1. As illustrated in FIG. 21C, this eliminates the gap δ1 present in FIG. 21B and brings the step 501*n* of the replenishment base 501 into contact with the end face 507*f* of the shutter member 507. The end face 507*f* is pressed by the step 501*n*, and the replenishment base 501 and the shutter member 507 rotate together in the direction of the arrow z1. Here, the gap δ2 has a wider space than in the initial state. The end portion 505*a* of the shutter sheet 505 is configured to not be separated from the outer peripheral portion 501*b* of the replenishment base 501 but maintain contact with the outer peripheral portion 501*b*.

If the user rotates the replenishment base 501 further in the direction of the arrow z1, as illustrated in FIG. 22A, the toner discharge port 501*r* and the toner supply port 32*r* are opened instead of being covered with the shutter sheet 505 and the shutter member 507. The toner accommodated in the toner pack 40 is supplied into the developing container 32 through the toner discharge port 501*r* and the toner supply port 32*r*. During the toner supply, the base seal 506 prevents the toner from entering the interface with the replenishment base 501.

Figure 22B:
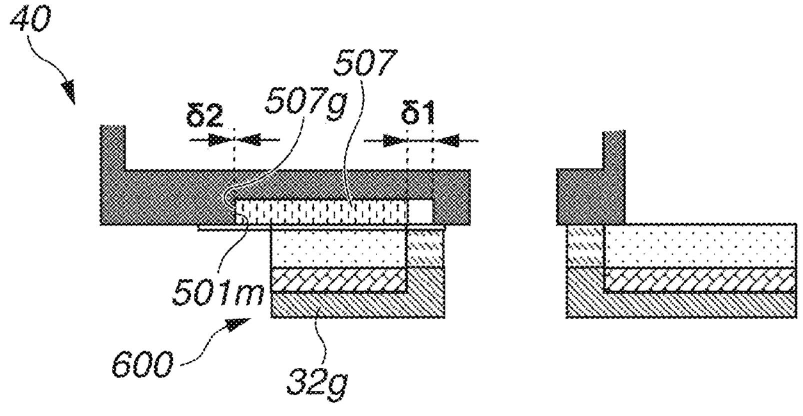
FIG. 22B is a sectional view illustrating a state where the replenishment base is rotated by a predetermined angle from in the state illustrated in FIG. 22A.

When detaching the toner pack 40 after the end of the toner discharge from the toner pack 40, as illustrated in FIG. 22B, the user rotates the replenishment base 501 in the state of FIG. 22A in the direction of the arrow z2 (to the right in the diagram) by an angle Θ3 (0°<Θ3<90°). This brings the step 501*m* of the replenishment base 501 into contact with the end face 507*g* of the shutter member 507, and the gap δ2 present in FIG. 22A disappears. The end face 507*g* is pressed by the step 501*m*, and the replenishment base 501 and the shutter member 507 rotate together in the direction of the arrow z2. Here, the gap δ1 has a wider space than in the initial state.

Figure 23A:
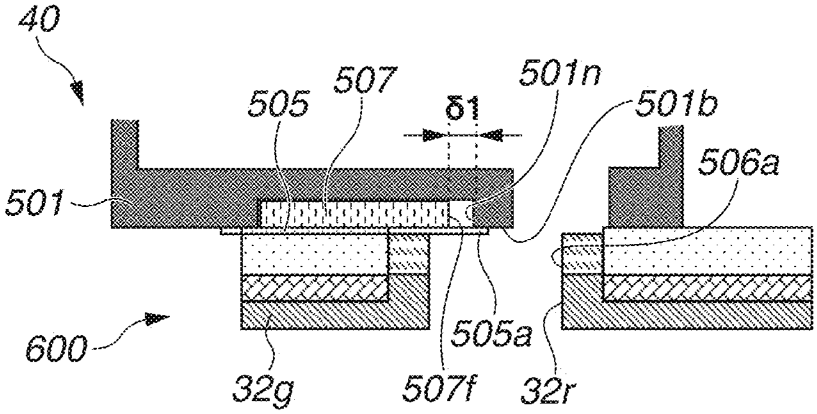
FIG. 23A is a sectional view illustrating a state where the replenishment base is rotated by a predetermined angle from in the state illustrated in FIG. 22B.

If the user rotates the replenishment base 501 further in the direction of the arrow z2, as illustrated in FIG. 23A, the gap δ1 formed between the step 501*n* of the replenishment base 501 and the end face 507*f* of the shutter member 507 comes above the toner supply port 32*r*. Here, the contact between the end portion 505*a* of the shutter sheet 505 and the outer peripheral portion 501*b* of the replenishment base 501 can prevent toner from entering the gap δ1.

Figure 23B:
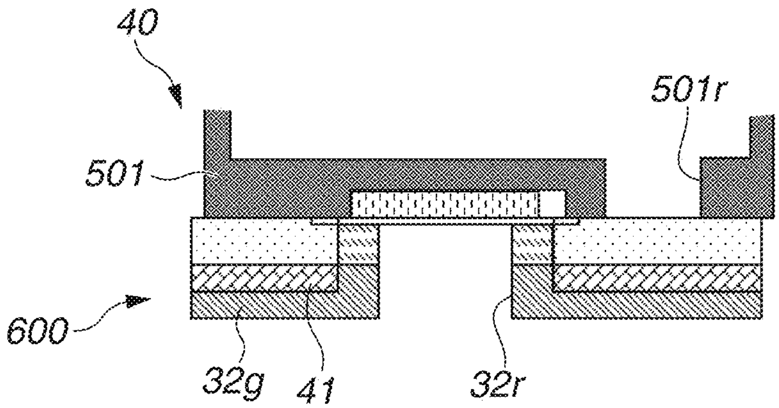
FIG. 23B is a sectional view illustrating a state where the toner supply port and the toner discharge port are blocked.

If the user further rotates the replenishment base 501 in the direction of the arrow z2, as illustrated in FIG. 23B, the toner discharge port 501*r* is blocked by the seal member 504 and the toner supply port 32*r* is blocked by the shutter sheet 505 and the shutter member 507. In such a state, the toner pack 40 can be detach from the cylindrical portion 32*g* of the developing container 32. Detaching the toner pack 40 from the cylindrical portion 32*g* restores the state illustrated in FIG. 21A.

[Layout Configuration of Instruction Sheet]

Figure 24:
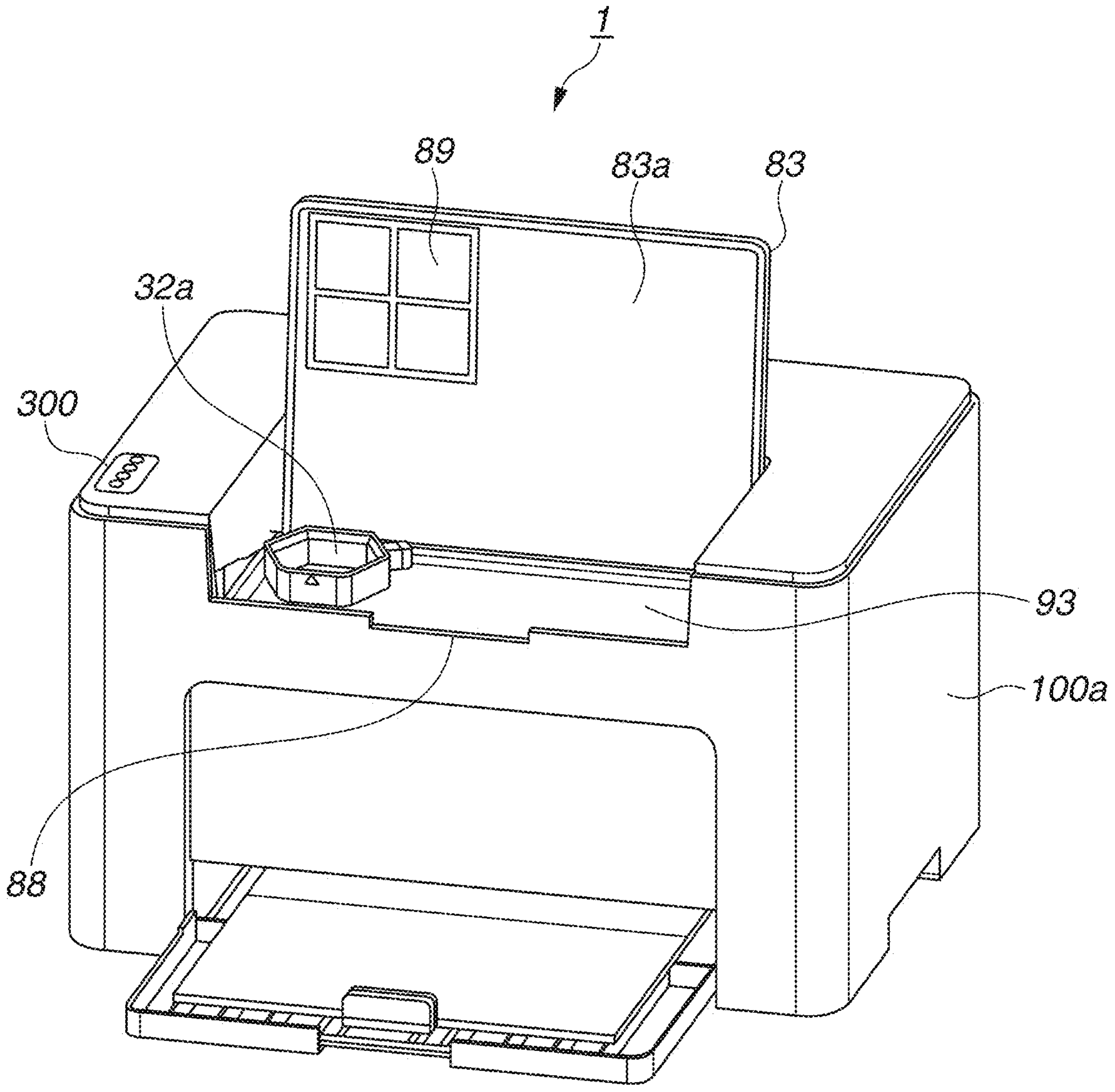
FIG. 24 is a perspective view illustrating a position of an instruction sheet according to the first exemplary embodiment.

In the present exemplary embodiment, as illustrated in FIG. 24, an instruction sheet 89 (information display portion) is attached to the cover back 83*a* to facilitate the toner replenishment performed by the user. The instruction sheet 89 describes an operation procedure for the toner replenishment using the toner pack 40.

Figure 25:
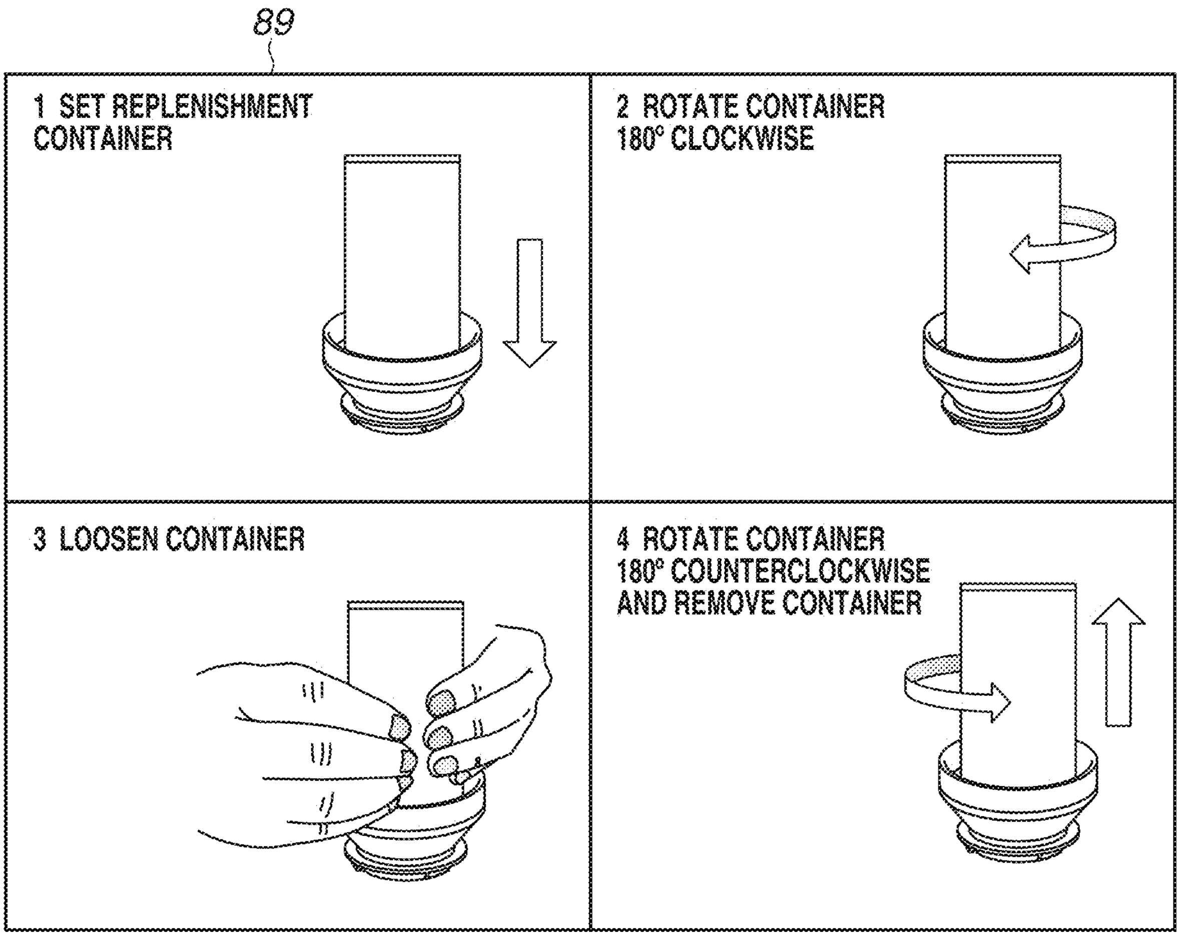
FIG. 25 is a diagram illustrating descriptions on the instruction sheet according to the first exemplary embodiment.

FIG. 25 illustrates an example of the information described in the instruction sheet 89 according to the present exemplary embodiment. The instruction sheet 89 includes text and illustrations for describing four steps of the procedure, with numerals indicating the order of steps to be taken.

Step 1 shows how to set the toner pack 40 to the replenishment port 32*a*. Step 2 shows how to open the shutters for supplying the developer by rotating the toner pack 40 clockwise by 180° with respect to the housing 100*a*. Step 3 shows how to replenish the developing container 32 with the developer by loosening the toner pack 40. Step 4 shows how to rotate the toner pack 40 counterclockwise by 180° with respect to the housing 100*a* and remove the toner pack 40 from the replenishment port 32*a*.

Since the instruction sheet 89 is attached to the cover back 83*a*, the user is likely to notice the presence of the instruction sheet 89 when opening the cover 83 with fingers in a hole portion 88. The attachment of the instruction sheet 89 in the direction of access to the replenishment port 32*a* also has an advantage of high visibility to the user.

In the present exemplary embodiment, as illustrated in FIG. 24, the instruction sheet 89 is attached to the same left side as the replenishment port 32*a* is. This can reduce the movement of the line of sight during the toner replenishment and facilitate the user to perform toner replenishment while checking the operation procedure for the toner replenishment, with high operability and improved usability. If the replenishment port 32*a* is located in the center of the top wall 93, the instruction sheet 89 is also desirably attached to the center of the cover back 83*a*. If the replenishment port 32*a* is located on the right side, the instruction sheet 89 is also desirably attached to the right side. In other words, the instruction sheet 89 is desirably attached to a position corresponding to that of the replenishment port 32*a*.

Figure 26:
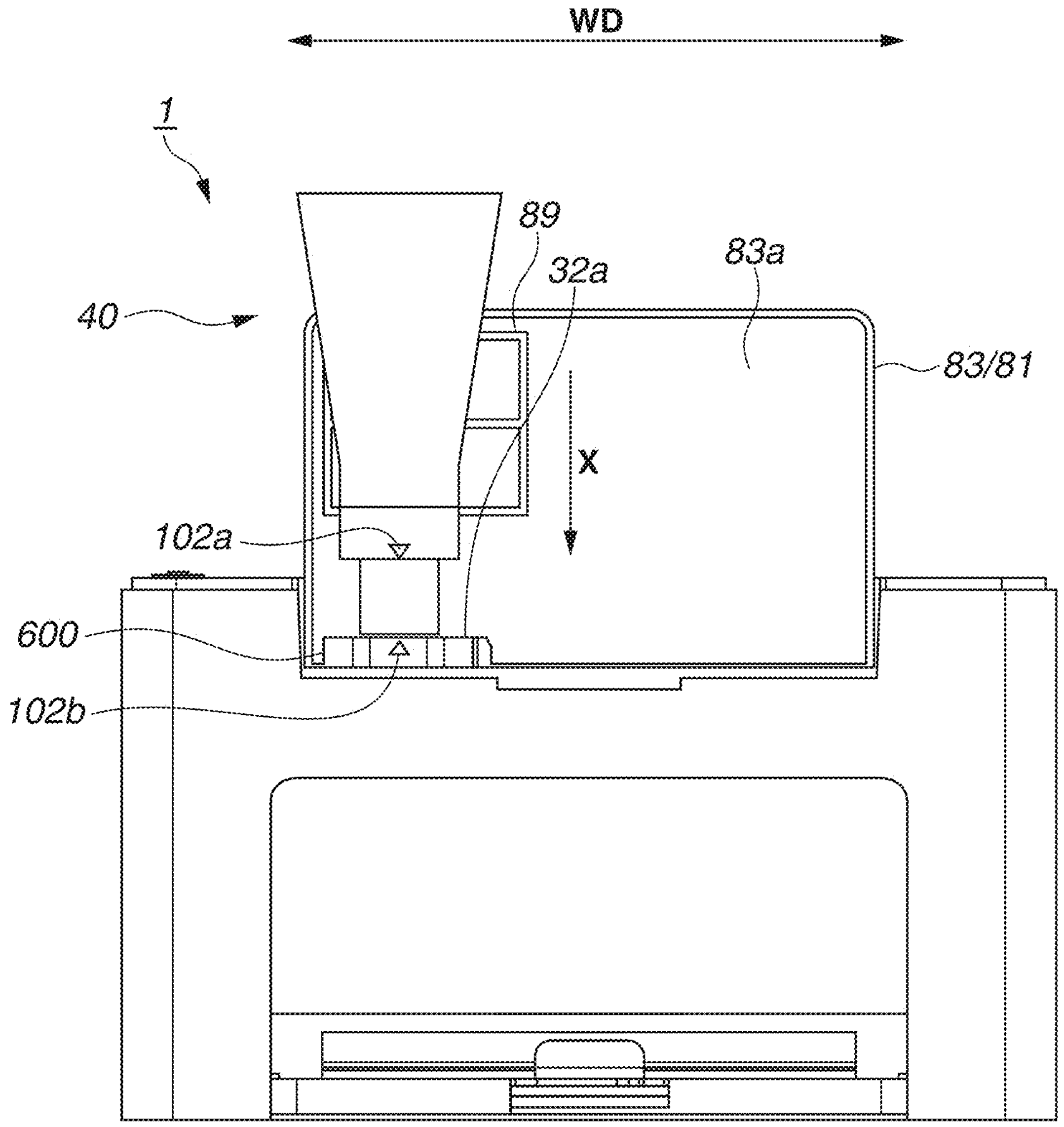
FIG. 26 is a front view illustrating the position of the instruction sheet according to the first exemplary embodiment.

FIG. 26 is a view of the image forming apparatus 1 with the toner pack 40 attached to the replenishment port 32*a*, viewed in a horizontal direction from downstream to upstream in the discharge direction DD of the recording material P. In the configuration of the present exemplary embodiment, the instruction sheet 89 is attached to the cover back 83*a* such that the position of the replenishment port 32*a* in the width direction WD agrees with that of the instruction sheet 89. As illustrated in FIG. 26, the toner pack 40 and the instruction sheet 89 therefore overlap at least in part when viewed in the horizontal direction from downstream to upstream in the discharge direction DD.

As illustrated in FIG. 26, the replenishment port 32*a* and the instruction sheet 89 are located within the range (a width) of the stacking surface of the discharge tray 81 in the width direction WD. In other words, the replenishment port 32*a* and the instruction sheet 89 are located at relatively close positions, which facilitates the user to observe the instruction sheet 89 to find out the details of the operation while performing the toner replenishment operation.

As illustrated in FIG. 26, the toner pack 40 is attached to the developing container 32 in the direction of the arrow X, with a triangle mark 102*a* on the toner pack 40 and a triangle mark 102*b* on the toner reception unit 600 in phase. This can provide high operability and improve usability since the phase of the toner pack 40 in the rotation direction can be recognized and the toner pack 40 can be easily attached.

Next, a second exemplary embodiment will be described with reference to FIGS. 27 and 28. The present exemplary embodiment is different from the first exemplary embodiment only in the position where the instruction sheet 89 is attached. A description of the other configuration will thus be omitted.

Figure 27:
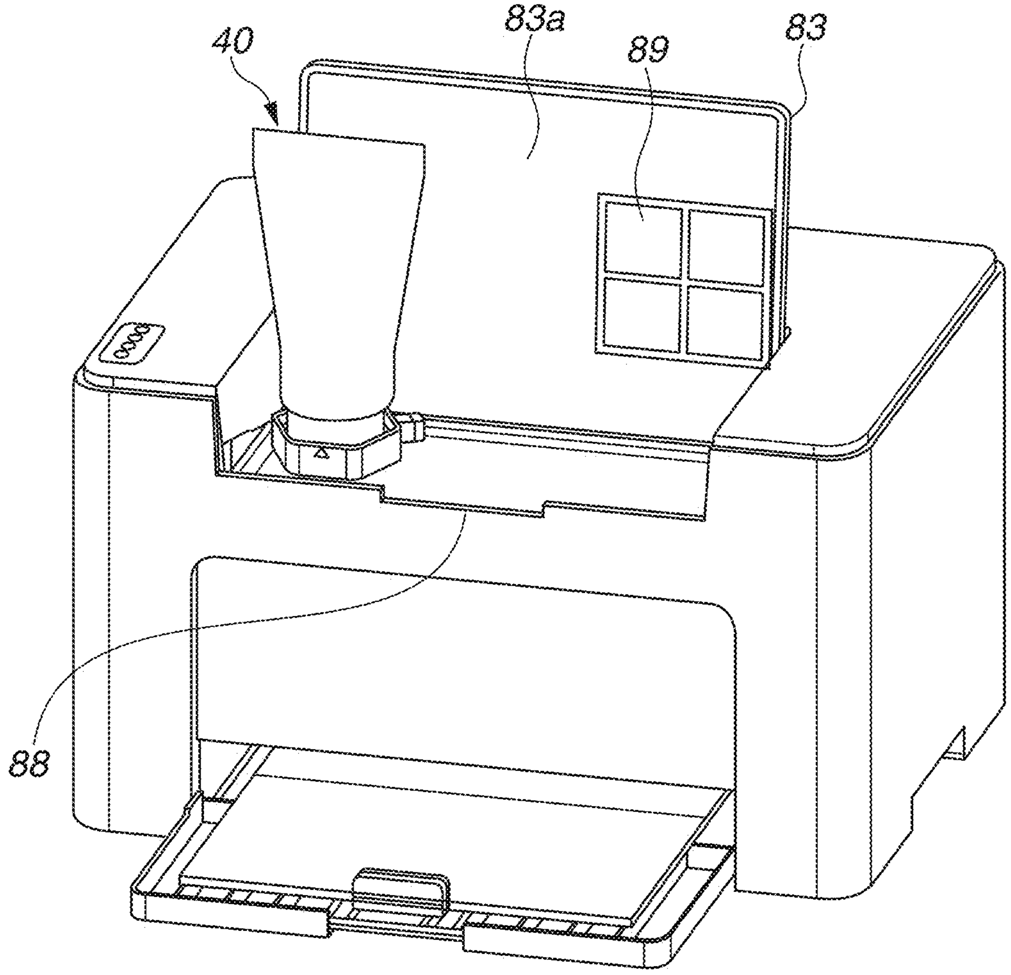
FIG. 27 is a perspective view illustrating a position of an instruction sheet according to a second exemplary embodiment.

FIG. 27 illustrates a perspective view of the image forming apparatus 1 with the cover 83 open. In the present exemplary embodiment, the replenishment port 32*a* is located on the left, and the instruction sheet 89 is located at the right part of the cover back 83*a*. That is, unlike the first exemplary embodiment, the instruction sheet 89 is attached to a position on the opposite side from where the replenishment port 32*a* is located. If the replenishment port 32*a* is located on the right in FIG. 27, the instruction sheet 89 can be located on the left.

Figure 28:
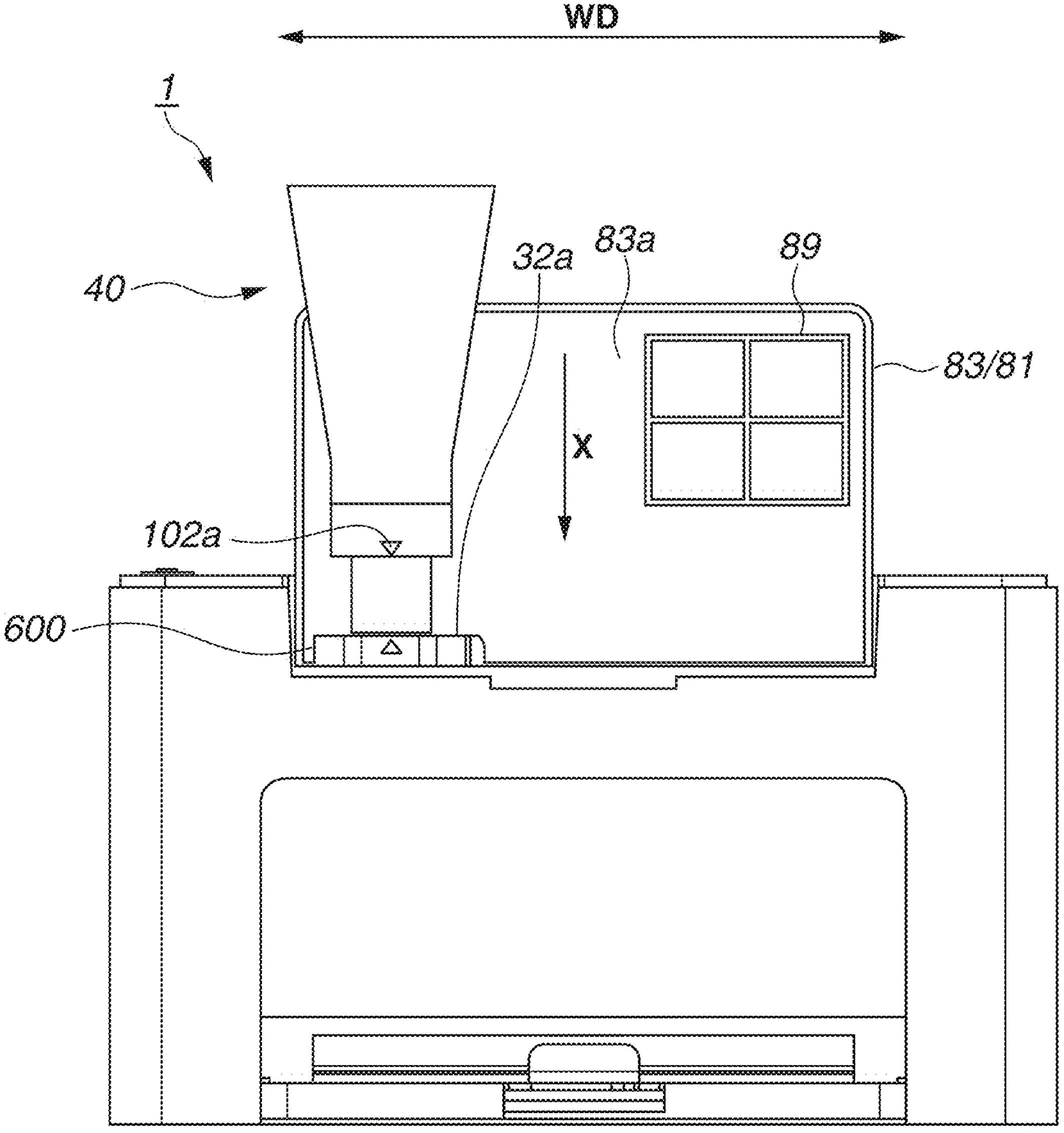
FIG. 28 is a front view illustrating the position of the instruction sheet according to the second exemplary embodiment.

FIG. 28 is a view of the image forming apparatus 1 with the toner pack 40 attached to the replenishment port 32*a*, viewed in the horizontal direction from downstream to upstream in the discharge direction DD of the recording material P. In the configuration of the present exemplary embodiment, the instruction sheet 89 is attached to the cover back 83*a* such that the position of the replenishment port 32*a* in the width direction WD is different from that of the instruction sheet 89. As illustrated in FIG. 27, the toner pack 40 and the instruction sheet 89 therefore do not overlap when viewed in the horizontal direction from downstream to upstream in the discharge direction DD.

Such a configuration can avoid a situation where the major part of the instruction sheet 89 is obstructed by the toner pack 40 if the toner pack 40 attached to the replenishment port 32*a* is large in size, for example. As a result, a situation where the user has difficulty in observing the information described in the instruction sheet 89 while executing the replenishment operation can be avoided.

As illustrated in FIG. 28, the replenishment port 32*a* and the instruction sheet 89 are located within the range of the stacking surface of the discharge tray 81 in the width direction WD. Since the replenishment port 32*a* and the instruction sheet 89 are located at relatively close positions, the user can easily observe the instruction sheet 89 to find out the details of the operation while performing the toner replenishment operation.

Next, a third exemplary embodiment will be described with reference to FIGS. 29 and 30. The present exemplary embodiment is different from the first exemplary embodiment only in the position where the instruction sheet 89 is attached. A description of the other configuration will thus be omitted.

Figure 29:
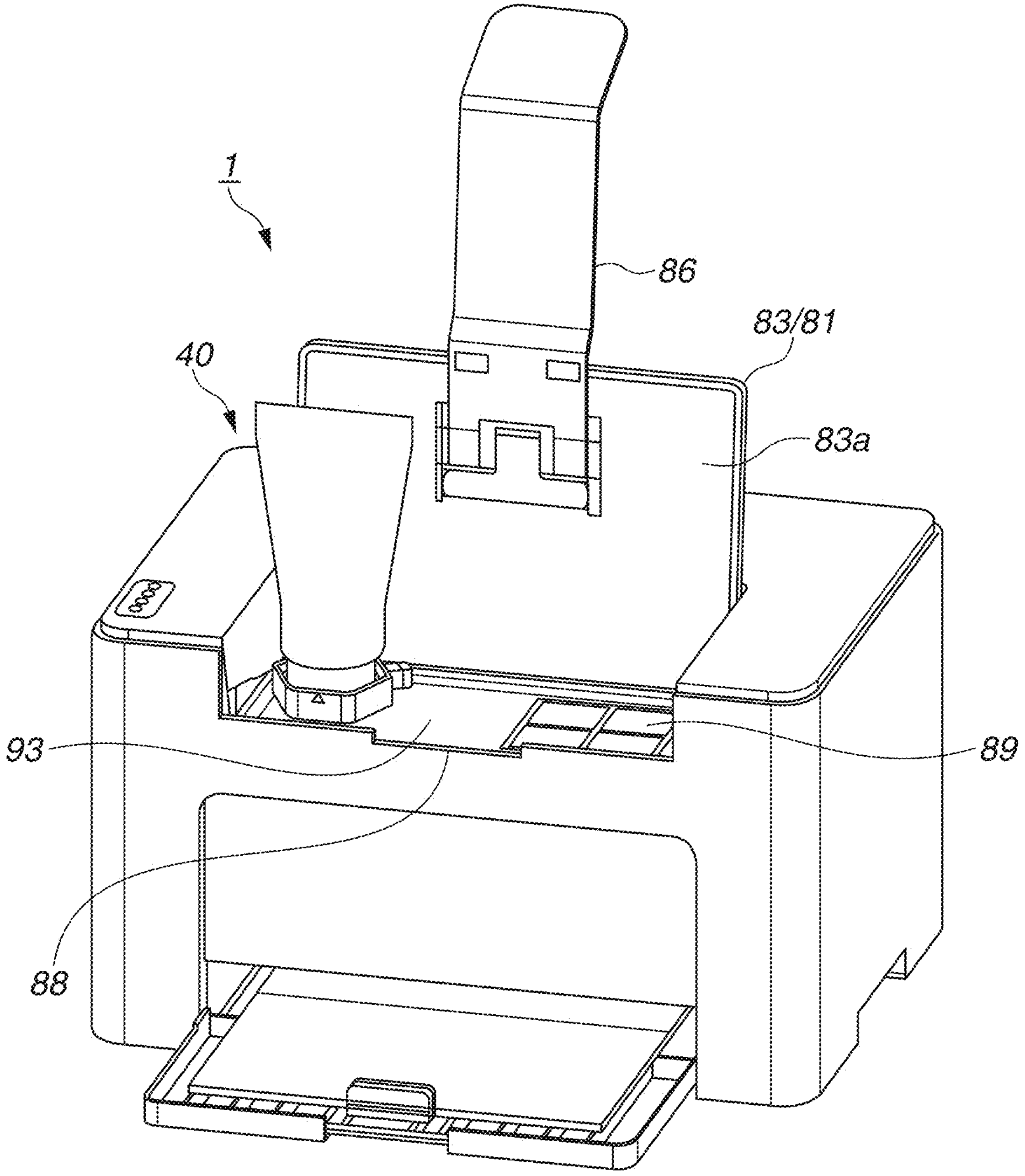
FIG. 29 is a perspective view illustrating a position of an instruction sheet according to a third exemplary embodiment.

FIG. 29 illustrates a perspective view of the image forming apparatus 1 with the cover 83 open. In FIG. 29, an extension tray 86 is attached to the discharge tray 81. In such a configuration, the instruction sheet 89 may be attached to the top wall 93 instead of the cover back 83*a*. This configuration provides the effects that the user is more likely to notice the presence of the instruction sheet 89 when opening the discharge tray 81 with fingers in the hole portion 88, and that the instruction sheet 89 attached in the same direction as the direction of attachment of the toner pack 40 has high visibility. This can also provide high operability and improve usability since the user can easily perform the toner replenishment while observing the operation method for the toner replenishment.

The extension tray 86 may be supported to be movable with respect to the discharge tray 81, and configured to be movable to a use position where the extension tray 86 can support recording materials P and a retracted position where the extension tray 86 is located when not in use. The extension tray 86 may also be configured to be detachably attachable to the discharge tray 81. The instruction sheet 89 may also be attached to the top wall 93 regardless of the presence of the extension tray 86.

Figure 30:
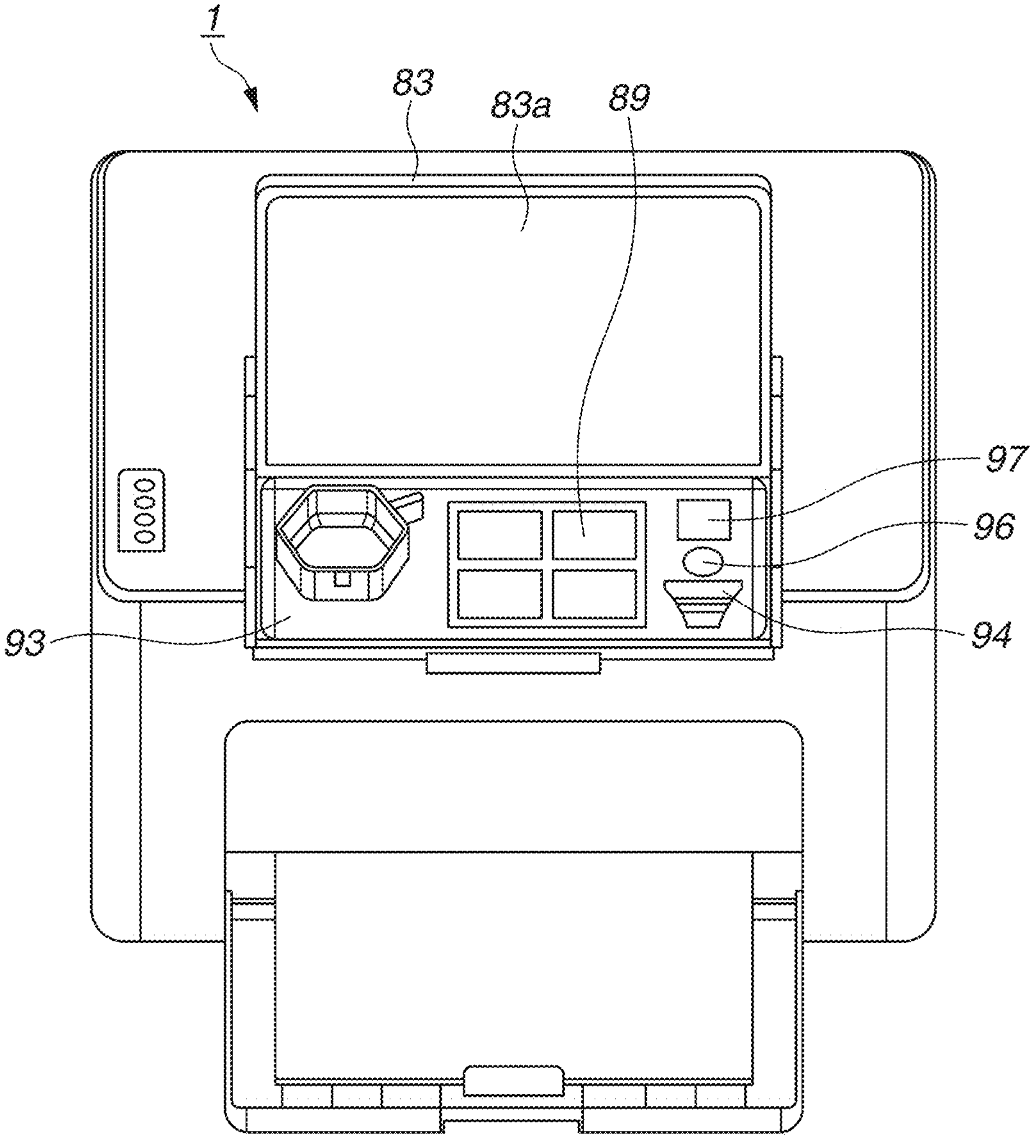
FIG. 30 is a front perspective view illustrating the position of the instruction sheet according to the third exemplary embodiment.

As illustrated in FIG. 30, not only the instruction sheet 89 but a remaining level indication unit 94, a replenishment request unit 96, and a code display unit 97 may also be provided on the top wall 93. The remaining level indication unit 94 indicates the remaining level of the toner accommodated in the developing container 32 in grades by using three LEDs. The replenishment request unit 96 prompts the user for toner replenishment by turning on or blinking an LED if the remaining level of the toner accommodated in the developing container 32 becomes low. The code display unit 97 is desirably configured to display, for example, a Quick Response (QR) Code® so that an Internet site publishing a moving image describing the toner replenishment procedure is automatically accessed by reading the QR Code® with a smartphone camera.

Figure 31A:
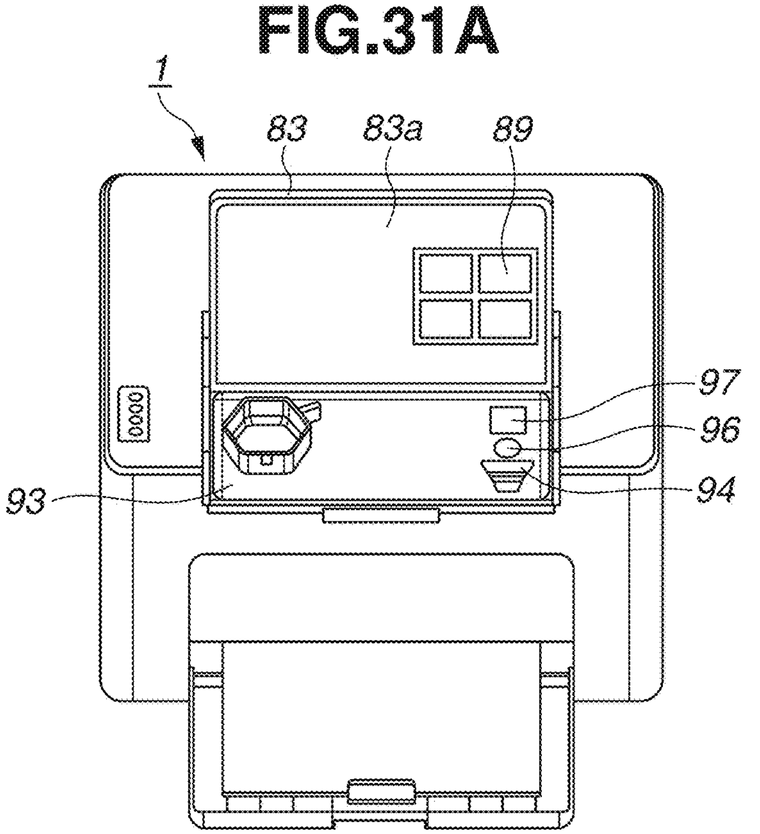
FIGS. 31A and 31B are front perspective views illustrating the position of the instruction sheet according to first and second modifications.

The remaining level indication unit 94, the replenishment request unit 96, and the code display unit 97 are not limited to the configuration of the third exemplary embodiment where the instruction sheet 89 is located on the top wall 93, and may also be included in the configuration of the first or second exemplary embodiment. In FIG. 31A, the instruction sheet 89 is attached to the cover back 83*a*, and the remaining level indication unit 94, the replenishment request unit 96, and the code display unit 97 are located on the top wall 93.

Figure 31B:
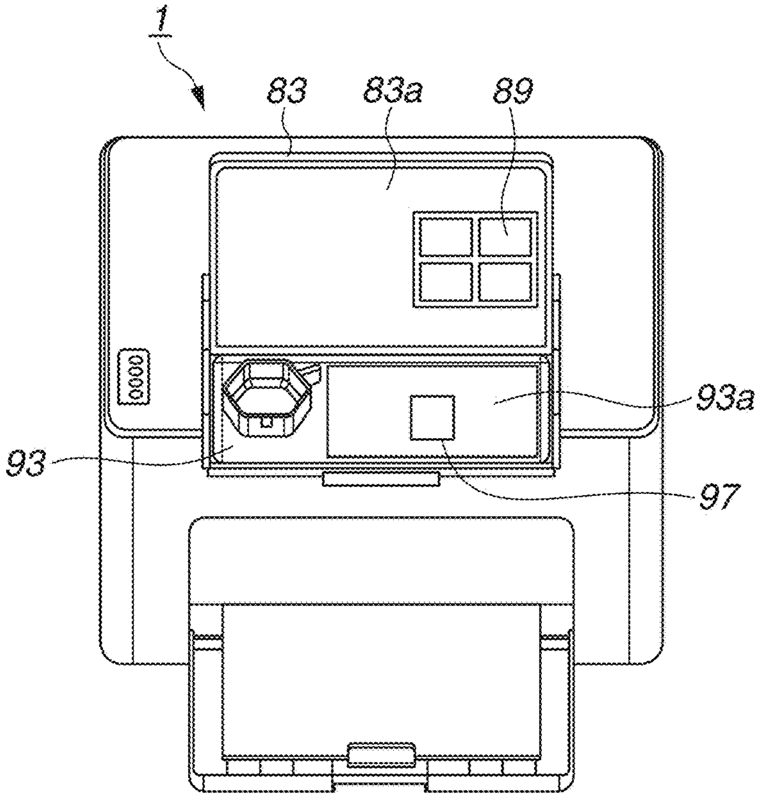

A recess 93*a* where a smartphone for communicating with the image forming apparatus 1 to change and complete main body settings or a portable information terminal for changing the main body settings can be placed may be formed in the top wall 93. As illustrated in FIG. 31B, the code display unit 97 may be located on the bottom of the recess 93*a*. In such a configuration, the user may notice the presence of the code display unit 97 before placing the smartphone in the recess 93*a*, and reads the QR Code® with the camera to access the Internet site. With the smartphone placed in the recess 93*a*, the user then plays back the moving image describing the toner replenishment procedure on the screen of the smartphone. The user can thereby perform the toner replenishment operation while viewing the moving image.

While several layout configurations have been described, the present exemplary embodiment is not limited thereto. Other layout configurations can be implemented in various combinations. For example, the recess 93*a* and the remaining level indication unit 94 may be located on the top wall 93 or the instruction sheet 89 may be located on the top wall 93 while the code display unit 97 is located on the cover back 83*a*.

A fourth exemplary embodiment will now be described with reference to FIG. 32. The present exemplary embodiment is different from the first exemplary embodiment only in the information described in the instruction sheet 89. A description of the other configuration will thus be omitted.

In the present exemplary embodiment, the instruction sheet 89 is located at the same position as in the first exemplary embodiment. Specifically, the instruction sheet 89 is located at the position on the cover back 83*a* illustrated in FIGS. 24 and 26. If, for example, the toner pack 40 attached to the replenishment port 32*a* has a large size, the major part of the instruction sheet 89 can be obstructed by the toner pack 40. As a result, the user can have difficulty in observing the information described in the instruction sheet 89 while executing the replenishment operation.

Figure 32:
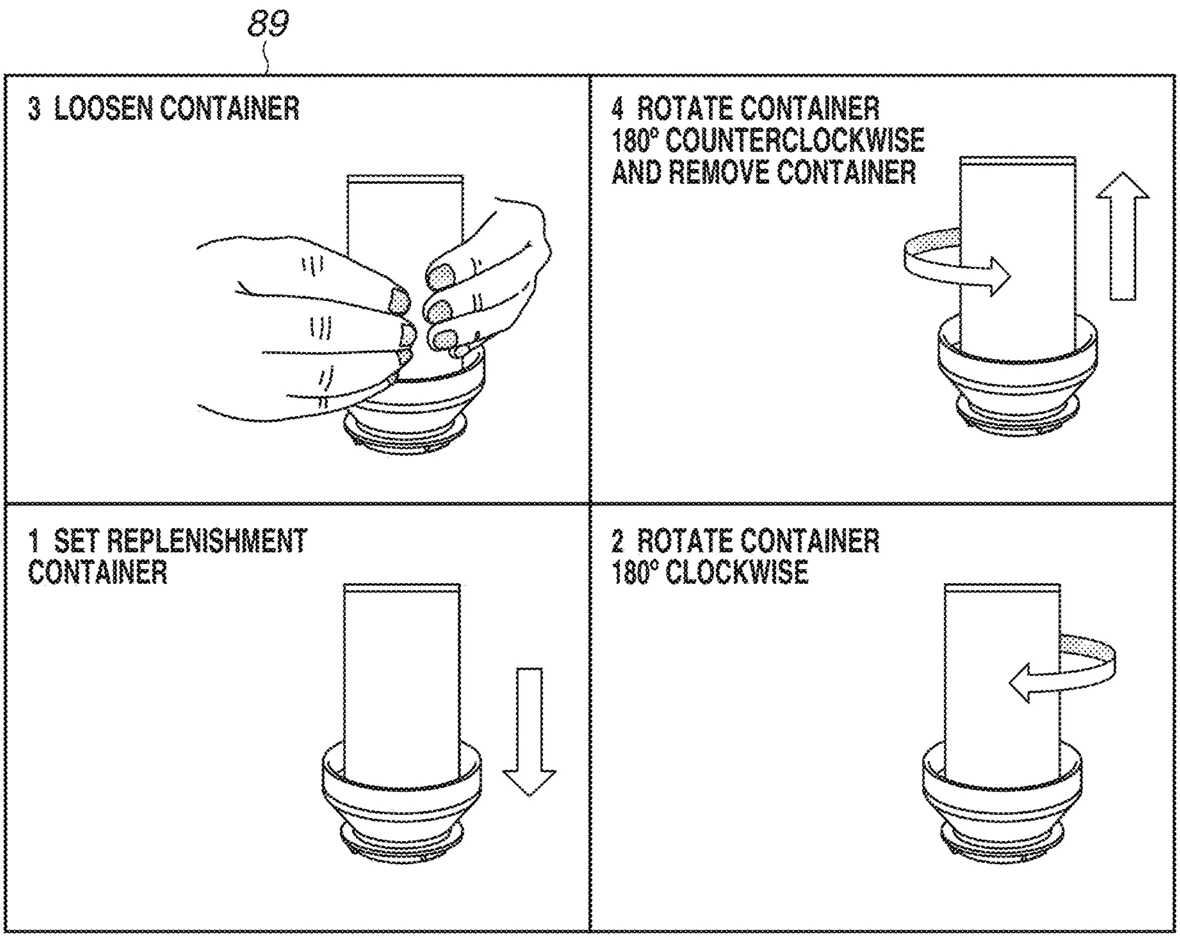
FIG. 32 is a diagram illustrating descriptions on an instruction sheet according to a fourth exemplary embodiment.

FIG. 32 illustrates an example of the information described in the instruction sheet 89 according to the present exemplary embodiment. The instruction sheet 89 includes text and illustrations for describing four steps of the procedure, with numerals indicating the order of steps to be taken. The instruction sheet 89 is different from that of FIG. 25 in the display positions of the respective steps.

In FIG. 32, steps 1 and 2 are displayed vertically below, and steps 3 and 4 are displayed vertically above. A significant difference between group 1 including steps 1 and 2 and group 2 including steps 3 and 4 is that the operations included in group 1 are completed before the attachment of the toner pack 40 to the replenishment port 32*a*, while the operations included in group 2 are started after the attachment of the toner pack 40 to the replenishment port 32*a*. In view of this, in the present exemplary embodiment, the display position of the information about steps 3 and 4 is shifted up in the vertical direction so that the information is easier for the user to observe even after the attachment of the toner pack 40 to the replenishment port 32*a*.

In the foregoing description of the present exemplary embodiment, the layout position of the instruction sheet 89 is assumed to be the same as in the first exemplary embodiment. However, this is not restrictive. The instruction sheet 89 described in the present exemplary embodiment may be applied to the configuration of the second or third exemplary embodiment.

In the foregoing first to fourth exemplary embodiments, the instruction sheet 89 describes the four steps of the procedure related to the toner replenishment. However, this is not restrictive. All the four steps do not need to be described, and the instruction sheet 89 may be configured to describe at least any one of the steps. Moreover, both the text and the illustrations do not need to be included, and the instruction sheet 89 may be configured to include either the text or the illustrations alone.

In the foregoing first to fourth exemplary embodiments, the instruction sheet 89 is attached to the cover back 83*a* or the top wall 93. However, such configurations are not restrictive. The text and illustrations may be directly engraved or embossed on the cover back 83*a* or the top wall 93 instead of a sheet being attached.

[Configuration of Lever Portion]

Next, another modification will be described. This exemplary embodiment is configured by replacing the shutter member 507 of the toner reception unit 600 according to the first exemplary embodiment with a shutter member 507B (see FIGS. 33A to 34). Similar components to those of the first exemplary embodiment will be omitted in the drawings, or illustrated and described with the same reference numerals.

Figure 15:
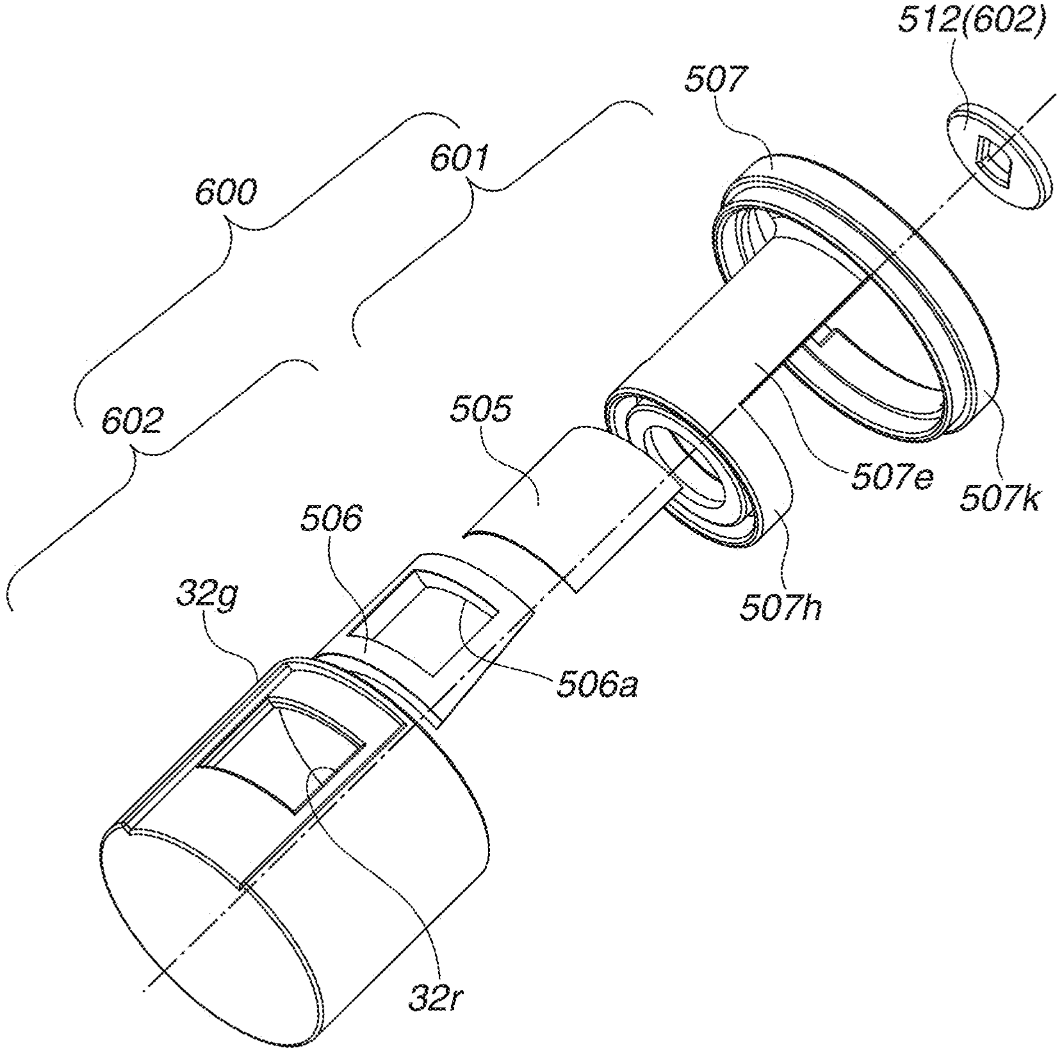
FIG. 15 is an exploded perspective view illustrating the toner reception unit.

Similar to the first exemplary embodiment, the shutter member 507B according to the present exemplary embodiment includes, as illustrated in FIG. 15, an inner diameter portion 507*h*, an outer diameter portion 507*k*, and a protrusion 507*e*. In other words, the shutter member 507B is different only in that an engagement unit 513 is added to the shutter member 507 according to the first exemplary embodiment.

Figure 33A:
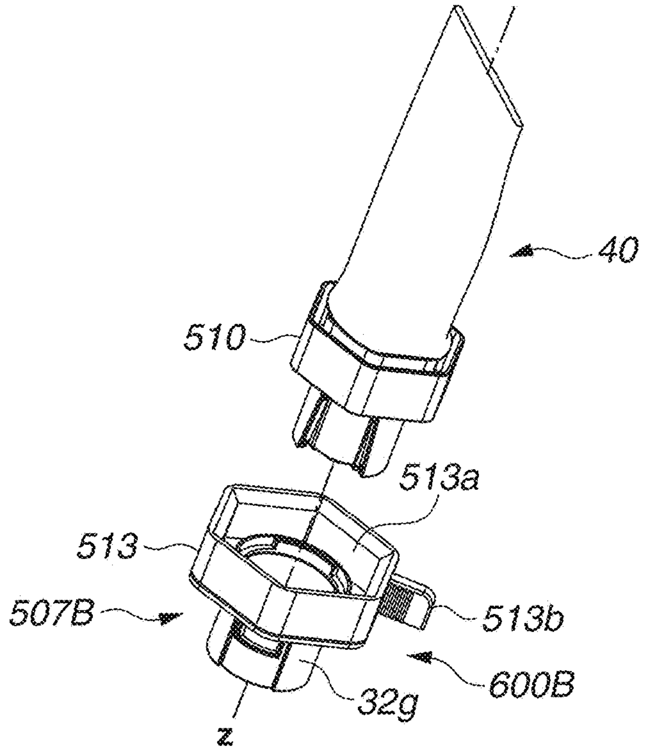
FIG. 33A is an exploded perspective view illustrating a shutter member and a toner pack.
Figure 33B:
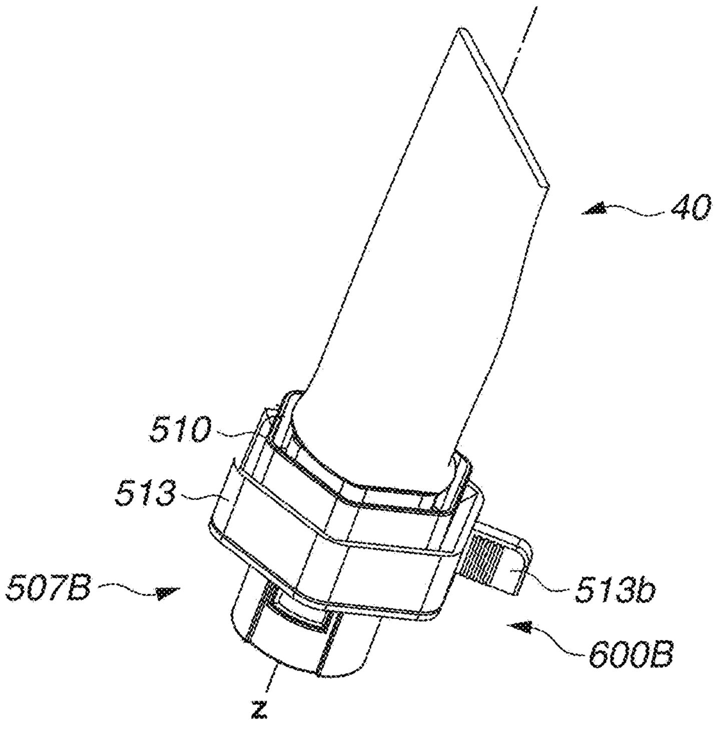
FIG. 33B is a perspective view illustrating the shutter member and the toner pack.
Figure 34:
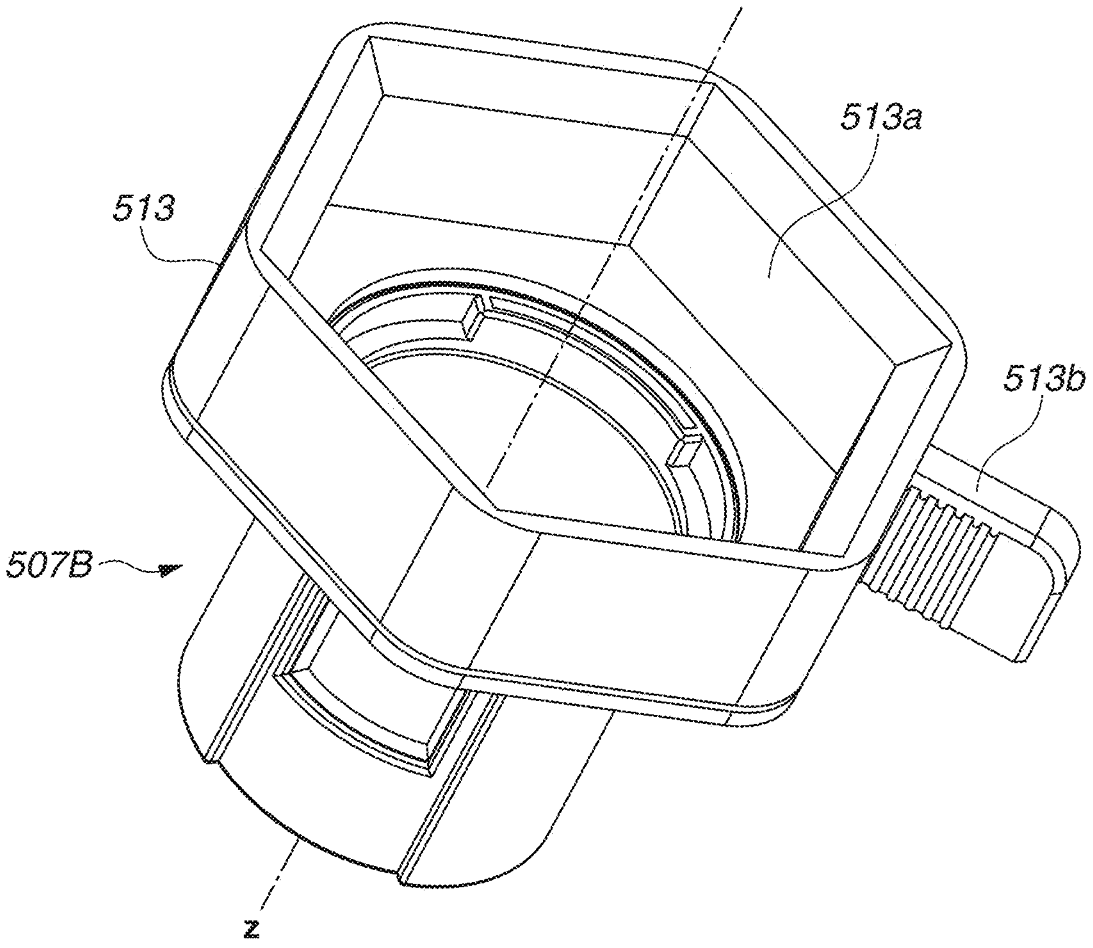
FIG. 34 is an enlarged perspective view illustrating the shutter member.

As illustrated in FIGS. 33A to 34, the engagement unit 513 of the shutter member 507B includes a substantially hexagonal opening 513*a* with which the outer ring member 510 of the toner pack 40 is engaged, and a lever portion 513*b* that the user can operate to rotate.

Figure 35:
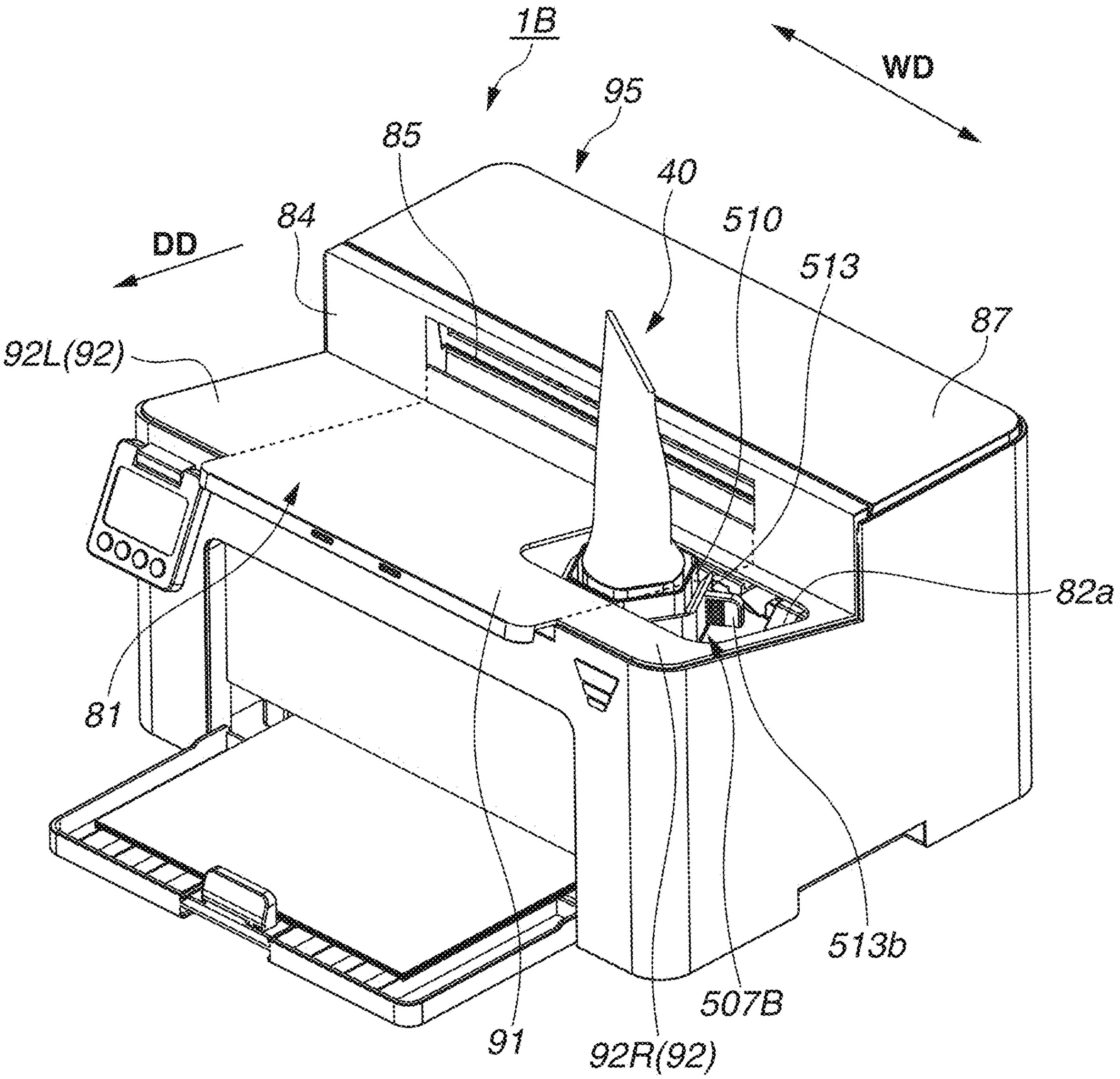
FIG. 35 is a perspective view illustrating an image forming apparatus according to another exemplary embodiment.

FIG. 35 is a perspective view illustrating an image forming apparatus 1B according to the present exemplary embodiment. The image forming apparatus 1B has basically the same configuration and functions as those of the image forming apparatus 1 according to the first exemplary embodiment. As illustrated in FIG. 35, the discharge tray 81 of the image forming apparatus 1B has an opening 82*a*. The opening 82*a* is located in the right part of the image forming apparatus 1B.

The engagement unit 513 of the shutter member 507B is exposed to outside via the opening 82*a*. In replenishing the developing container 32 (see FIG. 1) with toner, the user brings the toner pack 40 into engagement with the engagement unit 513. More specifically, the outer ring member 510 of the toner pack 40 is engaged with the engagement unit 513.

The user then operates the lever portion 513*b* exposed in the opening 82*a* to rotate the lever portion 513*b* about the rotation axis z (see FIG. 33B). The shutter member 507B and the rotary container unit 401 (see FIG. 5) including the toner pack 40 are thereby rotated to shift the toner pack 40 and the toner reception unit 600B from the blocked state to the open state. This enables the replenishment of the developing container 32 with the toner in the toner pack 40.

As described above, in the present exemplary embodiment, the toner pack 40 and the toner reception unit 600B can be shifted from the blocked state to the open state by operating the lever portion 513*b* of the shutter member 507B instead of operating the outer ring member 510 as in the first exemplary embodiment.

Since the space for gripping the lever portion 513*b* is smaller than the space for gripping the outer ring member 510, the lever portion 513*b* has high operability even with a small opening 82*a*, for example. This can thus improve usability.

[Configuration for Preventing User from Forgetting to Close Cover]

Figure 36A:
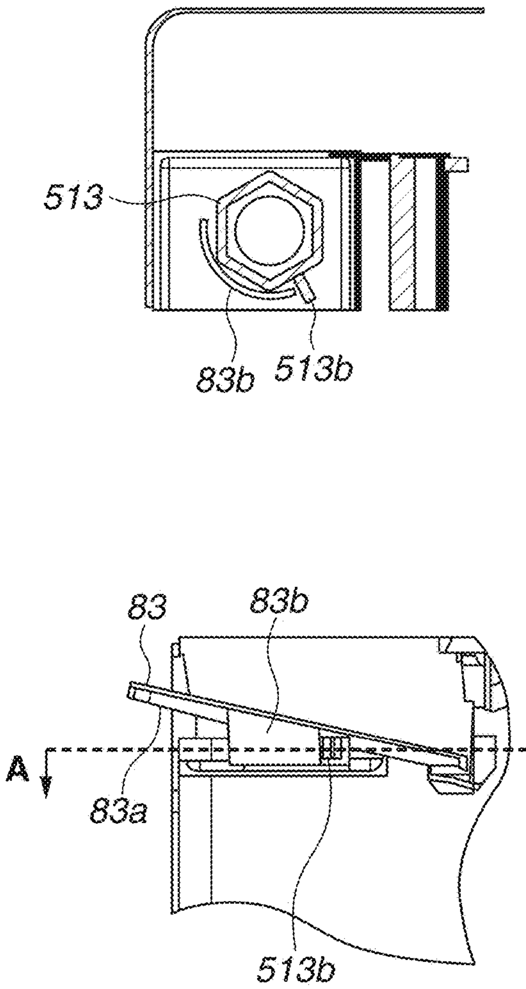
FIGS. 36A and 36B are a top view and a side view illustrating a configuration for preventing a user from forgetting to close a cover.
Figure 36B:
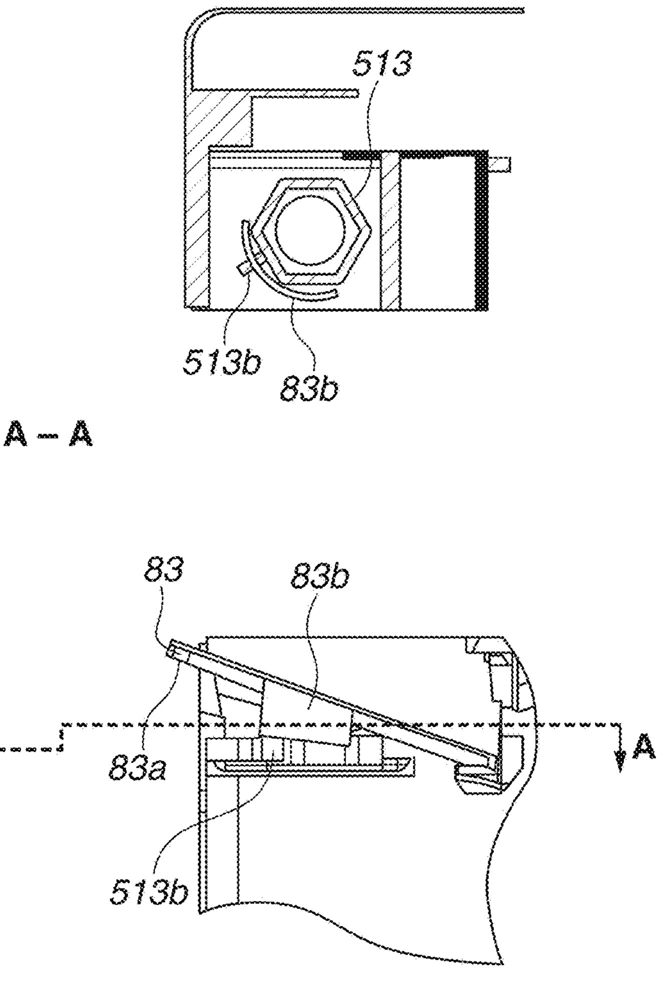

As illustrated in FIGS. 36A and 36B, the present exemplary embodiment further includes a protrusion 83*b* located on the cover back 83*a*. The upper halves of FIGS. 36A and 36B illustrate top views of the vicinity of the engagement unit 513. The lower halves of FIGS. 36A and 36B illustrate side views of the vicinity of the engagement unit 513. The top views of FIGS. 36A and 36B correspond to sectional views of the image forming apparatus 1 taken along the line A-A illustrated in the sectional views of FIGS. 36A and 36B. Suppose that the user rotates the engagement unit 513 from a closed position (FIG. 36A) to an open position (FIG. 36B) during the toner replenishment, and forgets to return the engagement unit 513 to the closed position after the end of the toner replenishment. If the user attempts to close the cover 83 in such a situation, the protrusion 83*b* interferes with the lever portion 513*b* and the cover 83 fails to be closed.

The foregoing configuration will be described in more detail with reference to the drawings. The top view in the upper half of FIG. 36A illustrates a case where the protrusion 83*b* and the lever portion 513*b* do not overlap. The top view in the upper half of FIG. 36B illustrates a case where the protrusion 83*b* and the lever portion 513*b* overlap. In the case of FIG. 36A, the cover 83 can thus be closed (moved to a closed position) without the protrusion 83*b* and the lever portion 513*b* interfering with each other. By contrast, in the case of FIG. 36B, the cover 83 cannot be closed because of the interference between the protrusion 83*b* and the lever portion 513*b*. As can be seen from the side view of FIG. 36B, the cover 83 is stopped at a position vertically higher than in the side view of FIG. 36A. Such a configuration can prompt the user to open the cover 83 again and rotate the engagement unit 513 to the closed position, whereby the user can be prevented from forgetting to close the engagement unit 513.

The image forming apparatus 1 may further include a not-illustrated cover opening/closing detection sensor. The cover opening/closing detection sensor can detect whether the cover 83 on the printer main body 100 is closed. If the cover opening/closing detection sensor detects that the cover 83 is not closed, the control unit 360 will not start image information. Such a configuration can prevent the toner from leaking out of the replenishment port 32*a* because image formation is accidentally started with the lever portion 513*b* at a position other than the closed position.

Figure 37A:
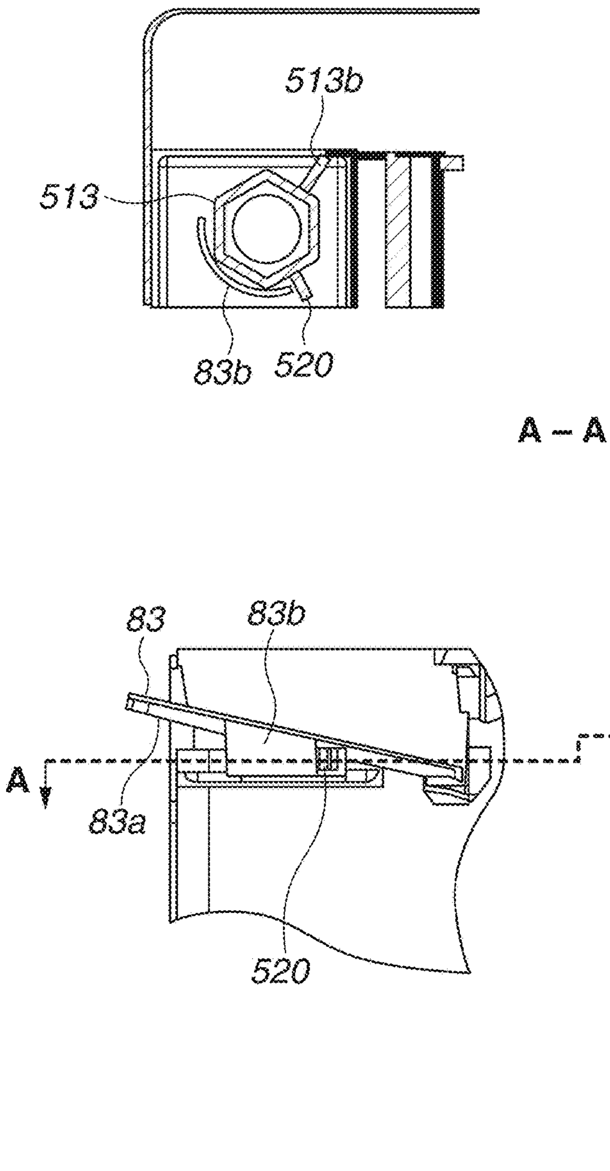
FIGS. 37A and 37B are a top view and a side view illustrating another configuration for preventing the user from forgetting to close the cover.
Figure 37B:
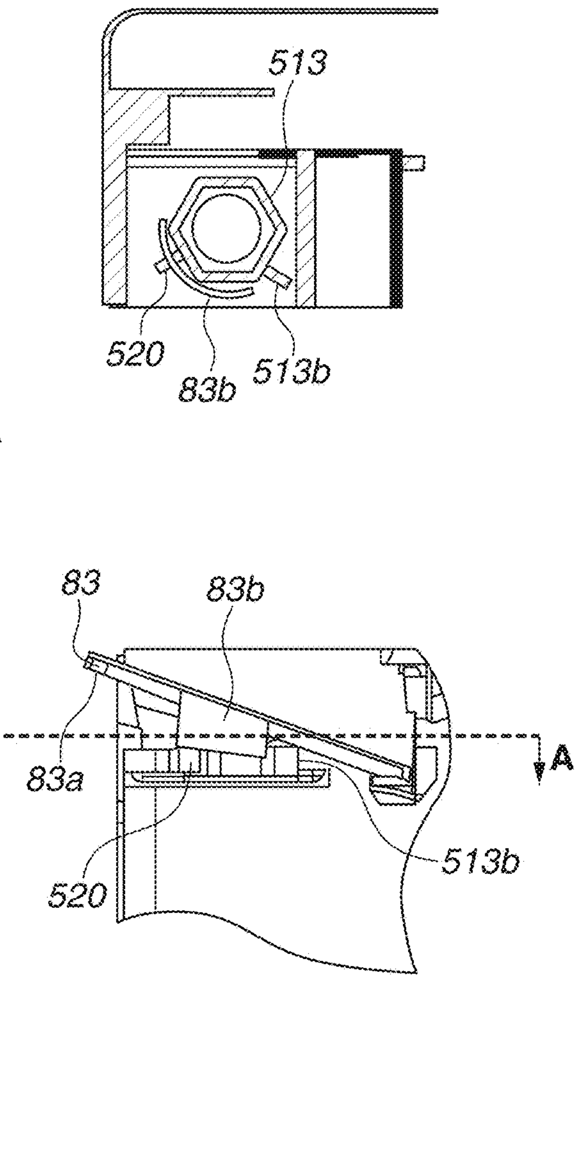

In the configuration of FIGS. 36A and 36B, the lever portion 513*b* to be operated by the user is described to interfere with the protrusion 83*b* in closing the cover 83. However, this is not restrictive. FIGS. 37A and 37B illustrate a configuration where a protrusion 520 to interfere with the protrusion 83*b* in closing the cover 83 is provided aside from the lever portion 513*b* to be operated by the user. If the lever portion 513*b* is moved, the protrusion 520 also moves by the same amount in the same direction.

The top view in the upper half of FIG. 37A illustrates a case where the protrusions 83*b* and 520 do not overlap. The top view in the upper half of FIG. 37B illustrates a case where the protrusions 83*b* and 520 overlap. In the case of FIG. 37A, the cover 83 can thus be closed (moved to the closed position) without the protrusions 83*b* and 520 interfering with each other. By contrast, in the case of FIG. 37B, the cover 83 cannot be closed because of the interference between the protrusions 83*b* and 520. As can be seen from the side view of FIG. 37B, the cover 83 is stopped at a position vertically higher than in the side view of FIG. 37A. Such a configuration can prompt the user to open the cover 83 again and rotate the engagement unit 513 to the closed position, whereby the user can be prevented from forgetting to close the engagement unit 513.

[Target Positions of Lever Movement]

Figure 38:
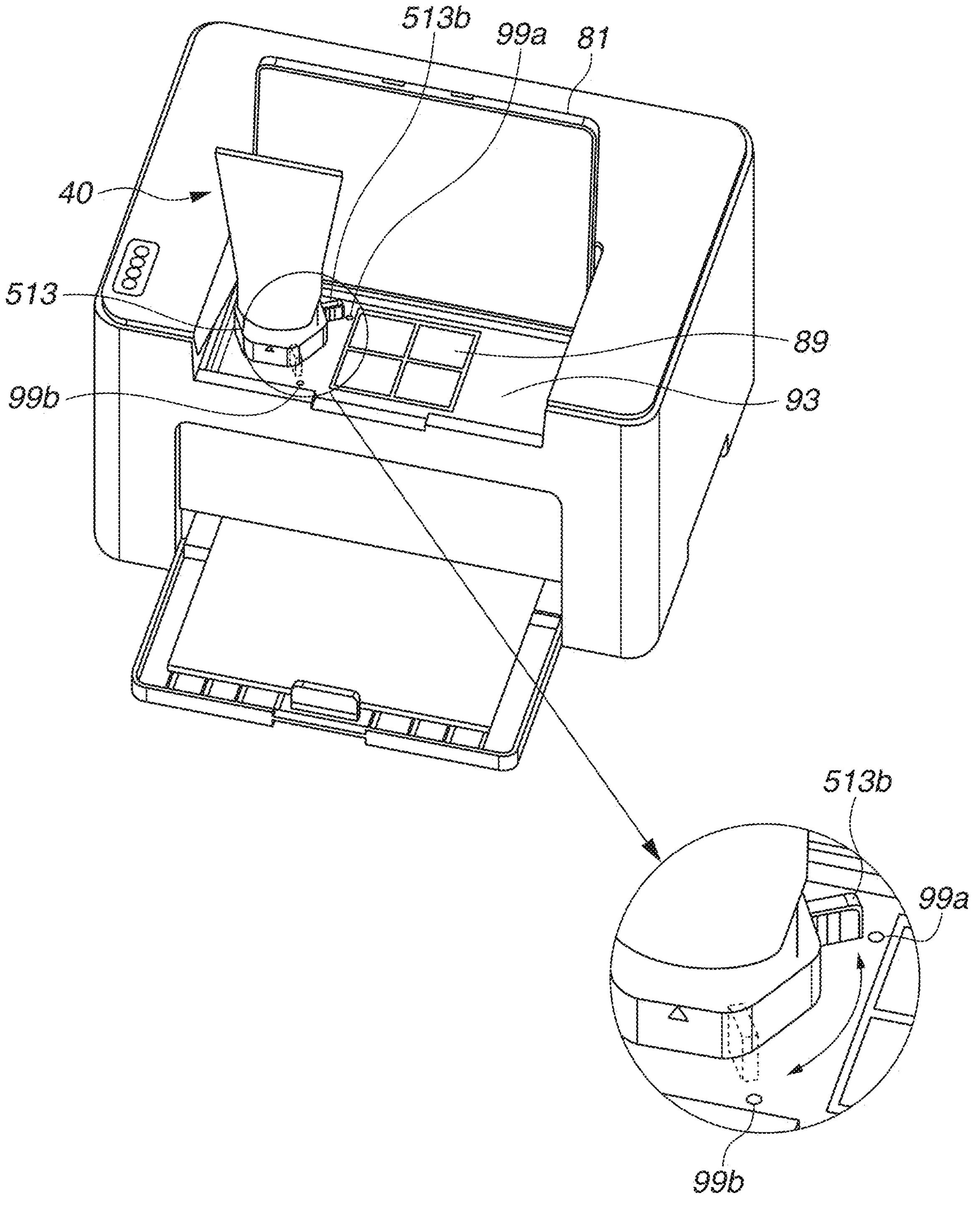
FIG. 38 is a perspective view illustrating a configuration of stickers indicating target positions of lever movement.

As illustrated in FIG. 38, stickers 99*a* and 99*b* may be attached to respective points corresponding to the open and closed positions of the lever portion 513*b* as a movement guide. This enables the user to check that the engagement unit 513 is rotated up to the open position during the toner replenishment and check that the engagement unit 513 is rotated back to the closed position in returning the engagement unit 513 after the toner replenishment, whereby the user can be prevented from forgetting to close the engagement unit 513.

The movement guide does not necessarily need to be the stickers 99*a* and 99*b*. For example, markers may be directly engraved or embossed.

The instruction sheet 89 may be located near the engagement unit 513 as illustrated in FIG. 38. Locating the instruction sheet 89 near the engagement unit 513 reduces the movement of the line of sight and can thus provide high operability and improved usability.

[Guide Groove for Lever Movement]

Figure 39:
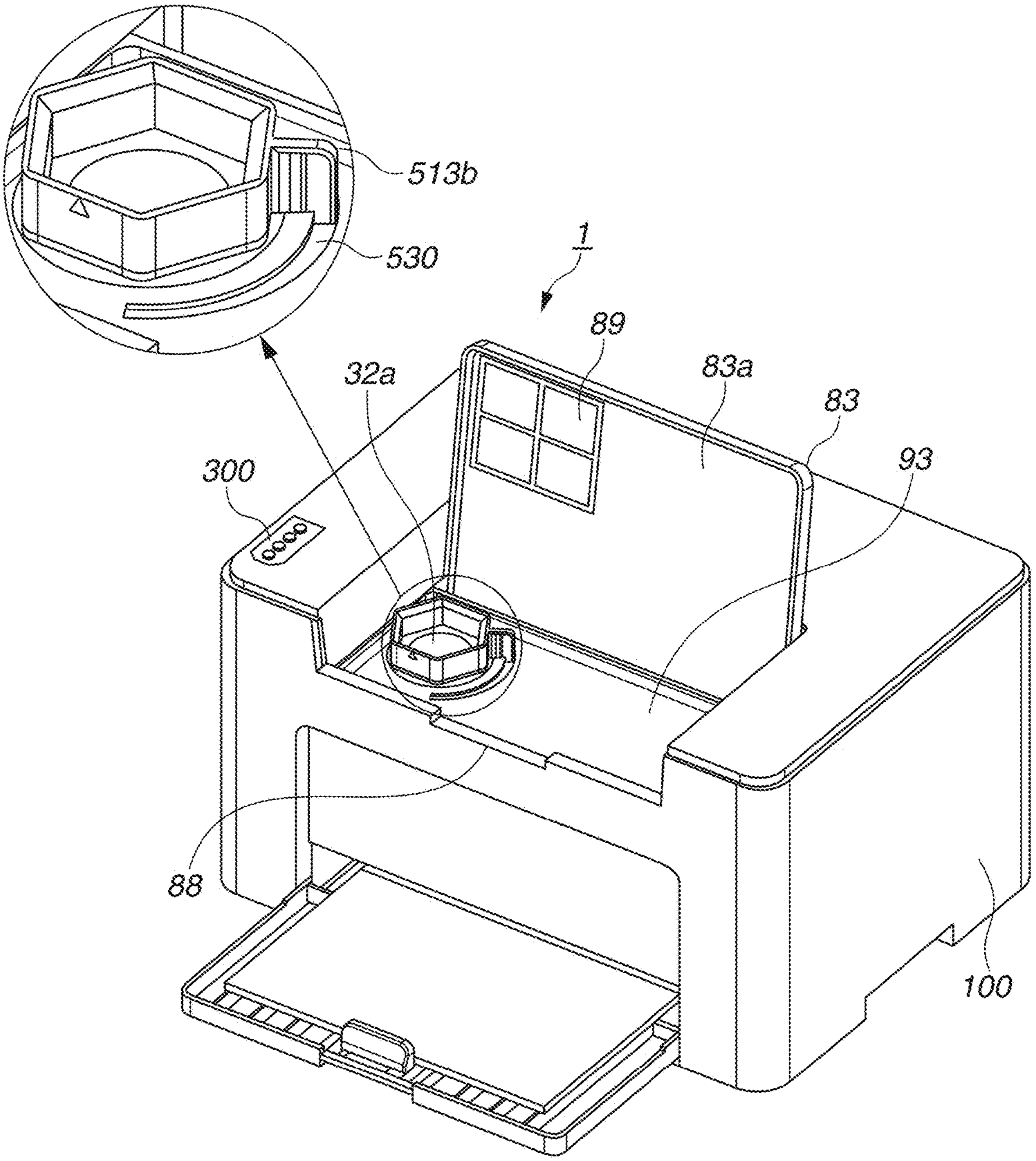
FIG. 39 is a perspective view illustrating a configuration of a guide groove for lever movement.

As illustrated in FIG. 39, a guide groove 530 may be formed in the top wall 93 so that the lever portion 513*b* can be moved between the open and closed positions more easily and the user can intuitively understand in which direction to rotate the lever portion 513*b*. The guide groove 530 is a groove of arc shape formed along the rotation locus of the lever portion 513*b*.

[Part of Cover Constituting Front Exterior]

Figure 40A:
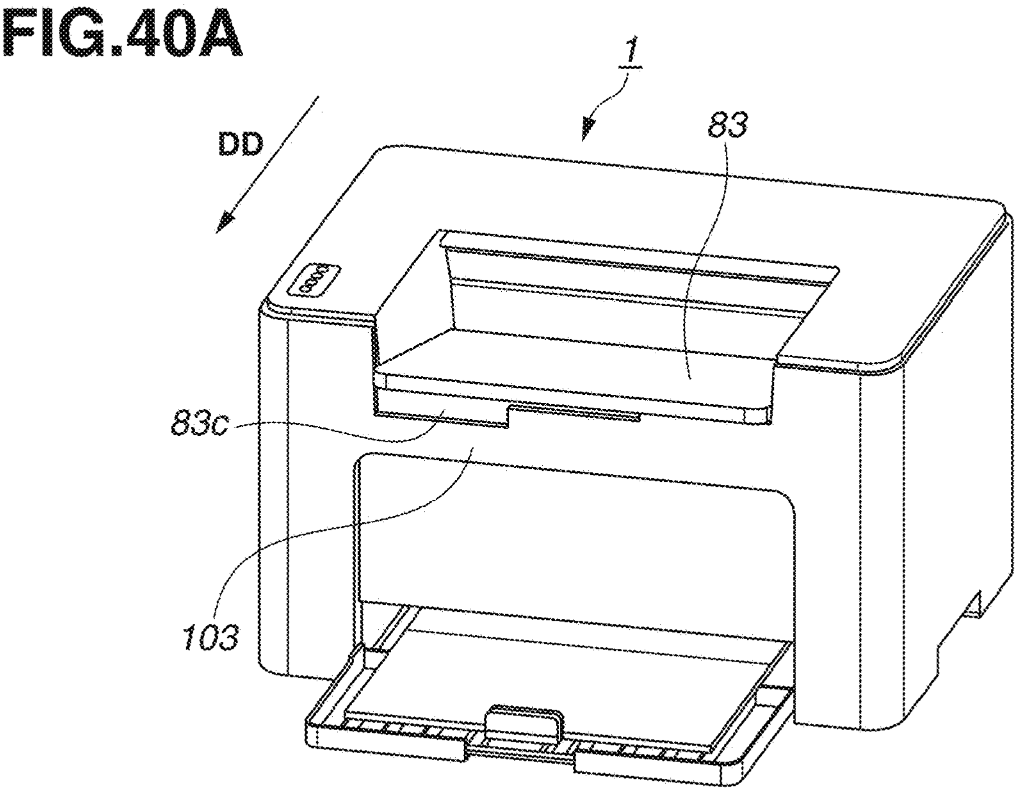
FIGS. 40A and 40B are perspective views illustrating a configuration where a cover rib constitutes a part of a front exterior member.
Figure 40B:
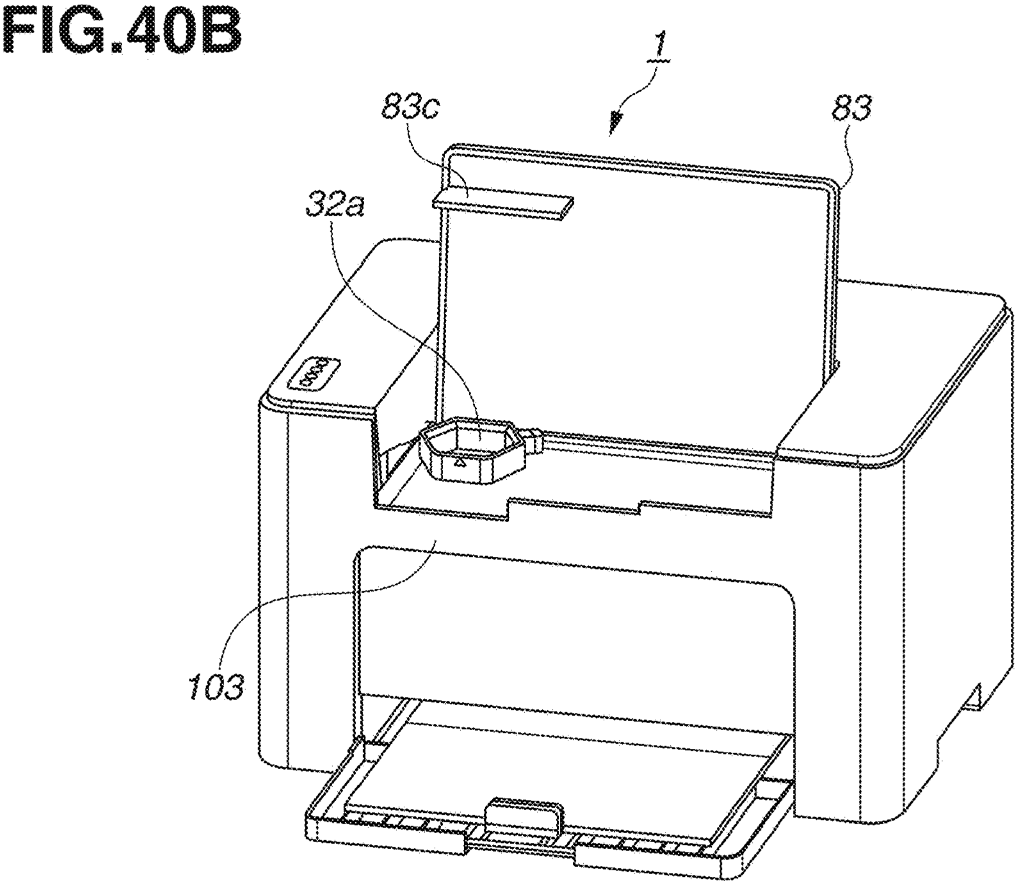

As illustrated in FIGS. 40A and 40B, a rib 83*c* on the cover 83 may constitute a part of a front exterior member 103 of the image forming apparatus 1. The exterior member 103 refers to an exterior member of the housing 100*a* located downstream in the discharge direction DD of the recording material P. With such a configuration, an open space appears in front of the replenishment port 32*a* when the cover 83 is opened. This can provide high operability during toner replenishment and improve usability.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image forming apparatus comprising:

an image bearing member on which an electrostatic latent image is formed;

a developing container to which a replenishment container accommodating a developer is attachable, the developer being capable of being supplied from the replenishment container to the developing container;

a developer bearing member configured to develop the electrostatic latent image into a developer image by bearing the developer accommodated in the developing container and supplying the image bearing member with the developer;

a transfer member configured to transfer the developer image to a recording material;

a discharge unit configured to discharge the recording material to which the developer image is transferred by the transfer member in a first direction out of an apparatus main body;

a stacking tray including a stacking surface on which the recording material discharged by the discharge unit is stacked;

a wall configured to cover the developing container, the wall in which a hole into which the replenishment container can be inserted is formed, wherein the wall includes a surface which surrounds the hole and extends in a direction that intersects a direction of inserting the replenishment container to the hole;

a cover configured to rotate between a closed position where the cover covers the hole and an open position where the cover exposes the hole; and an information display sheet configured to display information about a procedure for setting the replenishment container to the developing container, the information display sheet being located on a back of the cover, the back of the cover facing the hole with the cover at the closed position, wherein at least part of the hole and at least part of the stacking surface are at the same coordinate position along a second direction intersecting with the first direction and a vertical direction, wherein at least part of the stacking surface and at least part of the information display sheet are at the same coordinate position along the second direction in a state that the cover is at the open position, and wherein at least part of the hole and at least part of the information display sheet are at the same coordinate position along the second direction in the state that the cover is at the open position.

2. The image forming apparatus according to claim 1, wherein the developing container has a part that is wider than a width of the hole in the wall.

3. The image forming apparatus according to claim 1, wherein the information display sheet is configured to include either a text or an illustration which describes the procedure for setting the replenishment container to the developing container.

4. The image forming apparatus according to claim 1, further comprising:

an agitator provided inside the developing container, the agitator being rotatable so as to feed the developer.

5. The image forming apparatus according to claim 4, wherein the agitator is located between the developer bearing member and the hole in a horizontal direction when viewed in a rotational axis direction of the cover.

6. The image forming apparatus according to claim 1, wherein the information display sheet is configured to display information about a procedure for setting the replenishment container to the developing container and removing the replenishment container from the developing container.

7. The image forming apparatus according to claim 1, wherein the image bearing member is the only image bearing member of the image forming apparatus.

8. The image forming apparatus according to claim 1, wherein a transfer nip is formed between the transfer member and the image bearing member, and wherein the developer image borne on the image bearing member is transferred to the recording material in the transfer nip.

9. The image forming apparatus according to claim 1, wherein, in case the replenishment container is not attached to the developing container and the cover is at the open position, at least part of the hole and at least part of the stacking surface are at the same coordinate position along the second direction, wherein, in case the replenishment container is not attached to the developing container and the cover is at the open position, at least part of the stacking surface and at least part of the information display sheet are at the same coordinate position along the second direction, and wherein, in case the replenishment container is not attached to the developing container and the cover is at the open position, at least part of the hole and at least part of the information display sheet are at the same coordinate position along the second direction.

* * * * *